US012812319B2

(12) United States Patent
Hatanaka et al.

(10) Patent No.: US 12,812,319 B2
(45) Date of Patent: Nov. 24, 2026

(54) INFORMATION PROCESSING DEVICE, INFORMATION PROCESSING METHOD, AND PROGRAM

(71) Applicant: Sony Group Corporation, Tokyo (JP)

(72) Inventors: Mitsuyuki Hatanaka, Kanagawa (JP); Toru Chinen, Kanagawa (JP); Minoru Tsuji, Chiba (JP); Yasuhiro Toguri, Kanagawa (JP); Hiroyuki Honma, Chiba (JP)

(73) Assignee: Sony Group Corporation, Tokyo (JP)

( * ) Notice: Subject to any disclaimer, the term of this patent is extended or adjusted under 35 U.S.C. 154(b) by 214 days.

(21) Appl. No.: 18/707,269

(22) PCT Filed: Oct. 31, 2022

(86) PCT No.: PCT/JP2022/040596
§ 371 (c)(1),
(2) Date: May 3, 2024

(87) PCT Pub. No.: WO2023/085140
PCT Pub. Date: May 19, 2023

(65) Prior Publication Data
US 2026/0164204 A1 Jun. 11, 2026

(30) Foreign Application Priority Data
Nov. 12, 2021 (JP) ................................ 2021-184495
Feb. 28, 2022 (JP) ................................ 2022-030292

(51) Int. Cl.
*H04S 7/00* (2006.01)

(52) U.S. Cl.
CPC .............. *H04S 7/302* (2013.01); *H04S 7/305* (2013.01); *H04S 2400/11* (2013.01)

(58) Field of Classification Search
CPC ....... H04S 7/302; H04S 7/305; H04S 2400/11
(Continued)

(56) References Cited

U.S. PATENT DOCUMENTS 10,242,400 B1 * 3/2019 Eraker .................... G06T 11/60
2015/0264296 A1 * 9/2015 Devaux .................... H04N 5/77 386/226
(Continued)

FOREIGN PATENT DOCUMENTS

EP 3 989 605 A1 4/2022
WO WO 2018/180531 A1 10/2018
(Continued)

OTHER PUBLICATIONS

International Search Report and English translation thereof mailed Jan. 17, 2023 in connection with International Application No. PCT/JP2022/040596.
(Continued)

*Primary Examiner* — Thjuan K Addy
(74) *Attorney, Agent, or Firm* — Wolf, Greenfield & Sacks, P.C.

(57) ABSTRACT

The present technology relates to an information processing device, method, and program that can reproduce content based on the intention of the content's producer. An information processing device includes a control unit that generates a plurality of metadata sets associated with a plurality of objects that contain object position information. Objects' positions are viewed from a control viewpoint when a direction from the control viewpoint toward a target point in space is designated as toward a median plane. For each of a plurality of the control viewpoints, the control unit generates control viewpoint information that indicates a position of the control viewpoint in space and information indicating the metadata set associated with the corresponding control viewpoint in a plurality of the metadata sets. The control unit generates content data containing a plurality of the metadata sets different from each other and configuration information containing the control viewpoint information.

36 Claims, 50 Drawing Sheets

(58) Field of Classification Search
USPC .................................... 381/1, 310, 300, 307
See application file for complete search history.

(56) References Cited

U.S. PATENT DOCUMENTS

| | | | | |
|---|---|---|---|---|
| 2019/0236096 | A1* | 8/2019 | Dal Mutto | G06F 16/41 |
| 2020/0043505 | A1 | 2/2020 | Chinen et al. | |
| 2020/0053499 | A1 | 2/2020 | Tsuji | |
| 2021/0176581 | A1 | 6/2021 | Tsuji | |
| 2024/0314513 | A1 | 9/2024 | Namba | |

FOREIGN PATENT DOCUMENTS

| | | | |
|---|---|---|---|
| WO | WO 2019/198540 | A1 | 10/2019 |
| WO | WO 2020/255810 | A1 | 12/2020 |

OTHER PUBLICATIONS

Andreas Franck et al: "A System Architecture for Semantically Informed Rendering of Object-Based Audio", JAES, AES, Aug. 14, 2019, vol. 67, No. 7/8, pp. 498-509, 60 East 42nd Street, Room 2520 New York 10165-2520, USA, XP040706699.

Jeong-Seon Yi et al: "The Realtime Method Based on Audio Scenegraph for 3D Sound Rendering", Jan. 1, 2005 (Jan. 1, 2005), Advances in Multimedia Information Processing—PCM 2005 : 6th Pacific-Rim Conference D4 on Multimedia, Jeju Island, Korea, Nov. 13-16, 2005, pp. 730-730, XP01924009.

* cited by examiner

FIG. 7

| Syntax | No. of bytes | Data format |
|---|---|---|
| StructInfo() { | | |
| FrameLengthIndex; | 1 | unsigned char |
| NumOfObjects; | 1 | unsigned char |
| NumOfControlViewpoints; | 1 | unsigned char |
| NumOfObjectMetaSets; | 1 | unsigned char |
| for (i = 0; i < NumOfContorlViewpoints; i++) { | | |
| ControlViewpointInfo(i); | | |
| } | | |
| for (i = 0; i < NumOfControlViewpoints; i++) { | | |
| for (j = 0; j < NumOfObjects; j++) { | | |
| ObjectIndex[i][j] = j; | | |
| CoordinateMode[i][j]; | 1 | unsigned char |
| } | | |
| } | | |
| } | | |

FIG. 8

FrameLengthIndex

| Index | Frame Length |
|---|---|
| 0 | 32 |
| 1 | 64 |
| 2 | 128 |
| 3 | 256 |
| 4 | 512 |
| 5 | 1024 |
| 6 | 1152 |
| 7 | 2048 |
| 8 | 4096 |
| 9 | 8192 |
| 10–255 | reserved |

FIG. 9

| Syntax | No. of bytes | Data format |
| --- | --- | --- |
| ControlViewpointInfo(i) { | | |
| ControlViewpointIndex[i]; | 1 | unsigned char |
| AssociatedObjectMetaSetIndex[i]; | 1 | unsigned char |
| CVPosX[i]; | 4 | 32bit-float |
| CVPosY[i]; | 4 | 32bit-float |
| CVPosZ[i]; | 4 | 32bit-float |
| CVYaw[i]; | 4 | 32bit-float |
| CVPitch[i]; | 4 | 32bit-float |
| CVRoll[i]; | 4 | 32bit-float |
| } | | |

FIG. 10

| Syntax | No. of bytes | Data format |
|---|---|---|
| ObjectMeta() { | | |
| for(i=0; i < NumOfObjectMetaSets; i++) { | | |
| ObjectMetaSetIndex[i] = i; | | |
| for(j=0; j < NumOfObjects; j++) { | | |
| **NumOfChangePoints[i][j];** | 4 | unsigned int |
| for(k=0; k < NumOfChangePoints; k++) { | | |
| **frame_index[i][j][k];** | 4 | unsigned int |
| **PosA[i][j][k];** | 4 | 32-bit float |
| **PosB[i][j][k];** | 4 | 32-bit float |
| **PosC[i][j][k];** | 4 | 32-bit float |
| **Gain[i][j][k];** | 4 | 32-bit float |
| } | | |
| } | | |
| } | | |
| } | | |

FIG. 32

| Syntax | No. of bytes | Data format |
|---|---|---|
| StructInfo() { | | |
| **FormatVersion;** | 1 | unsigned char |
| **FrameLengthIndex;** | 1 | unsigned char |
| **NumOfObjects;** | 1 | unsigned char |
| **NumOfControlViewpoints;** | 1 | unsigned char |
| **NumOfObjectMetaSets;** | 1 | unsigned char |
| for (i = 0; i < NumOfContorlViewpoints; i++) { | | |
| ControlViewpointInfo(i); | | |
| } | | |
| for (i = 0; i < NumOfControlViewpoints; i++) { | | |
| for (j = 0; j < NumOfObjects; j++) { | | |
| ObjectIndex[i][j] = j; | | |
| **CoordinateMode[i][j];** | 1 | unsigned char |
| } | | |
| } | | |
| **cvp_group_present;** | 1 | unsigned char |
| if(cvp_group_present ) { | | |
| CvpGroupInfo2D(); | | |
| } | | |
| } | | |

FIG.33

| Syntax | No. of bytes | Data format |
|---|---|---|
| CVPGroupInfo2D(){ | | |
| numOfCVPGroup; | 1 | unsigned char |
| for(i=0; i <numOfCVPGroup; i++){ | | |
| **vertex_idx;** | 1 | unsigned char |
| if(vertex_idx ==255){ | | |
| **center_x[i];** | 4 | Float32 |
| **center_y[i];** | 4 | Float32 |
| **radius[i];** | 4 | Float32 |
| }else{ | | |
| for(j=0; j <vertex_idx+3;i++){ | | |
| **border_pos_x[j];** | 4 | Float32 |
| **border_pos_y[j];** | 4 | Float32 |
| } | | |
| } | | |
| **numOfCVP_ingroup[i];** | 1 | unsigned char |
| for(j=0; j <numOfCVP_ingroup[i];j++){ | | |
| **CvpIndex_ingroup[i][j];** | 1 | unsigned char |
| } | | |
| } | | |
| } | | |

FIG. 37

| | x | y | Case A | | Case B | |
|---|---|---|---|---|---|---|
| Target Point | 0 | 0.5 | | | | |
| | x | y | azi(0) | Gain(0) | azi(1) | Gain(1) |
| CVP1 | -0.5 | 0 | 0 | 1 | 0 | 1 |
| CVP2 | 0 | 0 | 0 | 1 | 0 | 1 |
| CVP3 | 0.5 | 0 | 0 | 1 | 0 | 1 |
| CVP4 | 0 | -0.25 | 0 | 0.5 | 0 | 1 |
| CVP5 | 0 | -0.5 | 0 | 0.2 | 0 | 1 |
| CVP6 | 0 | -0.9 | 0 | 0.2 | 120 | 0 |
| | | | | | | |
| | x | y | azi(0) | Gain(0) | azi(1) | Gain(1) |
| LISTENING POSITION | 0 | -0.8 | 0 | 0.37501 | 67.87193 | 0.460087 |

FIG. 40

| | x_obj | y_obj | Case A | | Case B | |
|---|---|---|---|---|---|---|
| Target Point | 0 | 0 | | | | |
| | x | y | azi(0) | Gain(0) | azi(1) | Gain(1) |
| CVP1 | 0 | 0.75 | 0 | 1 | 0 | 1 |
| CVP2 | -0.75 | 0 | 0 | 1 | 0 | 1 |
| CVP3 | -0.25 | 0 | 0 | 0.2 | 120 | 0 |
| CVP4 | 0 | 0.25 | 0 | 0.2 | 0 | 1 |
| CVP5 | 0.25 | 0 | 0 | 0.2 | 0 | 1 |
| CVP6 | 0.75 | 0 | 0 | 1 | 0 | 1 |
| CVP7 | 0 | -0.25 | 0 | 0.2 | 0 | 1 |
| CVP8 | 0 | -0.75 | 0 | 1 | 0 | 1 |
| | x | y | | | | |
| LISTENING POSITION | -0.17678 | 0.176777 | 0 | 0.501194 | 20.05743 | 0.741734 |

FIG. 42

Q71

| | x | y | Case A | | Case B | |
|---|---|---|---|---|---|---|
| Target Point | 0 | 0.5 | | | | |
| | x | y | azi(0) | Gain(0) | azi(1) | Gain(1) |
| CVP1 | -0.5 | 0 | 0 | 1 | 0 | 1 |
| CVP2 | 0 | 0 | 0 | 1 | 0 | 1 |
| CVP3 | 0.5 | 0 | 0 | 1 | 0 | 1 |
| CVP4 | 0 | -0.25 | 0 | 0.5 | 0 | 1 |
| CVP5 | 0 | -0.5 | 0 | 0.2 | 0 | 1 |
| CVP6 | 0 | -0.9 | 0 | 0.2 | 120 | 0 |

| | x | y | azi(0) | Gain(0) | azi(1) | Gain(1) |
|---|---|---|---|---|---|---|
| LISTENING POSITION | 0 | -0.8 | 0 | 0.37501 | 67.87193 | 0.460087 |

AFTER APPLICATION

Q72

| LISTENING POSITION | x | y | azi(0) | Gain(0) | azi(1) | Gain(1) |
|---|---|---|---|---|---|---|
| 1/DISTANCE RATIO | 0 | -0.8 | 0 | 0.37501 | 0 | 1 |
| 1/DISTANCE RATIO SQUARED | | | 0 | 0.234167 | 0 | 1 |
| 1/DISTANCE RATIO CUBED | | | 0 | 0.205033 | 0 | 1 |

FIG. 43

Q81

| | x_obj | y_obj | Case A | | Case B | |
|---|---|---|---|---|---|---|
| Target Point | 0 | 0 | | | | |
| | x | y | azi(0) | Gain(0) | azi(1) | Gain(1) |
| CVP1 | 0 | 0.75 | 0 | 1 | 0 | 1 |
| CVP2 | -0.75 | 0 | 0 | 1 | 0 | 1 |
| CVP3 | -0.25 | 0 | 0 | 0.2 | 120 | 0 |
| CVP4 | 0 | 0.25 | 0 | 0.2 | 0 | 1 |
| CVP5 | 0.25 | 0 | 0 | 0.2 | 0 | 1 |
| CVP6 | 0.75 | 0 | 0 | 1 | 0 | 1 |
| CVP7 | 0 | -0.25 | 0 | 0.2 | 0 | 1 |
| CVP8 | 0 | -0.75 | 0 | 1 | 0 | 1 |

| | x | y | azi(0) | Gain(0) | azi(1) | Gain(1) |
|---|---|---|---|---|---|---|
| LISTENING POSITION | -0.17678 | 0.176777 | 0 | 0.501194 | 20.05743 | 0.741734 |

AFTER APPLICATION

Q82

| LISTENING POSITION | x | y | azi(0) | Gain(0) | azi(1) | Gain(1) |
|---|---|---|---|---|---|---|
| 1/DISTANCE RATIO | -0.17678 | 0.176777 | 0 | 0.501194 | 0 | 1 |
| 1/DISTANCE RATIO SQUARED | | | 0 | 0.339168 | 0 | 1 |
| 1/DISTANCE RATIO CUBED | | | 0 | 0.25492 | 0 | 1 |

FIG. 44

| Syntax | data length | DATA CONTENTS |
| --- | --- | --- |
| StructInfo() { | | |
| … | | |
| for (i = 0; i < NumOfControlViewpoints; i++) { | | |
| for (j = 0; j < numOfObjs[i]; j++) { | | |
| **MuteObjIdx[i][j];** | INT | Mute STATE OF Mute Object<br>0: NOT Mute 1: Mute |
| } | | |
| } | | |
| … | | |
| } | | |

FIG. 50

| Syntax | data length | DATA CONTENTS |
|---|---|---|
| StructInfo() { | | |
| ... | | |
| CVPSelectAllowPresentFlag; | INT | PRESENCE FLAG OF CVP SELECTION INFORMATION 0: ABSENCE 1: PRESENCE |
| if(CVPSelectAllowPresentFlag == 1) { | | |
| numOfAllowedCVP; | INT | NUMBER OF SELECTABLE CVPS |
| for (i = 0; i < numOfAllowedCVP; i++) { | | |
| AllowedCVPIdx[i]; | INT | SELECTABLE CVP Index VALUE |
| } | | |
| } | | |
| ... | | |
| } | | |

INFORMATION PROCESSING DEVICE, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/040596, filed in the Japanese Patent Office as a Receiving Office on Oct. 31, 2022, which claims priority to Japanese Patent Application Number JP2022-030292, filed in the Japanese Patent Office on Feb. 28, 2022 and Japanese Patent Application Number JP2021-184495, filed in the Japanese Patent Office on Nov. 12, 2021, each of which is hereby incorporated by reference in its entirety.

TECHNICAL FIELD

The present technology relates to an information processing device, an information processing method, and a program, and particularly to an information processing device, an information processing method, and a program, each capable of achieving content reproduction on the basis of intention of a content creator.

BACKGROUND ART

Conventional free-viewpoint audio is chiefly used for game playing, where a positional relation established in an image displayed during a game, i.e., agreement between images and sounds, is an important factor. Accordingly, object audio in an absolute coordinate system is adopted for achieving this agreement (e.g., see PTL 1).

On the other hand, in the field of music content, an audibility balance has higher priority over image-sound agreement unlike games so as to improve musicality. Accordingly, image-sound agreement is not secured not only for 2 channel stereo but also for 5.1 channel multi-channel content.

Moreover, musicality has higher priority even in 3DoF (Degree of Freedom) commercial services. Accordingly, content provided by a large number of services in this field includes only sounds and does not secure image-sound agreement.

CITATION LIST

Patent Literature

[PTL 1]
PCT Patent Publication No. WO2019/198540

SUMMARY

Technical Problem

Meanwhile, by adopting the foregoing method which expresses a position of an object by coordinates in an absolute coordinate system, an enhanced sense of realism can be offered, but free-viewpoint content capable of meeting musicality intended by a music creator is difficult to create. In other words, it is difficult to achieve content reproduction of free-viewpoint content based on intention of a content creator.

The present technology has been developed in consideration of such circumstances and aims at realization of content reproduction based on intention of a content creator.

Solution to Problem

An information processing device according to a first aspect of the present technology includes a control unit. The control unit generates a plurality of metadata sets each including metadata associated with a plurality of objects, the metadata containing object position information indicating positions of the objects as viewed from a control viewpoint when a direction from the control viewpoint toward a target point in a space is designated as a direction toward a median plane. For each of a plurality of the control viewpoints, the control unit generates control viewpoint information that contains control viewpoint position information indicating a position of the corresponding control viewpoint in the space and information indicating the metadata set associated with the corresponding control viewpoint in a plurality of the metadata sets. The control unit generates content data containing a plurality of the metadata sets different from each other and configuration information containing the control viewpoint information associated with a plurality of the control viewpoints.

An information processing method or a program according to the first aspect of the present technology includes a step of generating a plurality of metadata sets each including metadata associated with a plurality of objects, the metadata containing object position information indicating positions of the objects as viewed from a control viewpoint when a direction from the control viewpoint toward a target point in a space is designated as a direction toward a median plane, a step of, for each of a plurality of the control viewpoints, generating control viewpoint information that contains control viewpoint position information indicating a position of the corresponding control viewpoint in the space and information indicating the metadata set associated with the corresponding control viewpoint in a plurality of the metadata sets, and a step of generating content data containing a plurality of the metadata sets different from each other and configuration information containing the control viewpoint information associated with a plurality of the control viewpoints.

According to the first aspect of the present technology, a plurality of metadata sets each including metadata associated with a plurality of objects are generated, the metadata containing object position information indicating positions of the objects as viewed from a control viewpoint when a direction from the control viewpoint toward a target point in a space is designated as a direction toward a median plane. For each of a plurality of the control viewpoints, control viewpoint information that contains control viewpoint position information indicating a position of the corresponding control viewpoint in the space and information indicating the metadata set associated with the corresponding control viewpoint in a plurality of the metadata sets is generated. Content data containing a plurality of the metadata sets different from each other and configuration information containing the control viewpoint information associated with a plurality of the control viewpoints is generated.

An information processing device according to a second aspect of the present technology includes an acquisition unit, a listener position information acquisition unit, and a position calculation unit. The acquisition unit acquires object position information indicating a position of an object as viewed from a control viewpoint when a direction from the control viewpoint toward a target point in a space is designated as a direction toward a median plane and control viewpoint position information indicating a position of the control viewpoint in the space. The listener position information acquisition unit acquires listener position information indicating a listening position in the space. The position calculation unit calculates listener reference object position information indicating a position of the object as viewed from the listening position on the basis of the listener position information, the control viewpoint position information associated with a plurality of the control viewpoints, and the object position information associated with a plurality of the control viewpoints.

An information processing method or a program according to the second aspect of the present technology includes a step of acquiring object position information indicating a position of an object as viewed from a control viewpoint when a direction from the control viewpoint toward a target point in a space is designated as a direction toward a median plane and control viewpoint position information indicating a position of the control viewpoint in the space, a step of acquiring listener position information indicating a listening position in the space, and a step of calculating listener reference object position information indicating a position of the object as viewed from the listening position on the basis of the listener position information, the control viewpoint position information associated with a plurality of the control viewpoints, and the object position information associated with a plurality of the control viewpoints.

According to the second aspect of the present technology, object position information indicating a position of an object as viewed from a control viewpoint when a direction from the control viewpoint toward a target point in a space is designated as a direction toward a median plane and control viewpoint position information indicating a position of the control viewpoint in the space are acquired. Listener position information indicating a listening position in the space is acquired. Listener reference object position information indicating a position of the object as viewed from the listening position is calculated on the basis of the listener position information, the control viewpoint position information associated with a plurality of the control viewpoints, and the object position information associated with a plurality of the control viewpoints.

BRIEF DESCRIPTION OF DRAWINGS

FIG. 7 is a diagram presenting a format example of configuration information.

FIG. 8 is a diagram presenting an example of a frame length index.

FIG. 9 is a diagram presenting a format example of CVP information.

FIG. 10 is a diagram presenting a format example of object metadata sets.

FIG. 32 is a diagram presenting a format example of configuration information.

FIG. 33 is a diagram presenting a format example of CVP group information.

FIG. 37 is a diagram presenting an example of listener reference object position information and a listener reference gain.

FIG. 40 is a diagram presenting an example of listener reference object position information and a listener reference gain.

FIG. 42 is a diagram presenting an example of listener reference object position information and a listener reference gain.

FIG. 43 is a diagram presenting an example of listener reference object position information and a listener reference gain.

FIG. 44 is a diagram presenting an example of configuration information.

FIG. 50 is a diagram presenting an example of configuration information.

DESCRIPTION OF EMBODIMENTS

Embodiments to which the present technology is applied will be hereinafter described with reference to the drawings.

First Embodiment

Present Technology

The present technology is a technology which provides free viewpoint content having artistry.

Figure 1:
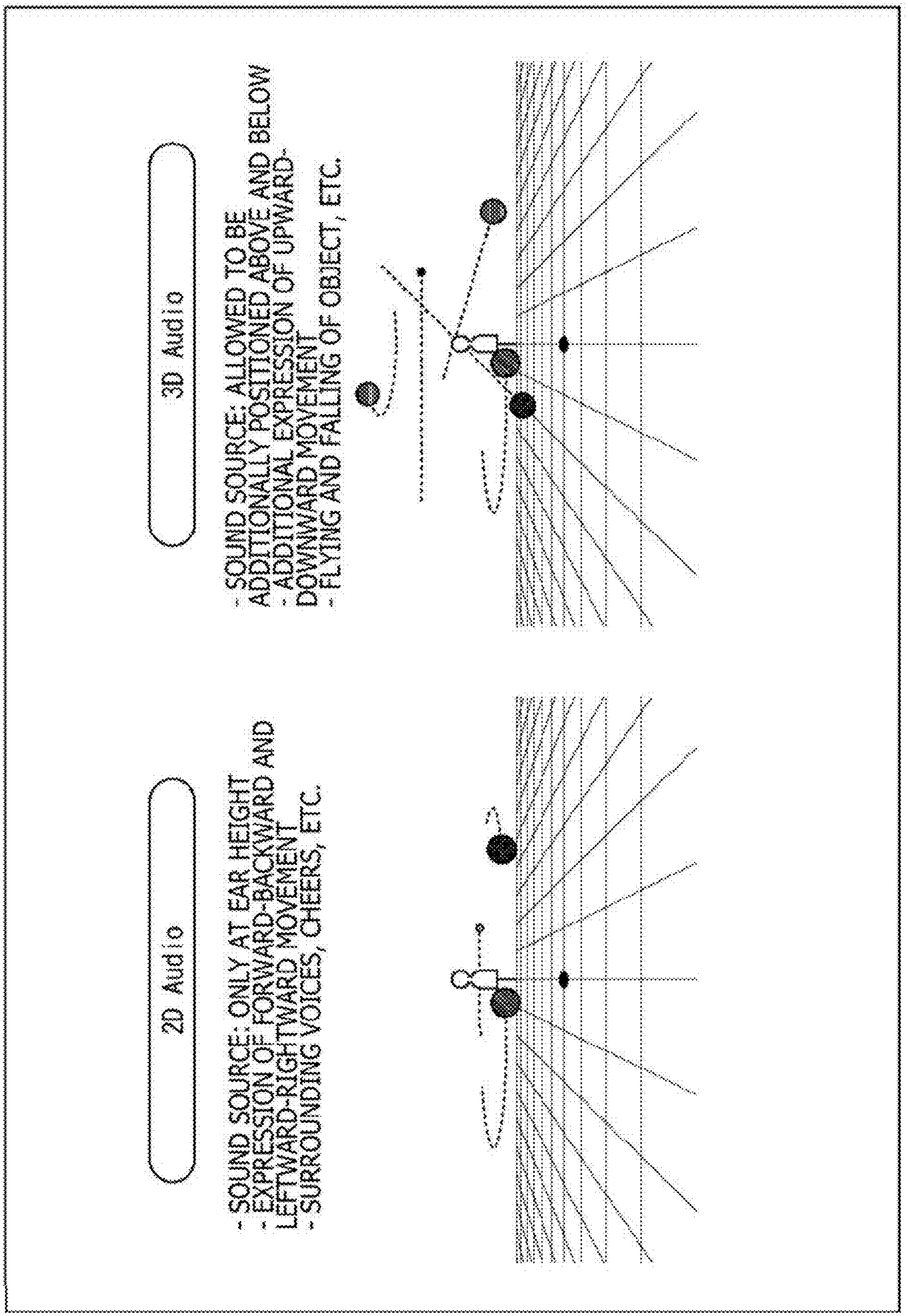
FIG. 1 is a diagram explaining 2D audio and 3D audio.

Initially, 2D audio and 3D audio will be touched upon with reference to FIG. 1.

For example, as depicted in a left part of FIG. 1, a sound source of 2D audio is allowed to be disposed only at a position equivalent to a height of the ears of a listener. In this case, 2D audio is capable of expressing forward-backward and leftward-rightward movement of the sound source.

On the other hand, as depicted in a right part of the figure, an object corresponding to a sound source of 3D audio is allowed to be positioned at a location above or below the height of the ears of the listener. Accordingly, expression of movement in an up-down direction of the sound source (object) is also achievable.

In addition, 3DoF content and 6DoF content are available as content using 3D audio.

For example, in the case of 3DoF content, a user can view and listen to content while rotating his or her head in up-down and left-right directions and oblique directions in a space. Such a type of 3DoF content is also called fixed viewpoint content.

On the other hand, in the case of 6DoF content, the user can view and listen to content while rotating his or her head in the up-down and left-right directions and oblique directions in the space, and also moving toward any position in the space. Such a type of 6DoF content is also called free viewpoint content.

Content which will be described below may be either audio content including only audio, or content including video and audio accompanying this video. It is assumed hereinafter that the respective types of content will be referred to simply as content, without making particular distinction between them. Particularly described hereinafter will be an example which creates 6DoF content, i.e., free viewpoint content. Moreover, it is assumed hereinafter that an audio object will also be referred to simply as an object.

For increasing artistry (musicality) in a process of content creation, some objects are intentionally positioned at locations different from places where these objects are viewed, rather than positioned at physical locations of the objects.

Figure 2:
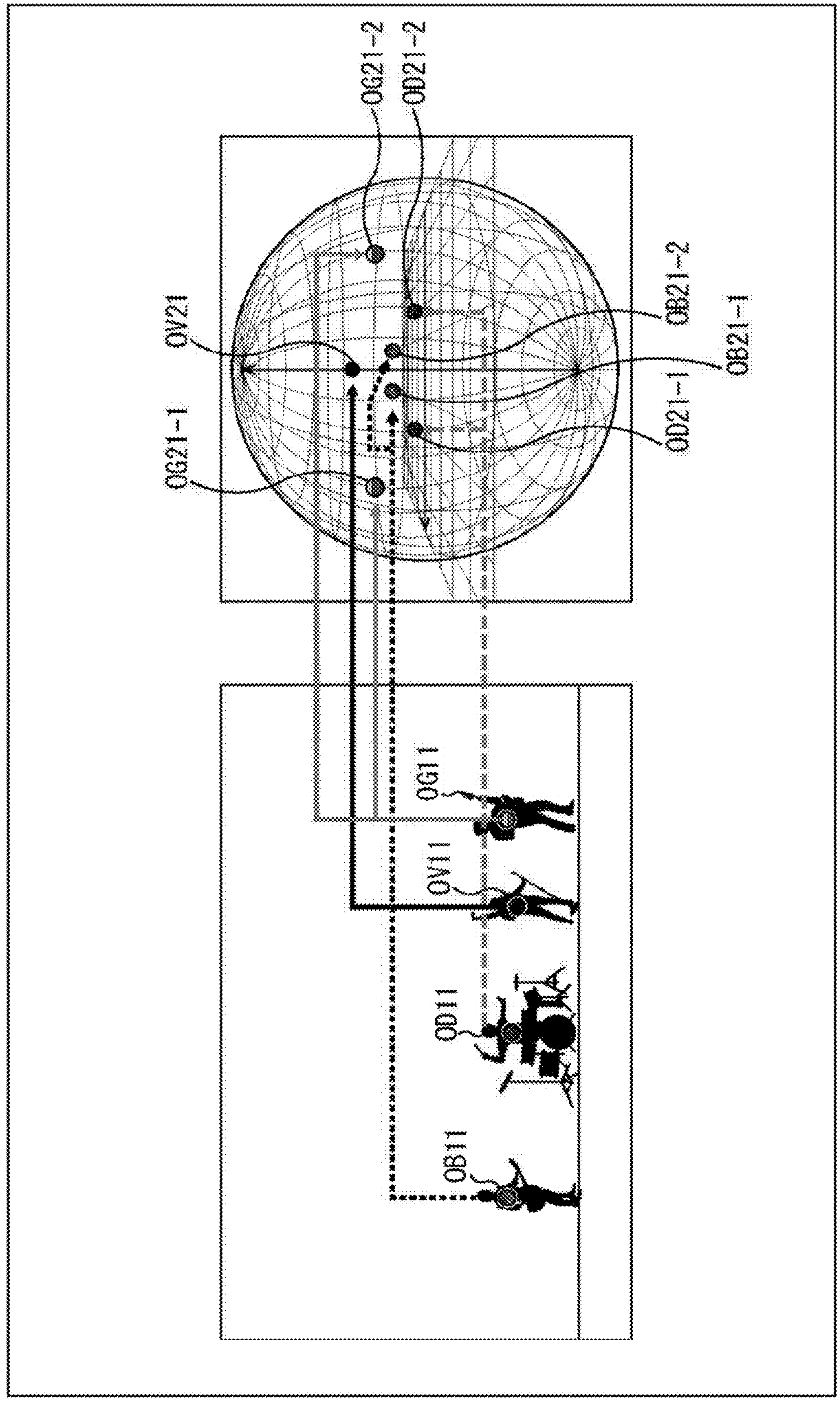
FIG. 2 is a diagram explaining object positioning.

Such a manner of object positioning can easily be expressed using a polar coordinate system object positioning technology. FIG. 2 depicts a difference between positioning of objects in an absolute coordinate system and in a polar coordinate system in an example of actual band performance.

For example, in the case of the example of band performance depicted in FIG. 2, objects (audio objects) corresponding to a vocal and a guitar are not physically positioned at locations of the vocal and the guitar, but are positioned in consideration of musicality.

A left part of FIG. 2 depicts physical positioning locations of band members playing a musical composition in a three-dimensional space, i.e., positioning locations in a physical space (absolute coordinate space). Specifically, an object OV11 is a vocal (vocalist), an object OD11 is a drum, an object OG11 is a guitar, and an object OB11 is a bass guitar.

Particularly in this example, the object OV11 (vocal) is positioned at a location shifted to the right from the front (median plane) of a user corresponding to a listener of content, while the object OG11 (guitar) is positioned in the vicinity of the right end as viewed from the user.

During content creation, objects (audio objects) corresponding to the respective members (musical instruments) of the band are positioned as depicted in a right part of the figure in consideration of musicality. Note that consideration of musicality refers to improvement of listening easiness as a musical composition.

Positioning of the audio objects in the polar coordinate space is depicted in the right part of the figure.

Specifically, an object OV21 represents an audio object corresponding to the object OV11, i.e., a fixed location of a voice (sound) of the vocal.

The object OV11 is positioned on the right side with respect to the median plane. However, considering that the vocal is a key figure in the content, the creator positions the object OV21 corresponding to the vocal at a higher location in the median plane, i.e., at a high position of the center as viewed from the user to achieve a conspicuous polar coordinate expression of the object OV21.

Each of an object OG21-1 and an object OG21-2 is an audio object of a chord accompaniment sound produced by a guitar, the audio object corresponding to the object OG11. Note that, hereinafter, each of the object OG21-1 and the object OG21-2 will also be referred to simply as an object OG21 in a case where no distinction is particularly needed between them.

In this example, the monaural objects OG21 are not each positioned without change at a physical location of the guitarist in a three-dimensional space, i.e., at a location of the object OG11, but are positioned at two left and right locations in the front as viewed from the user in consideration of musical knowledge. Specifically, an audio expression covering the listener (user) is achievable by positioning the objects OG21 at the respective left and right positions in the front as viewed from the user with a distance left between each other. In other words, an expression of a sense of expanse (a sense of covering) is achievable.

Each of an object OD21-1 and an object OD21-2 is an audio object corresponding to the object OD11 (drum), while each of an object OB21-1 and an object OB21-2 is an audio object corresponding to the object OB11 (bass guitar).

Note that, hereinafter, each of the object OD21-1 and the object OD21-2 will also be referred to simply as an object OD21 in a case where no distinction is particularly needed between them. Similarly, each of the object OB21-1 and the object OB21-2 will also be referred to simply as an object OB21 in a case where no distinction is particularly needed between them.

The objects OD21 are positioned at low locations with a distance left between the objects OD21 in the left-right direction as viewed from the user for the purpose of stabilization. The objects OB21 are positioned near the center at locations slightly higher than the drum (objects OD21) for the purpose of stabilization.

In this manner, the creator positions the respective objects in the polar coordinate space in consideration of musicality to create free viewpoint content.

The object positioning in the polar coordinate system in this manner is more suited for creation of free viewpoint content to which artistry (musicality) intended by the creator is added, than object positioning in the absolute coordinate system which determines object locations at unique physical positions. The present technology is a free viewpoint audio technology achievable using object positioning patterns expressed in a plurality of polar coordinate systems on the basis of the object positioning method in the polar coordinate system described above.

Meanwhile, for creation of 3DoF content based on the polar coordinate system object positioning, the creator assumes one listening position within a space and positions each object with use of a polar coordinate system around a center located at a listener (listening position).

At this time, metadata of each object chiefly includes three elements of an Azimuth, an Elevation, and a Gain.

The Azimuth herein is an angle that is formed in the horizontal direction and indicates a position of an object as viewed from the listener. The Elevation is an angle that is formed in a vertical direction and indicates a position of an object as viewed from the listener. The Gain is a gain of audio data of an object.

A creation tool outputs, as deliverables for each object, the metadata described above and audio data (object audio data) for reproducing a sound of the object corresponding to the metadata.

Considered herein will be development of the 3DoF content creation method to free viewpoint (6DoF), i.e., to free viewpoint content.

Figure 3:
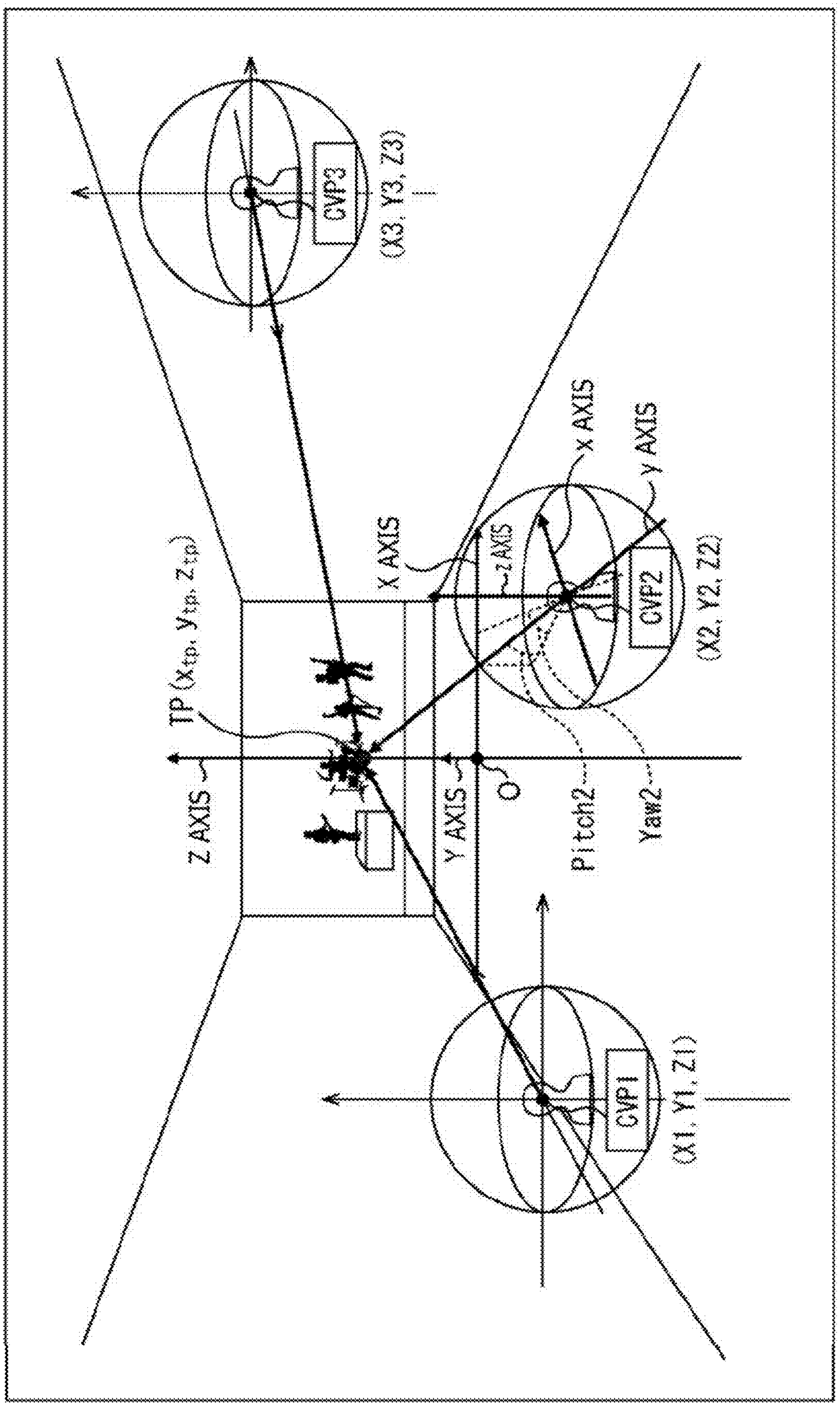
FIG. 3 is a diagram explaining CVPs and a target point TP.

For example, as depicted in FIG. 3, it is assumed that the creator of free viewpoint content defines multiple control viewpoints (hereinafter also referred to as CVPs) which are positions of viewpoints desired to be expressed by the creator within a free viewpoint space (three-dimensional space).

For example, each of CVPs is a location desired to be designated as a listening position during reproduction of the content. It is assumed hereinafter that an ith CVP particularly is expressed also as a CVPi.

In the example depicted in FIG. 3, three CVPs (control viewpoints) of CVP1 to CVP3 are defined within a free viewpoint space where a user corresponding to a listener listens to content.

Assuming herein that a coordinate system of absolute coordinates indicating absolute positions within the free viewpoint space is a common absolute coordinate system, this common absolute coordinate system is a rectangular coordinate system having an origin O at a predetermined position within the free viewpoint space, and axes including an X axis, a Y axis, and a Z axis crossing each other at right angles, as depicted at the center of the figure.

In this example, the X axis represents an axis in a lateral direction, the Y axis represents an axis in a depth direction, and the Z axis represents an axis in a longitudinal direction in the figure. Moreover, the position of the origin O in the free viewpoint space is set at any position according to intention of the creator of the content. Alternatively, this position may be set at the center of a venue assumed as the free viewpoint space, for example.

The coordinates indicating the respective positions of the CVP1 to the CVP3, i.e., the absolute coordinate positions of the respective CVPs, in the common absolute coordinate system herein are (X1, Y1, Z1), (X2, Y2, Z2), and (X3, Y3, Z3), respectively.

In addition, the creator of the content defines one position (one point) in the free viewpoint space as a target point TP assumed to be viewed from all the CVPs. The target point TP is a position as a reference for an interpolation process performed for interpolation of position information associated with the objects. It is particularly assumed that virtual listeners located at the respective CVPs each face in a direction toward the target point TP.

In this example, coordinates (absolute coordinate position) indicating the target point TP in the common absolute coordinate system are ($x_{tp}$, $y_{tp}$, $z_{tp}$).

Moreover, a polar coordinate space around a center located at the position of the CVP (hereinafter referred to also as a CVP polar coordinate space) is formed for each of the CVPs.

A position within each of the CVP polar coordinate spaces is expressed by coordinates (polar coordinates) in a polar coordinate system (hereinafter referred to also as a CVP polar coordinate system) which includes an origin O' located at the position of the CVP, i.e., an absolute coordinate position of the CVP, for example, and an x axis, y axis, and z axis crossing each other at right angles.

Particularly in this example, the y-axis positive direction corresponds to a direction extending from the position of the CVP toward the target point TP, the x axis corresponds to an axis in the left-right direction as viewed from the virtual listener present at the CVP, and the z axis corresponds to an axis in the up-down direction as viewed from the virtual listener present at the CVP.

When each of the CVPs and the target point TP are set (designated) by the content creator, a relation between a Yaw as an angle in the horizontal direction and a Pitch as an angle in the vertical direction is determined as information indicating a positional relation between the corresponding CVP and the target point TP.

The angle "Yaw" in the horizontal direction is a horizontal angle formed by the Y axis of the common absolute coordinate system and the y axis of the CVP polar coordinate system. Specifically, the angle "Yaw" is an angle in the horizontal direction with respect to the Y axis of the common absolute coordinate system, and indicates the orientation of the face of the virtual listener present at the CVP and viewing the target point TP.

In addition, the angle "Pitch" in the vertical direction is an angle formed by the y axis of the CVP polar coordinate system with respect to an X-Y plane containing the X axis and the Y axis of the common absolute coordinate system. Specifically, the angle "Pitch" is an angle in the vertical direction with respect to the X-Y plane of the common absolute coordinate system, and indicates the orientation of the face of the virtual listener present at the CVP and viewing the target point TP.

Specifically, suppose that coordinates indicating the absolute coordinate position of the target point TP are ($x_{tp}$, $y_{tp}$, $z_{tp}$), and that coordinates indicating the absolute coordinate position of the predetermined CVP, i.e., coordinates in the common absolute coordinate system, are ($x_{cvp}$, $y_{cvp}$, $z_{cvp}$).

In this case, the angle "Yaw" in the horizontal direction and the angle "Pitch" in the vertical direction for the CVP are calculated by the following equation (1). In other words, a relation expressed by the following equation (1) holds.

[Math. 1]

$$\mathrm{Yaw} = -1.0 * \mathrm{atan}\,(x_{cvp} - x_{tp})/(y_{cvp} - y_{tp}) \tag{1}$$

$$\mathrm{Pitch} = \mathrm{acos}\left(a/sqrt\left(a^2 + b^2\right)\right)$$

$$\text{where } a = sqrt\left(\,(x_{cvp} - x_{tp})^2 + (y_{cvp} - y_{tp})^2\right.$$

$$b = z_{cvp} - z_{tp}$$

In FIG. 3, for example, an angle "Yaw2" formed by a straight line that is indicated by a dotted line and that is obtained by projecting the y axis of the CVP polar coordinate system of the CVP2 onto the X-Y plane and a straight line that is indicated by a dotted line and that is parallel with the Y axis of the common absolute coordinate system corresponds to an angle "Yaw" in the horizontal direction calculated by the equation (1) for the CVP2. Similarly, an angle "Pitch2" formed by the y axis of the CVP polar coordinate system of the CVP2 and the X-Y plane corresponds to an angle "Pitch" in the vertical direction calculated by the equation (1) for the CVP2.

A transmission side (generation side) of the free viewpoint content transfers, as configuration information, CVP position information indicating the absolute coordinate position of the CVP in the common absolute coordinate system, and CVP orientation information containing the Yaw and the Pitch calculated by the equation (1) for the CVP, to a reception side (reproduction side).

Note that the coordinates (absolute coordinate value) indicating the target point TP in the common absolute coordinate system may be transferred from the transmission side to the reception side as alternative means for transferring the CVP orientation information. Specifically, target point information indicating the target point TP in the common absolute coordinate system (free viewpoint space) may be stored in the configuration information instead of the CVP orientation information. In such a case, the reception side (reproduction side) calculates the Yaw and the Pitch with use of the equation (1) described above for each of the CVPs on the basis of the received coordinates indicating the target point TP.

Moreover, the CVP orientation information may contain not only the Yaw and the Pitch of the CVP but also a rotation angle (Roll) in the CVP polar coordinate system with respect to the common absolute coordinate system as an angle of rotation around a rotation axis corresponding to the y axis in the CVP polar coordinate system. It is assumed hereinafter that the Yaw, the Pitch, and the Roll contained in the CVP orientation information will particularly be referred to also as CVP Yaw information, CVP Pitch information, and CVP Roll information, respectively.

The CVP orientation information will further be described herein while focusing on the CVP3 depicted in FIG. 3.

Figure 4:
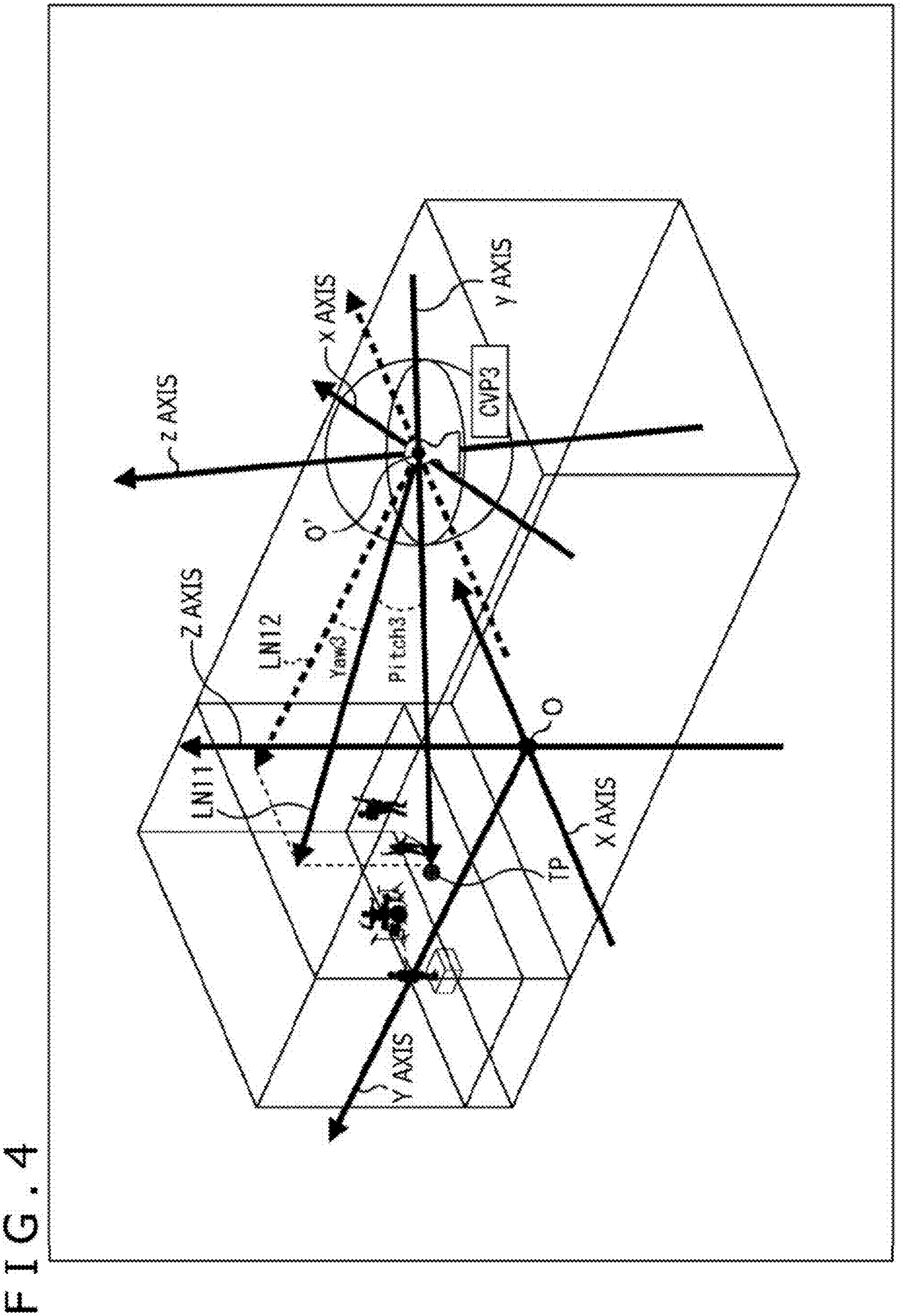
FIG. 4 is a diagram explaining a positional relation between the target point TP and a CVP.

FIG. 4 presents a positional relation between the target point TP and the CVP3 depicted in FIG. 3.

When the CVP3 is set (designated), a CVP polar coordinate system around a center located at the CVP3, i.e., one polar coordinate space, is defined. In this polar coordinate space, a direction toward the target point TP as viewed from the CVP3 corresponds to a direction toward the median plane (a direction where both the angle Azimuth in the horizontal direction and the angle Elevation in the vertical direction are 0). In other words, the direction extending from the CVP3 toward the target point TP corresponds to the y-axis positive direction in the CVP polar coordinate system around the center located at the CVP3.

Assuming herein that a plane which contains the CVP3, i.e., the origin O' of the CVP polar coordinate system of the CVP3, and is parallel with the X-Y plane containing the X axis and the Y axis of the common absolute coordinate system is an X'-Y' plane, a line LN11 is a straight line obtained by projecting the y axis of the CVP polar coordinate system of the CVP3 onto the X'-Y' plane. Moreover, a line LN12 is a straight line which is contained in the X'-Y' plane and is parallel with the Y axis of the common absolute coordinate system.

In this case, an angle "Yaw3" formed by the line LN11 and the line LN12 corresponds to CVP Yaw information associated with the CVP3 and calculated by the equation (1), while an angle "Pitch3" formed by the y axis and the line LN11 corresponds to CVP Pitch information associated with the CVP3 and calculated by the equation (1).

The CVP orientation information including the CVP Yaw information and the CVP Pitch information thus obtained is information indicating a direction where the virtual listener located at the CVP3 faces, i.e., a direction from the CVP3 toward the target point TP in the free viewpoint space. In other words, the CVP orientation information is considered to be information indicating a relative relation between orientations (directions) in the common absolute coordinate system and the CVP polar coordinate system.

In addition, when the CVP polar coordinate system of each of the CVPs is determined, a relative positional relation expressed using the angle Azimuth in the horizontal direction and the angle Elevation in the vertical direction, each indicating the position (direction) of the corresponding object as viewed from the corresponding CVP, holds between the corresponding CVP and each of the objects (audio objects).

Figure 5:
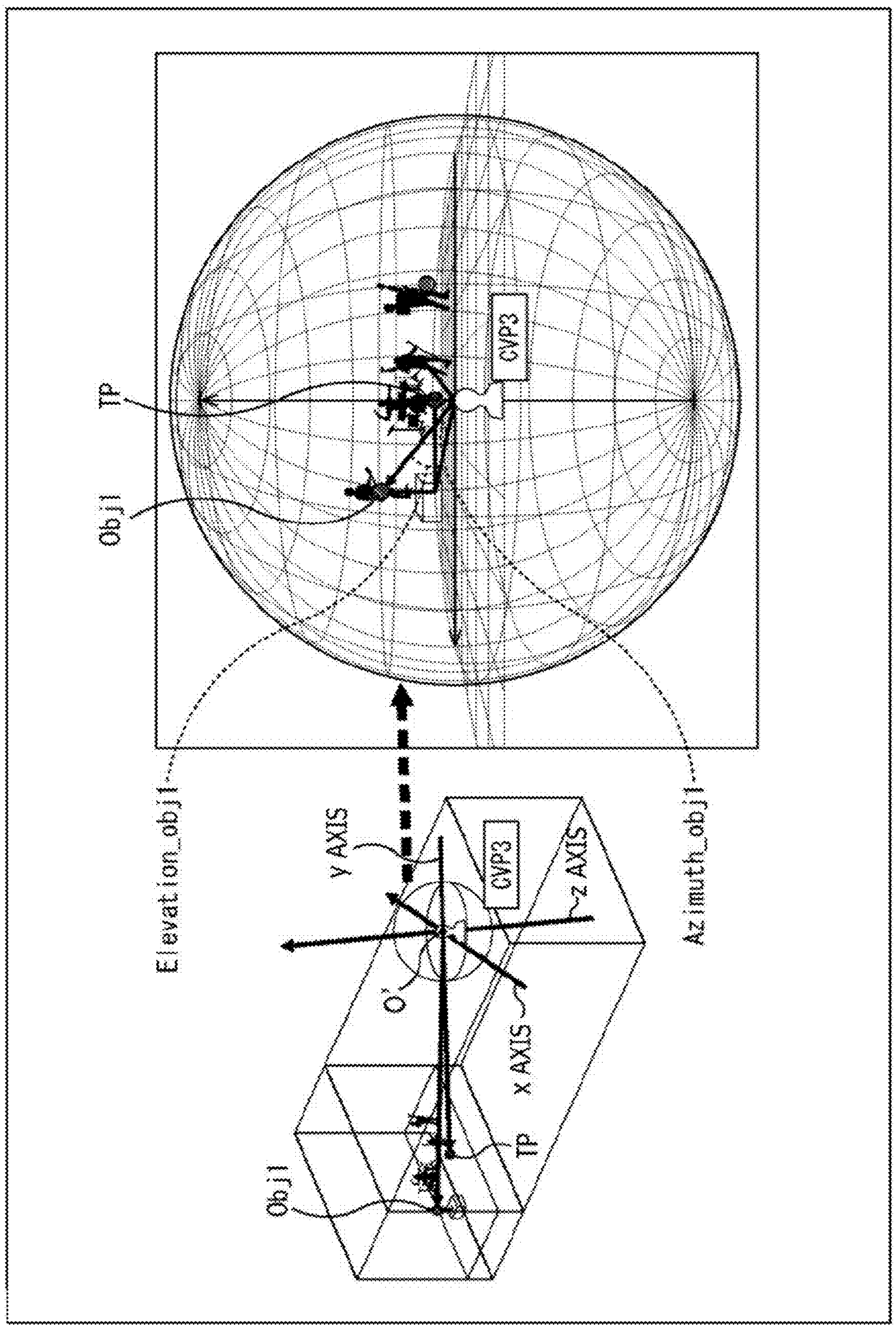
FIG. 5 is a diagram explaining object positioning.

A relative position of a predetermined object as viewed from the CVP3 will be described with reference to FIG. 5. Note that FIG. 5 depicts the same positional relation between the target point TP and the CVP3 as that positional relation depicted in FIG. 3.

In this example, four audio objects including an object obj1 are positioned within the free viewpoint space.

A state of the entire free viewpoint space is depicted in a left part of the figure. Particularly in this example, the object obj1 is positioned in the vicinity of the target point TP.

The creator of the content is capable of determining (designating) a positioning location of an object for respective CVPs in such a manner that this object is positioned at a different absolute positioning location in the free viewpoint space for each of the CVPs.

For example, the creator is capable of individually designating the positioning location of the object obj1 in the free viewpoint space as viewed from the CVP1 and the positioning location of the object obj1 in the free viewpoint space as viewed from the CVP3. These positioning locations do not necessarily coincide with each other.

A right part of the figure depicts a state when the target point TP and the object obj1 are viewed from the CVP3 in the CVP polar coordinate space of the CVP3. It is apparent from the figure that the object obj1 is positioned in the left front as viewed from the CVP3.

In this case, a relative positional relation determined by an angle in the horizontal direction Azimuth_obj1 and an angle in the vertical direction Elevation_obj1 is established between the CVP3 and the object obj1. In other words, the relative position of the object obj1 as viewed from the CVP3 can be expressed by coordinates (polar coordinates) that are defined in the CVP polar coordinate system and that include the angle in the horizontal direction Azimuth_obj1 and the angle in the vertical direction Elevation_obj1.

Object positioning based on such a polar coordinate expression is the same as the positioning method used for 3DoF content creation. In other words, the present technology is capable of achieving object positioning of 6DoF content with use of a polar coordinate expression similar to that of 3DoF content.

As described above, the present technology is capable of positioning objects within the three-dimensional space for each of a plurality of CVPs set in the free viewpoint space, by using the same method as the method for 3DoF content. In this manner, object positioning patterns corresponding to a plurality of CVPs are formed.

During creation of free viewpoint content, the creator designates positioning locations of all objects for each of CVPs set by the creator.

Note that positioning patterns of objects for each of CVPs are not limited to patterns handling only one of the CVPs. An identical positioning pattern may be applied to a plurality of CVPs. In this manner, object positions can be designated for a plurality of CVPs in a wider range within the free viewpoint space while efficiently reducing creation costs.

Figure 6:
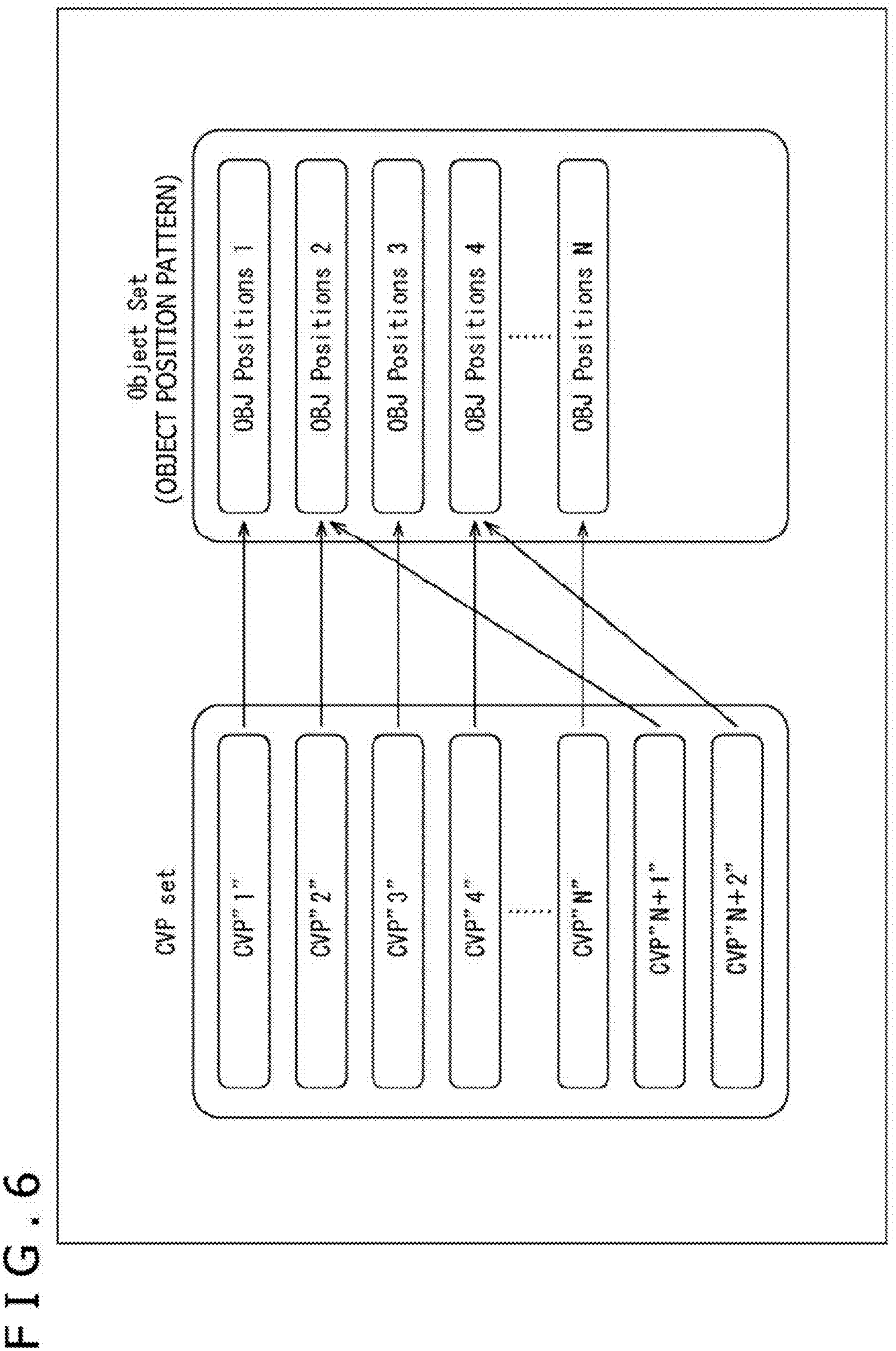
FIG. 6 is a diagram explaining CVPs and object positioning patterns.

FIG. 6 presents an example of association between configuration information (CVP set) for managing CVPs and object position patterns (Object Sets).

(N+2) CVPs are depicted in a left part of the figure. Information associated with the (N+2) CVPs is stored in the configuration information. Specifically, for example, the configuration information contains CVP position information and CVP orientation information for each of the CVPs.

On the other hand, N object position patterns, i.e., object positioning patterns, different from each other are presented in a right part of the figure.

For example, object position pattern information indicated by a character "OBJ Positions 1" represents positioning locations of all objects in the CVP polar coordinate system in a case where the objects are positioned in one particular positioning pattern determined by the creator or the like.

Accordingly, for example, the positioning pattern of the objects indicated by "OBJ Positions 1" is different from a positioning pattern of the objects indicated by "OBJ Positions 2."

Moreover, arrows directed from the respective CVPs indicated in the left part toward the object position patterns indicated in the right part in the figure each represent a link relation between the CVPs and the object position patterns. According to the present technology, combination patterns of the information associated with the respective CVPs and the position information associated with the objects are present independently of each other, and are provided to manage the relation between the CVPs and the object positions by linking as presented in FIG. 6.

Specifically, according to the present technology, an object metadata set is prepared for each of the positioning patterns of the objects, for example.

The object metadata set includes object metadata for the corresponding one of the objects, for example. Each object metadata contains object position information associated with the object corresponding to the positioning pattern.

This object position information includes polar coordinates or the like indicating a positioning location of the corresponding object in the CVP polar coordinate system, for example, in a case where the object is positioned in the corresponding positioning pattern. More specifically, for example, the object position information is coordinate information that is expressed by coordinates (polar coordinates) in a polar coordinate system similar to the CVP polar coordinate system, and that indicates the object position as viewed from the CVP when the direction from the CVP toward the target point TP in the free viewpoint space is the direction toward the median plane.

Further stored in the configuration information is a metadata set index indicating the object metadata set corresponding to the object position pattern (object positioning pattern) set by the creator for the corresponding CVP for each of the CVPs. In addition, the reception side (reproduction side) obtains the object metadata set in the corresponding object position pattern on the basis of the metadata set index contained in the configuration information.

Linking the CVP and the object position pattern (object metadata set) according to the metadata set index described above is considered as retainment of mapping information between the CVP and the object position pattern. In this manner, data management and visual recognizability of a format on a mounting surface further improve, and reduction of a memory volume is also achievable.

For example, if the object metadata set is prepared for each object position pattern, the creator of the content is allowed to use combination patterns of the object position information associated with a plurality of existing objects as object position patterns shared by a plurality of CVPs, during handling of a creation tool.

Specifically, for example, the object position pattern indicated by "OBJ Positions 2" presented in the right part of the figure is designated for the CVP2 presented in the let part in the figure. In this state, the object position pattern indicated by "OBJ Positions 2" identical to the object position pattern of the CVP2 can also be designated for CVPN+1.

In this case, the object position pattern referred to by the CVP2 (associated with the CVP2), and the object position pattern referred to by the CVPN+1 are both constituted by the same pattern of "OBJ Positions 2." Accordingly, a relative positioning location of the object indicated by "OBJ Positions 2" as viewed from the CVP2 is the same as a relative positioning location of the object indicated by "OBJ Positions 2" as viewed from the CVPN+1.

However, the positioning location of the object indicated by "OBJ Positions 2" at the CVP2 in the free viewpoint space is different from the positioning location of the object indicated by "OBJ Positions 2" at the CVPN+1 in the free viewpoint space. These positions are different from each other for the following reason. For example, the object position information associated with the object position pattern "OBJ Positions 2" is expressed by polar coordinates in the polar coordinate system. In this case, the position of the origin and the direction of the y axis (the direction toward the median plane) of the polar coordinate system in the free viewpoint space at the time of reference to "OBJ Positions 2" at the CVP2 are different from the position and direction at the time of reference to "OBJ Positions 2" at the CVPN+1. In other words, the position of the origin and the direction of the y axis in the CVP polar coordinate system for the CVP2 are different from the position and direction for the CVPN+1.

Moreover, while the N object position patterns are prepared in this example, the CVPs and the object metadata do not require complicated management even after additional generation of new object position patterns. Accordingly, systematic processing is achievable. As a result, visual recognizability of data in software improves, and facilitation of mounting is achievable.

According to the present technology, as described above, 6DoF content (free viewpoint content) can be created only by positioning objects in polar coordinates in association with respective CVPs, with use of the 3DoF method.

An audio data group corresponding to objects and used at the respective CVPs is selected by the content creator. The audio data are available as common data for the plurality of CVPs. Note that audio data corresponding to objects and used at only particular CVPs may be added.

Less redundant transfer is thus achievable by controlling positions, gains, or the like of the objects for each of the CVPs with use of the audio data common to the respective CVPs in this manner.

A creation tool for generating 6DoF content (free viewpoint content) according to an operation by the creator outputs two types of data structures called configuration information and an object metadata set in the form of a file or binary data.

FIG. 7 is a diagram presenting a format (syntax) example of the configuration information.

In the example presented in FIG. 7, the configuration information contains a frame length index "FrameLengthIndex," number-of-object information "NumOfObjects," number-of-CVP information "NumOfControlViewpoints," and number-of-metadata-set information "NumOfObjectMetaSets."

The frame length index "FrameLengthIndex" is an index indicating a length of one frame of audio data for reproducing sounds of an object, i.e., indicating the number of samples constituting one frame.

For example, FIG. 8 presents a correspondence between respective values of the frame length index "FrameLengthIndex" and frame lengths indicated by the frame length index.

According to this example, in a case where the value of the frame length index is "5," for example, the frame length is set to "1024." In other words, one frame includes 1024 samples.

Description is now returned to FIG. 7. The number-of-object information "NumOfObjects" is information indicating the number of pieces of audio data constituting content, i.e., the number of objects (audio objects). The number-of-CVP information "NumOfControlViewpoints" is information indicating the number (number of pieces) of CVPs set by the creator. The number-of-metadata-set information "NumOfObjectMetaSets" is information indicating the number (number of pieces) of object metadata sets.

Moreover, the configuration information contains, as information associated with the CVPs, the same number of pieces of CVP information "ControlViewpointInfo(i)" as the number of CVPs indicated by the number-of-CVP information "NumOfControlViewpoints." In other words, the CVP information is stored for each of the CVPs set by the creator.

Further stored in the configuration information is coordinate mode information "CoordinateMode[i][j]," for each of the CVPs, as flag information indicating a description method of the object position information contained in the object metadata for each object.

For example, a value "0" of the coordinate mode information indicates that the object position information is described using absolute coordinates in the common absolute coordinate system. On the other hand, a value "1" of the coordinate mode information indicates that the object position information is described using polar coordinates in the CVP polar coordinate system. Note that the following description continues on an assumption that the value of the coordinate mode information is "1."

In addition, FIG. 9 presents an example of a format (syntax) of CVP information "ControlViewpointInfo(i)" contained in the configuration information.

In this example, the CVP information contains a CVP index "ControlViewpointIndex[i]" and a metadata set index "AssociatedObjectMetaSetIndex[i]."

The CVP index "ControlViewpointIndex[i]" is index information for identifying the CVP corresponding to the CVP information.

The metadata set index "AssociatedObjectMetaSetIndex[i]" is index information (designation information) indicating the object metadata set designated by the creator for the CVP indicated by the CVP index. In other words, the metadata set index is information indicating the object metadata set associated with the CVP.

Moreover, the CVP information contains CVP position information and CVP orientation information.

Specifically, stored as the CVP position information are an X coordinate "CVPosX[i]," a Y coordinate "CVPosY[i]," and a Z coordinate "CVPosZ[i]" each indicating a position of the CVP in the common absolute coordinate system.

Furthermore, stored as the CVP orientation information are CVP Yaw information "CVYaw[i]," CVP Pitch information "CVPitch[i]," and CVP Roll information "CVRoll[i]."

FIG. 10 is a diagram presenting an example of the object metadata sets, more specifically, a format (syntax) example of an object metadata set group.

In this example, "NumOfObjectMetaSets" indicates the number of stored object metadata sets. The number of object metadata sets can be acquired from the number-of-metadata-set information contained in the configuration information. Moreover, "ObjectMetaSetIndex[i]" indicates an index of the object metadata set, while "NumOfObjects" indicates the number of objects.

"NumOfChangePoints" indicates the number of change points each corresponding to a time of a change of the contents of the corresponding object metadata set.

In this example, no object metadata set is stored between change points. Moreover, a frame index "frame_index[i][j][k]" for identifying the change point, "PosA[i][j][k]," "PosB[i][j][k]," and "PosC[i][j][k]" each indicating the position of the object, and a gain "Gain[i][j][k]" of the object are stored for each change point of the corresponding object for each of the object metadata sets. The gain "Gain[i][j][k]" is a gain of the object (audio data) as viewed from the CVP.

The frame index "frame_index[i][j][k]" is an index indicating a frame of audio data associated with the object and corresponding to the change point. The reception side (reproduction side) identifies a sample position of the audio data corresponding to the change point on the basis of the frame index "frame_index[i][j][k]" and the frame length index "FrameLengthIndex" contained in the configuration information.

The positions "PosA[i][j][k]," "PosB[i][j][k]," and "PosC[i][j][k]" each indicating the position of the object represent an angle Azimuth in the horizontal direction, an angle Elevation in the vertical direction, and a radius Radius, respectively, each indicating the position (polar coordinates) of the object in the CVP polar coordinate system. In other words, information including "PosA[i][j][k]," "PosB[i][j][k]," and "PosC[i][j][k]" corresponds to the object position information.

Note that the value of the coordinate mode information herein is assumed to be "1." In a case where the value of the coordinate mode information is "0," "PosA[i][j][k]," "PosB[i][j][k]," and "PosC[i][j][k]" correspond to an X coordinate, a Y coordinate, and a Z coordinate, respectively, indicating the position of the object in the common absolute coordinate system.

As described above, a frame index for each object, and object position information and gains associated with the respective objects are stored for each change point in each of the object metadata sets in the format presented in FIG. 10.

The position of each of the objects may constantly be fixed or may dynamically be changeable in a time direction.

According to the format example depicted in FIG. 10, each time position corresponding to a change of the object position, i.e., each position of the change points described above, is recorded as a frame index "frame_index[i][j][k]." Moreover, the object position information and the gain between the change points are obtained by an interpolation process using lines on the basis of the object position information and the gain at each of the change points on the reception side (reproduction side), for example.

As described above, a dynamic change of the object position is handleable by adopting the format presented in FIG. 10, and therefore, the necessity of retaining data for entire times (frames) is eliminated. Accordingly, the file size can be reduced.

Figure 11:
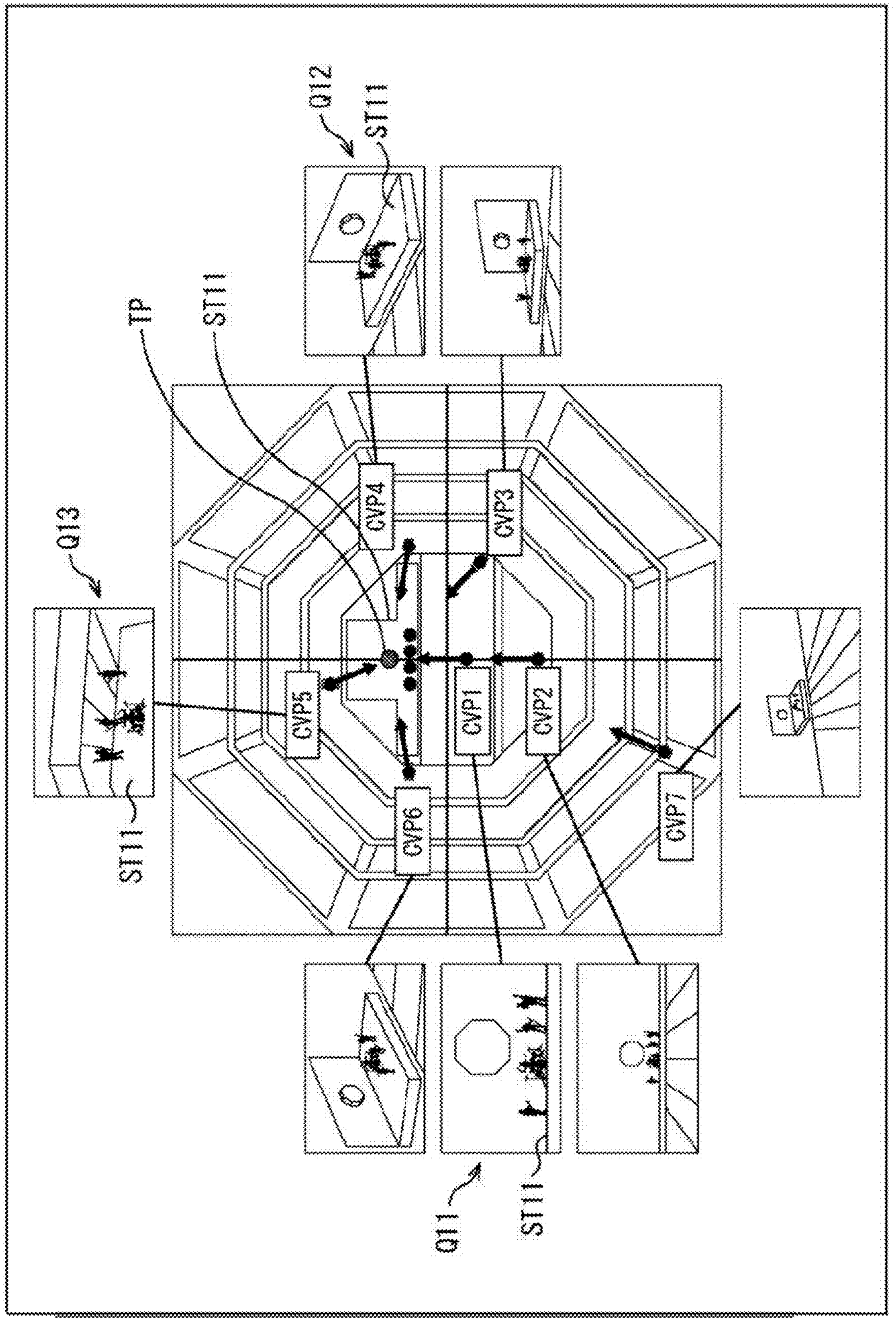
FIG. 11 is a diagram depicting a positioning example of CVPs in a free viewpoint space.

FIG. 11 depicts a positioning example of CVPs in the free viewpoint space during creation of actual live content as free viewpoint content.

In this example, a space covering an entire live show venue corresponds to the free viewpoint space. In the live show venue, artists as objects perform musical compositions, for example, on a stage ST11. Moreover, audience seats are provided in such a manner as to surround the stage ST11 in the live show venue.

The position of the origin O in the free viewpoint space, i.e., in the common absolute coordinate system, is set according to intention of the creator of the content. In this example, however, the origin O is located at the center of the live show venue.

Furthermore, according to this example, the creator sets the target point TP on the stage ST11 and seven CVPs of CVP1 to CVP7 in the live show venue.

As described above, each of the directions from the respective CVPs toward the target point TP is designated as a direction toward the median plane for each of the CVPs (CVP polar coordinate systems).

Accordingly, for a user facing in the direction toward the target point TP with the viewpoint position (listening position) set to the CVP1, for example, content pictures are presented as if the user is viewing the stage ST11 right in front of the stage ST11 as indicated by an arrow Q11.

Similarly, for a user facing in the direction toward the target point TP with the viewpoint position set to the CVP4, for example, content pictures are presented as if the user is viewing the stage ST11 obliquely from the front of the stage ST11 as indicated by an arrow Q12. Furthermore, for a user facing in the direction toward the target point TP with the viewpoint position set to the CVP5, for example, content pictures are presented as if the user is viewing the stage ST11 obliquely from the back of the stage ST11 as indicated by an arrow Q13.

In a case of creation of such free viewpoint content, object positioning work for one CVP by the creator is equivalent to 3DoF content creation work.

In the example depicted in FIG. 11, the creator of the free viewpoint content is only required to set further six CVPs and perform object positioning work for the CVPs in addition to the object positioning work for the one CVP to handle 6DoF. According to the present technology, therefore, creation of free viewpoint content is achievable by performing work similar to the work for 3DoF content.

Meanwhile, reverberation components in a space are originally generated by physical propagation or reflection in the space.

Figure 12:
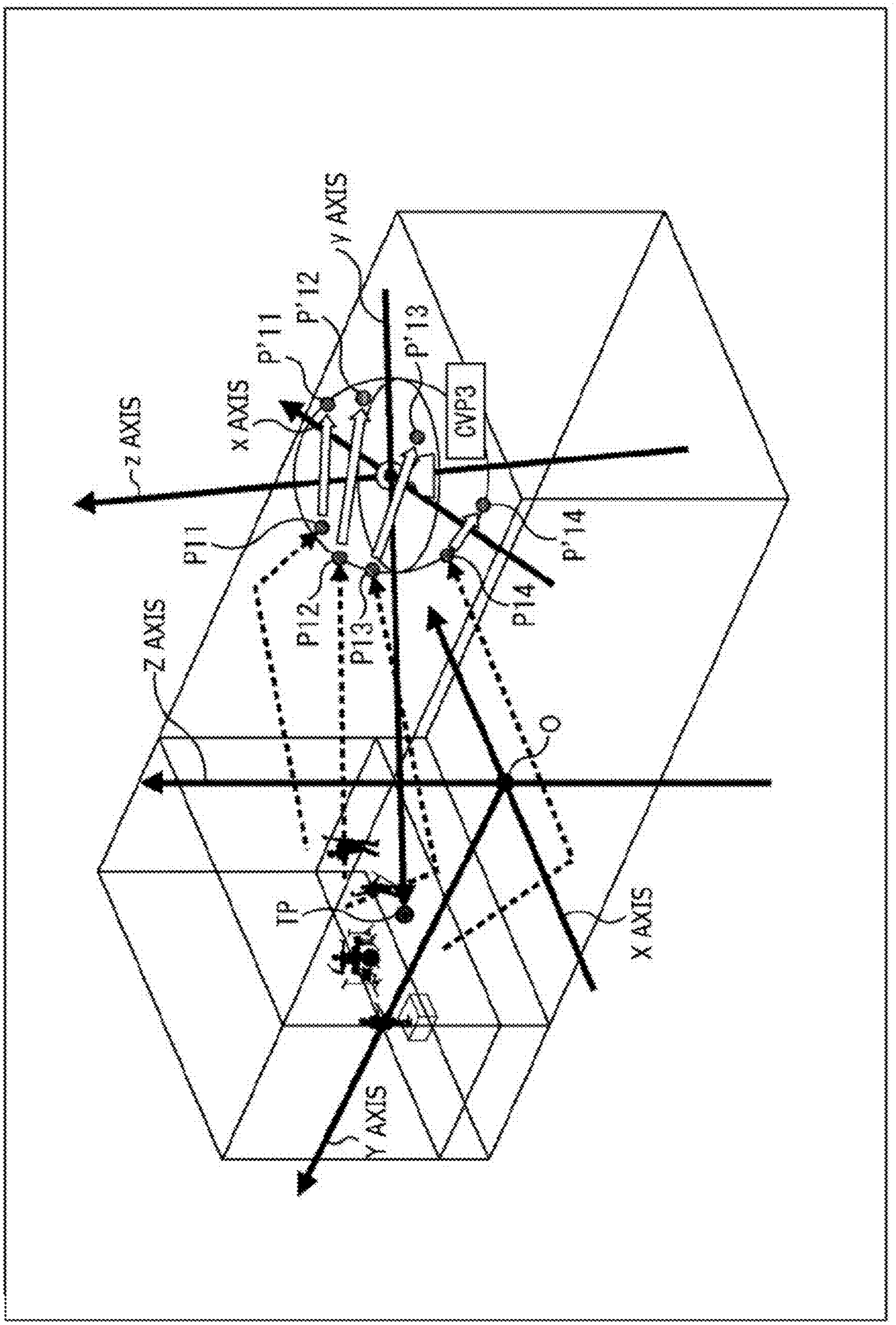
FIG. 12 is a diagram depicting a positioning example of reverberation objects.

Accordingly, in a case where physical reverberation components reaching by reflection or propagation within a concert venue as a free viewpoint space are regarded as objects, reverberation objects in a CVP polar coordinate system (CVP polar coordinate space) are positioned as depicted in FIG. 12, for example. Note that FIG. 12 depicts a positional relation between the target point TP and the CVP3 in a manner similar to that depicted in FIG. 3.

In FIG. 12, reverberation sounds that are generated from sound sources (players) near the target point TP and that travel toward the CVP3 are indicated by dotted arrows. In other words, the arrows in the figure represent physical reverberation paths. Particularly, four reverberation paths are illustrated herein.

Accordingly, if these reverberation sounds are positioned in the CVP polar coordinate space of the CVP3 as reverberation objects without change, the respective reverberation objects are positioned at locations P11 to P14.

In a case where signals having intense reverberation components in a narrow region (free viewpoint space) are used without change as described above, a higher sense of realism can be offered. However, cancellation of original music signals caused by reverberation often lowers musicality.

By adopting object positioning in the CVP polar coordinate system by the creation tool of the present technology, the content creator can handle reverberation components as objects (reverberation objects), determine coming directions considered to be optimal in view of musicality, and position the objects according to a determination result. In this manner, production of reverberation effects in the space is achievable.

Specifically, in a case where the CVP3 is designated as a listening position, for example, sounds chiefly including reverberation sounds concentrate on a narrow region in a front part of the concert venue if the reverberation objects are positioned at the locations P11 to P14. Accordingly, the creator positions these reverberation objects at locations P'11 to P'14 at the back of the listener present at the CVP3. In other words, the positioning locations of the reverberation objects are shifted from the locations P11 to P14 to the locations P'11 to P'14 to add musicality in consideration of reverberation paths or the like.

As described above, cancellation by reverberation components, i.e., difficulty in listening to music itself, is avoidable by intentionally positioning the entire reverberation objects at the back of the listener.

Configuration Example of Information Processing Device

An information processing device which provides the creation tool and creates the free viewpoint content described above will subsequently be described.

Figure 13:
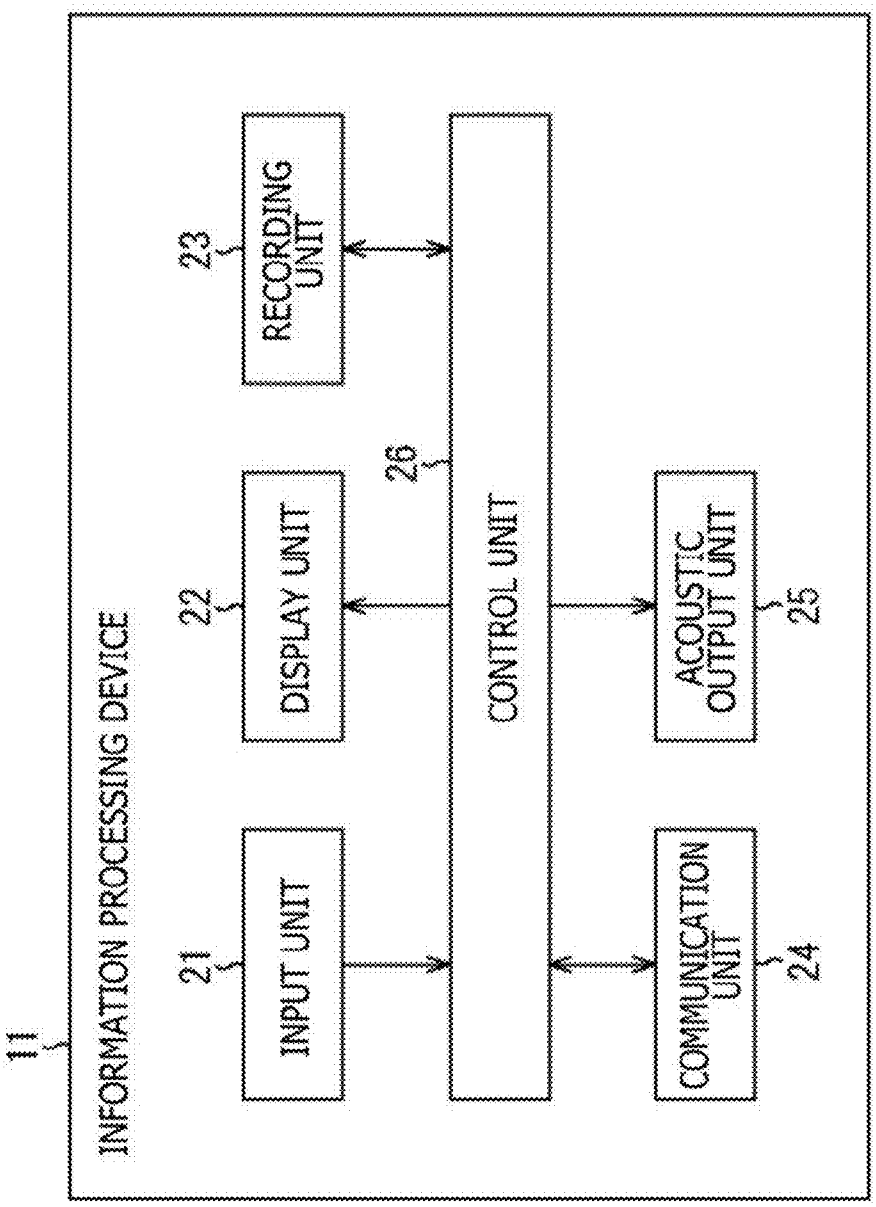
FIG. 13 is a diagram depicting a configuration example of an information processing device.

Such an information processing device includes a personal computer or the like, for example, and has a configuration depicted in FIG. 13.

An information processing device 11 depicted in FIG. 13 includes an input unit 21, a display unit 22, a recording unit 23, a communication unit 24, an acoustic output unit 25, and a control unit 26.

For example, the input unit 21 includes a mouse, a keyboard, a touch panel, a button, a switch, and the like and supplies a signal corresponding to an operation performed by the content creator to the control unit 26. The display unit 22 displays any image such as a display screen of the content creation tool under control by the control unit 26.

The recording unit 23 retains various types of data recorded therein, such as audio data of respective objects for content creation, and configuration information and object metadata sets supplied from the control unit 26, and supplies recorded data to the control unit 26 as necessary.

The communication unit 24 communicates with external devices such as a server. For example, the communication unit 24 transmits data supplied from the control unit 26 to the server or the like, and also receives data transmitted from the server or the like and supplies the data to the control unit 26.

The acoustic output unit 25 includes a speaker, for example, and outputs sounds on the basis of audio data supplied from the control unit 26.

The control unit 26 controls overall operations of the information processing device 11. For example, the control unit 26 generates (creates) free viewpoint content on the basis of a signal supplied from the input unit 21 according to an operation performed by the creator.

<Description of Content Creation Process>

Operations performed by the information processing device 11 will subsequently be described. Specifically, a content creation process performed by the information processing device 11 will hereinafter be described with reference to a flowchart presented in FIG. 14.

For example, when the control unit 26 reads and executes a program recorded in the recording unit 23, the creation tool for creating free viewpoint content operates.

After the creation tool is started, the control unit 26 supplies predetermined image data to the display unit 22 and causes the display unit 22 to display a display screen of the creation tool. For example, an image of a free viewpoint space or the like is displayed in the display screen.

Moreover, for example, the control unit 26 reads, from the recording unit 23, audio data of respective objects constituting free viewpoint content to be created from now on as necessary according to an operation performed by the creator, and supplies the read audio data to the acoustic output unit 25 to reproduce sounds of the objects.

The creator operates the input unit 21 while listening to the sounds of the objects and checking the image or the like that indicates the free viewpoint space and is displayed in the display screen as necessary, to carry out an operation for content creation.

In step S11, the control unit 26 sets the target point TP.

For example, the creator designates any position (point) in the free viewpoint space as the target point TP by operating the input unit 21.

When the operation for designating the target point TP is performed by the creator, a signal corresponding to the operation performed by the creator is supplied from the input unit 21 to the control unit 26. Accordingly, the control unit 26 designates, as the target point TP, a position included in the free viewpoint space and designated by the creator, on the basis of the signal supplied from the input unit 21. In other words, the control unit 26 sets the target point TP.

Note that the control unit 26 may set the position of the origin O in the free viewpoint space (common absolute coordinate system) according to an operation performed by the creator.

In step S12, the control unit 26 sets each of the number of CVPs and the number of object metadata sets to 0. Specifically, the control unit 26 sets the number-of-CVP information "NumOfControlViewpoints" to 0 and sets the number-of-metadata-set information "NumOfObjectMetaSets" to 0.

In step S13, the control unit 26 determines whether or not an editing mode selected by an operation performed by the creator is a CVP editing mode, on the basis of a signal received from the input unit 21.

It is assumed herein that the editing mode includes a CVP editing mode for editing CVPs, an object metadata set editing mode for editing object metadata sets, and a linking editing mode for associating (linking) the CVPs with the object metadata sets.

In a case of determination that the selected mode is the CVP editing mode in step S13, the control unit 26 determines in step S14 whether or not to change the CVP configuration.

For example, in a case where the creator performs an operation for adding (setting) a new CVP or issuing an instruction of deletion of an existing CVP in the CVP editing mode, it is determined that the CVP configuration is to be changed.

In a case where it is determined in step S14 that the CVP configuration is not to be changed, the process returns to step S13 to repeat the processing described above.

On the other hand, in a case of determination that the CVP configuration is to be changed in step S14, the process then proceeds to step S15.

In step S15, the control unit 26 updates the number of CVPs on the basis of a signal supplied from the input unit 21 according to an operation performed by the creator.

For example, in a case where the creator performs an operation for adding (setting) a new CVP, the control unit 26 updates the number of CVPs by adding 1 to the value of the number-of-CVP information "NumOfControlViewpoints" currently retained. On the other hand, in a case where the creator performs an operation for deleting one existing CVP, for example, the control unit 26 updates the number of CVPs by subtracting 1 from the value of the number-of-CVP information "NumOfControlViewpoints" currently retained.

In step S16, the control unit 26 edits the CVPs according to an operation performed by the creator.

For example, when an operation for designating (adding) a CVP is performed by the creator, the control unit 26 designates, as the position of the CVP newly added, a position designated by the creator in the free viewpoint space, on the basis of a signal supplied from the input unit 21. In other words, the control unit 26 sets a new CVP. Moreover, when an operation for deleting any of the CVPs is performed by the creator, the control unit 26 deletes the CVP designated by the creator in the free viewpoint space, on the basis of a signal supplied from the input unit 21.

After editing of the CVP is completed, the process then returns to step S14 to repeat the processing described above. Specifically, editing of the CVP is newly performed.

Moreover, in a case of determination that the selected mode is not the CVP editing mode in step S13, the control unit 26 determines in step S17 whether or not the selected mode is the object metadata set editing mode.

In a case of determination that the selected mode is the object metadata set editing mode in step S17, the control unit 26 determines in step S18 whether or not to change the object metadata sets.

For example, in a case where the creator performs an operation for adding (setting) a new object metadata set or issuing an instruction of deletion of an existing object metadata set in the object metadata set editing mode, it is determined that the object metadata sets are to be changed.

In a case where it is determined in step S18 that the object metadata sets are not to be changed, the process returns to step S13 to repeat the processing described above.

On the other hand, in a case of determination that the object metadata sets are to be changed in step S18, the process then proceeds to step S19.

In step S19, the control unit 26 updates the number of object metadata sets on the basis of a signal supplied from the input unit 21 according to an operation performed by the creator.

For example, in a case where the creator performs an operation for adding (setting) a new object metadata set, the control unit 26 updates the number of object metadata sets by adding 1 to the value of the number-of-metadata-set information "NumOfObjectMetasets" currently retained. On the other hand, in a case where the creator performs an operation for deleting one existing object metadata set, for example, the control unit 26 updates the number of object metadata sets by subtracting 1 from the value of the number-of-metadata-set information "NumOfObjectMetaSets" currently retained.

In step S20, the control unit 26 edits the object metadata sets according to an operation performed by the creator.

For example, when an operation for setting (adding) a new object metadata set is performed by the creator, the control unit 26 generates a new object metadata set on the basis of a signal supplied from the input unit 21.

At this time, for example, the control unit 26 causes the display unit 22 to display an image of the CVP polar coordinate space as necessary, and the creator designates a position (point) in the image of the CVP polar coordinate space as an object positioning location for the new object metadata set.

When the creator performs an operation for designating one or a plurality of object positioning locations, the control unit 26 designates the location or locations designated by the creator in the CVP polar coordinate space as the object positioning location or locations, to generate a new object metadata set.

Moreover, for example, when an operation for deleting any of the object metadata sets is performed by the creator, the control unit 26 deletes the object metadata set designated by the creator, on the basis of a signal supplied from the input unit 21.

After editing of the object metadata set is completed, the process then returns to step S18 to repeat the processing described above. Specifically, editing of the object metadata sets is newly performed. Note that an existing object metadata set may be changed as the editing of the object metadata sets.

Moreover, in a case of determination that the selected mode is not the object metadata set editing mode in step S17, the control unit 26 determines in step S21 whether or not the selected mode is the linking editing mode.

In a case of determination that the selected mode is the linking editing mode in step S21, the control unit 26 in step S22 associates the CVPs with the object metadata sets according to an operation performed by the creator.

Specifically, for example, the control unit 26 generates a metadata set index "AssociatedObjectMetaSetIndex[i]" indicating the object metadata set designated by the creator, for the CVP designated by the creator on the basis of a signal supplied from the input unit 21. In this manner, linking between the CVPs and the object metadata sets is achieved.

After the processing in step S22 is completed, the process then returns to step S13 to repeat the processing described above.

On the other hand, in a case of determination that the selected mode is not the linking editing mode in step S21, i.e., an instruction of ending the free viewpoint content creation work is issued, the process proceeds to step S23.

In step S23, the control unit 26 outputs content data via the communication unit 24.

For example, the control unit 26 generates configuration information on the basis of a result of settings of the target point TP, the CVPs, and the object metadata sets, and a result of linking between the CVPs and the object metadata sets.

Specifically, for example, the control unit 26 generates configuration information containing the frame length index, the number-of-object information, the number-of-CVP information, the number-of-metadata-set information, the CVP information, and the coordinate mode information each described with reference to FIGS. 7 and 9. At this time, the control unit 26 calculates CVP orientation information by calculation similar to the equation (1) described above as necessary, to generate CVP information containing the CVP index, the metadata set index, the CVP position information, and the CVP orientation information.

Moreover, the control unit 26 generates a plurality of object metadata sets each containing a frame index for each object as well as object position information and gains associated with the respective objects, for each of the change points by the processing in step S20 as described with reference to FIG. 10.

In this manner, content data including audio data for respective objects, configuration information, and multiple object metadata sets different from each other is generated for one free viewpoint content. The control unit 26 supplies the generated content data to the recording unit 23 to record this data therein, and also supplies the content data to the communication unit 24, as necessary.

The communication unit 24 outputs the content data supplied from the control unit 26. Specifically, the communication unit 24 transmits the content data to the server via a network at any timing. Note that the content data may be supplied to a recording medium or the like and provided to the server in the form of the recording medium.

After the content data is output, the content creation process ends.

In the manner described above, the information processing device 11 provides settings of the target point TP, the CVPs, the object metadata sets, and the like according to operations performed by the creator, and generates content data including the audio data, the configuration information, and the object metadata sets.

In this manner, the reproduction side is capable of reproducing free viewpoint content on the basis of object positioning designated by the creator. Accordingly, content reproduction having musicality is achievable on the basis of intention of the content creator.

<Configuration Example of Server>

Described next will be a server which receives supply of content data of free viewpoint content from the information processing device 11 and distributes the content data to a client.

Figure 15:
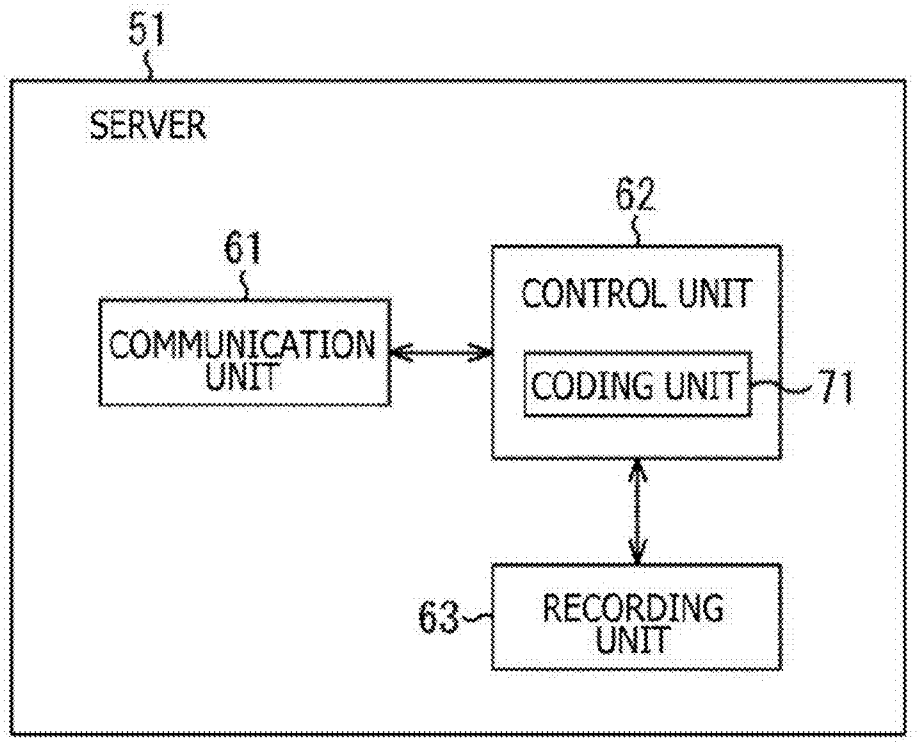
FIG. 15 is a diagram depicting a configuration example of a server.

For example, such a server has a configuration depicted in FIG. 15.

A server 51 depicted in FIG. 15 is constituted by an information processing device such as a computer. The server 51 includes a communication unit 61, a control unit 62, and a recording unit 63.

The communication unit 61 communicates with the information processing device 11 and the client under control by the control unit 62. For example, the communication unit 61 receives content data of free viewpoint content transmitted from the information processing device 11 and supplies the content data to the control unit 62, and also transmits a coded bitstream supplied from the control unit 62 to the client.

The control unit 62 controls overall operations of the server 51. For example, the control unit 62 has a coding unit 71. The coding unit 71 codes content data of free viewpoint content to generate a coded bitstream.

The recording unit 63 retains various types of data recorded therein, such as content data of free viewpoint content supplied from the control unit 62, and supplies recorded data to the control unit 62 as necessary. In addition, it is assumed hereinafter that content data of free viewpoint content received from the information processing device 11 is recorded in the recording unit 63.

<Description of Distribution Process>

Figure 16:
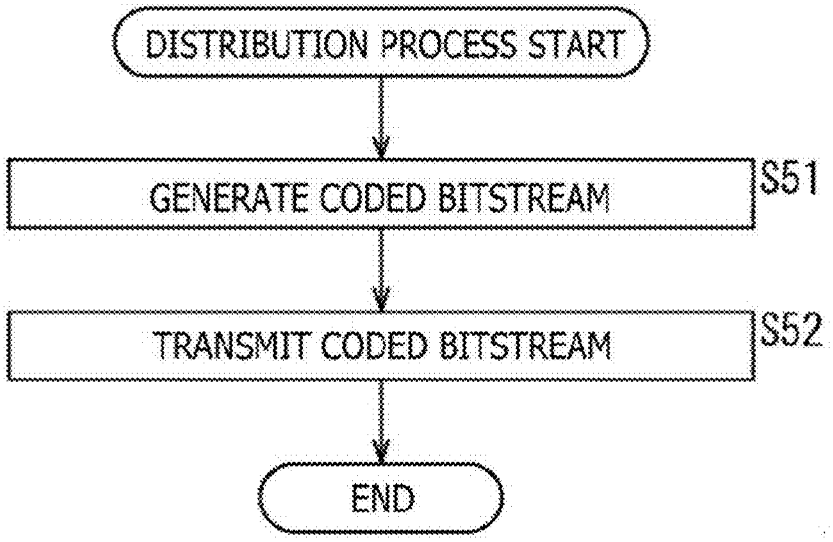
FIG. 16 is a flowchart explaining a distribution process.

When a request for distribution of free viewpoint content is issued from the client connected to the server 51 via the network, the server 51 performs a distribution process for distributing the free viewpoint content in response to the request. The distribution process performed by the server 51 will hereinafter be described with reference to a flowchart in FIG. 16.

In step S51, the control unit 62 generates a coded bitstream.

Specifically, the control unit 62 reads content data of free viewpoint content from the recording unit 63. Thereafter, the coding unit 71 of the control unit 62 codes audio data, configuration information, and a plurality of object metadata sets of respective objects constituting the read content data to generate a coded bitstream. The control unit 62 supplies the coded bitstream thus obtained to the communication unit 61.

In this case, the coding unit 71 codes the audio data, the configuration information, and the object metadata sets according to a coding method used for MPEG (Moving Picture Experts Group)-I or MPEG-H, for example. In this manner, a data transfer volume can be reduced. Moreover, the audio data of the objects are common to all CVPs. Accordingly, one audio data is only required be stored for each object regardless of the number of CVPs.

In step S52, the communication unit 61 transmits the coded bitstream received from the control unit 62 to the client. Thereafter, the distribution process ends.

Note that described in this example is a case where the audio data, the configuration information, and the object metadata sets each coded are multiplexed into one coded bitstream. However, each of the configuration information and the object metadata sets may be transmitted to the client at timing different from transmission timing of the audio data. For example, the configuration information and the object metadata sets may first be transmitted to the client, and then only the audio data may be transmitted to the client.

In the manner described above, the server 51 generates a coded bitstream containing audio data, configuration information, and object metadata sets, and transmits the generated coded bitstream to the client. In this manner, the client can reproduce content that has musicality and meets intention of the content creator.

<Configuration Example of Client>

Figure 17:
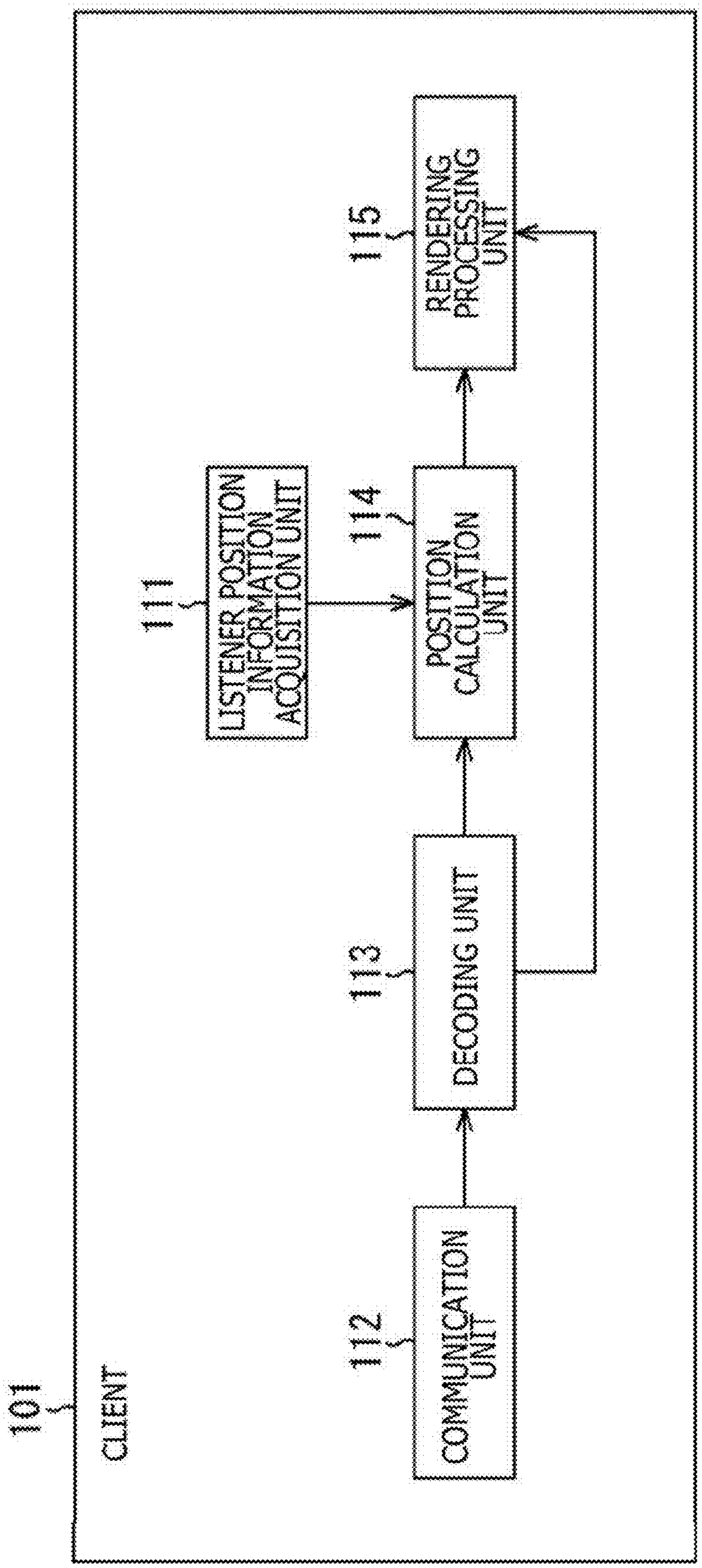
FIG. 17 is a diagram depicting a configuration example of a client.

In addition, the client which receives a coded bitstream from the server 51 and generates reproduction audio data for reproducing free viewpoint content has a configuration depicted in FIG. 17, for example.

A client 101 depicted in FIG. 17 is constituted by an information processing device such as a personal computer and a smartphone, for example. The client 101 includes a listener position information acquisition unit 111, a communication unit 112, a decoding unit 113, a position calculation unit 114, and a rendering processing unit 115.

The listener position information acquisition unit 111 acquires listener position information indicating an absolute position of a user corresponding to a listener in a free viewpoint space, i.e., a listening position, as information input by the user, and supplies the acquired listener position information to the position calculation unit 114.

For example, the listener position information includes absolute coordinates or the like indicating a listening position in the free viewpoint space, i.e., in the common absolute coordinate system.

Note that the listener position information acquisition unit 111 may also acquire listener orientation information indicating an orientation (direction) of the face of the listener in the free viewpoint space (common absolute coordinate system) and supply the acquired listener orientation information to the position calculation unit 114.

The communication unit 112 receives a coded bitstream transmitted from the server 51 and supplies the coded bitstream to the decoding unit 113. Specifically, the communication unit 112 functions as an acquisition unit which acquires audio data of the respective objects, configuration information, and object metadata sets, each coded and contained in the coded bitstream.

The decoding unit 113 decodes the coded bitstream supplied from the communication unit 112, i.e., the audio data of the respective objects, the configuration information, and the object metadata sets each coded. The decoding unit 113 supplies the audio data associated with the respective objects and obtained by decoding to the rendering processing unit 115, and also supplies the configuration information and the object metadata sets each obtained by decoding to the position calculation unit 114.

The position calculation unit 114 calculates listener reference object position information indicating positions of the respective objects as viewed from the listener (listening position), on the basis of the listener position information supplied from the listener position information acquisition unit 111 and the configuration information and the object metadata sets supplied from the decoding unit 113.

Each of the positions of the objects indicated by the listener reference object position information is information that indicates a relative position of the corresponding object as viewed from the listener (listening position) and that is expressed by coordinates (polar coordinates) in a polar coordinate system having an origin (reference) located at the listening position.

For example, the listener reference object position information is calculated by an interpolation process based on CVP position information associated with all CVPs or some of CVPs, the object position information, and the listener position information. The interpolation process may be any process such as vector synthesis. Note that CVP orientation information and the listener orientation information may also be used for calculation of the listener reference object position information.

Moreover, the position calculation unit 114 calculates a listener reference gain of each of the objects at the listening position indicated by the listener position information by performing the interpolation process, on the basis of the gain obtained for each of the objects and contained in the object metadata sets supplied from the decoding unit 113. The listener reference gain is a gain of the corresponding object as viewed from the listening position.

The position calculation unit 114 supplies the listener reference gains of the respective objects at the listening position and the listener reference object position information to the rendering processing unit 115.

The rendering processing unit 115 performs a rendering process on the basis of the audio data associated with the respective objects and supplied from the decoding unit 113 and the listener reference gains and the listener reference object position information supplied from the position calculation unit 114, to generate reproduction audio data.

For example, the rendering processing unit 115 generates reproduction audio data by performing the rendering process in a polar coordinate system specified by MPEG-H, such as VBAP (Vector Based Amplitude Panning). The reproduction audio data is audio data for reproducing free viewpoint content sounds containing sounds of all the objects.

<Description of Reproduction Audio Data Generation Process>

Operations performed by the client 101 will subsequently be described. Specifically, a reproduction audio data generation process performed by the client 101 will hereinafter be described with reference to a flowchart presented in FIG. 18.

In step S81, the communication unit 112 receives a coded bitstream transmitted from the server 51 and supplies the coded bitstream to the decoding unit 113.

In step S82, the decoding unit 113 decodes the coded bitstream supplied from the communication unit 112.

The decoding unit 113 supplies the audio data associated with the respective objects and obtained by decoding to the rendering processing unit 115, and also supplies the configuration information and the object metadata sets each obtained by decoding to the position calculation unit 114.

Note that the configuration information and the object metadata sets may be received at timing different from reception timing of the audio data.

In step S83, the listener position information acquisition unit 111 acquires listener position information at the current time and supplies the acquired listener position information to the position calculation unit 114. Note that the listener position information acquisition unit 111 may also acquire listener orientation information and supply the acquired listener orientation information to the position calculation unit 114.

In step S84, the position calculation unit 114 performs an interpolation process on the basis of the listener position information supplied from the listener position information acquisition unit 111 and the configuration information and the object metadata sets supplied from the decoding unit 113.

Specifically, for example, the position calculation unit 114 calculates the listener reference object position information by carrying out vector synthesis as the interpolation process, calculates the listener reference gains by performing the interpolation process, and then supplies the listener reference object position information and the listener reference gains thus calculated to the rendering processing unit 115.

Note that, at the time of execution of the interpolation process, the current time (sample) may be a time between change points, and therefore that the object position information and the gains at the current time may not be stored in the object metadata. In such a case, the position calculation unit 114 calculates the object position information and the gains at the CVPs at the current time by performing the interpolation process on the basis of object position information and gains at a plurality of change points close to the current time, such as a time immediately before or immediately after the current time.

In step S85, the rendering processing unit 115 performs a rendering process on the basis of the audio data associated with the respective objects and supplied from the decoding unit 113 and the listener reference gains and the listener reference object position information supplied from the position calculation unit 114.

For example, the rendering processing unit 115 carries out gain correction for the audio data of the respective objects on the basis of the listener reference gains of the respective objects.

Thereafter, the rendering processing unit 115 performs a rendering process, such as VBAP, on the basis of the audio data of the respective objects after gain correction and the listener reference object position information, to generate reproduction audio data.

The rendering processing unit 115 outputs the generated reproduction audio data to a block in a subsequent stage such as a speaker.

In this manner, reproduction of free viewpoint content (6DoF content) is achievable at a listening position located at any position within the free viewpoint space, i.e., from multiple viewpoints.

In step S86, the client 101 determines whether or not to end the process. For example, the process is determined to be ended in step S86 in a case where reception of a coded bitstream and generation of reproduction audio data are completed for all frames of the free viewpoint content.

In a case of determination that the process is not yet to be ended in step S86, the process returns to step S81 to repeat the processing described above.

On the other hand, in a case of determination that the process is to be ended in step S86, the client 101 terminates operations of the respective units, and the reproduction audio data generation process ends.

In the manner described above, the client 101 performs the interpolation process on the basis of listener position information, configuration information, and object metadata sets and calculates listener reference gains and listener reference object position information at the listening position.

In this manner, content reproduction having musicality can be achieved according to intention of the content creator on the basis of the listening position, rather than a simple physical relation between the listener and the objects, and therefore, amusingness of the content can sufficiently be conveyed to the listener.

<Interpolation Process>

Figure 18:
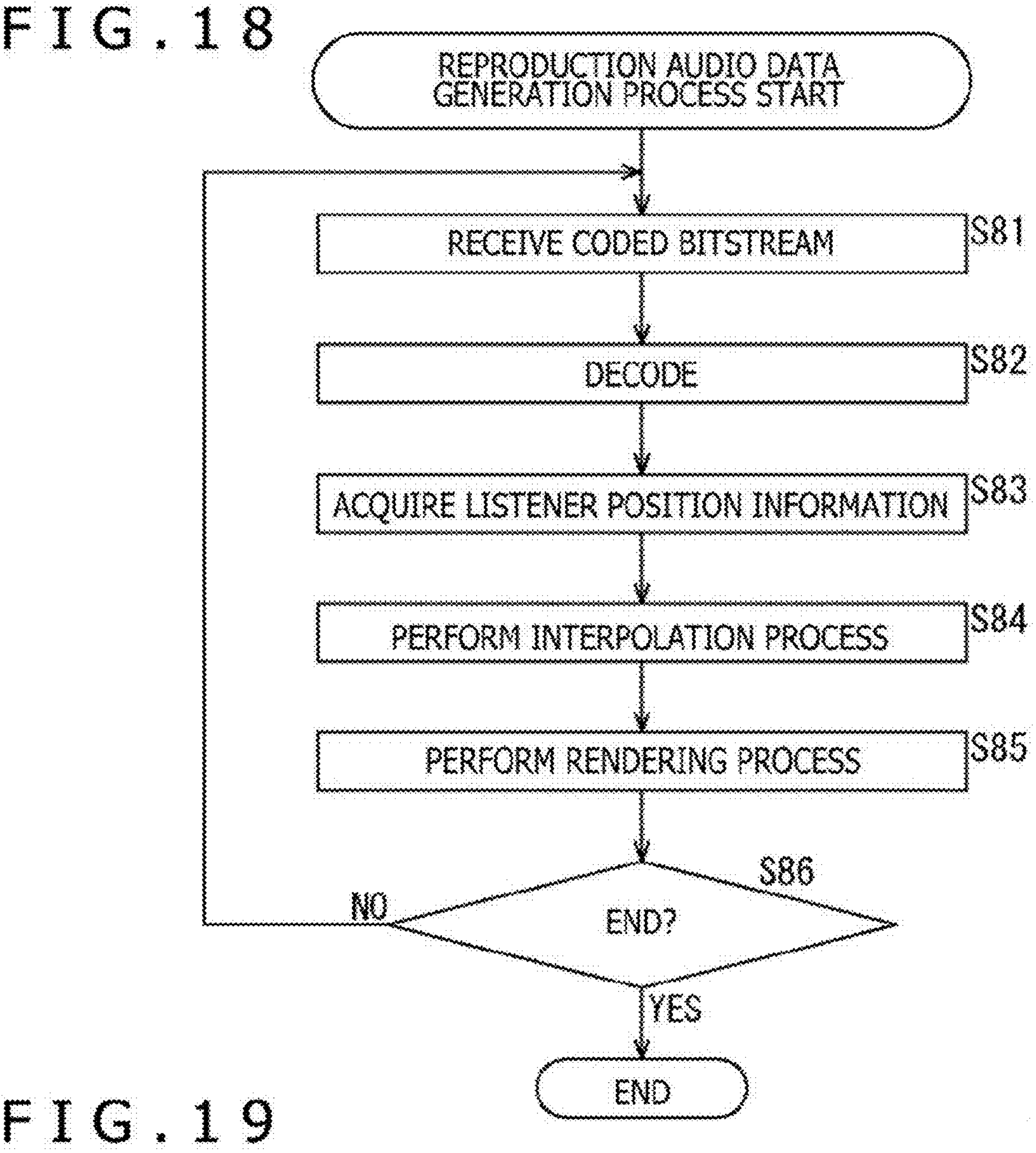
FIG. 18 is a flowchart explaining a reproduction audio data generation process.

A specific example of the interpolation process performed in step S84 in FIG. 18 will herein be described. Particularly described herein will be a case where polar coordinate vector synthesis is carried out.

Figure 19:
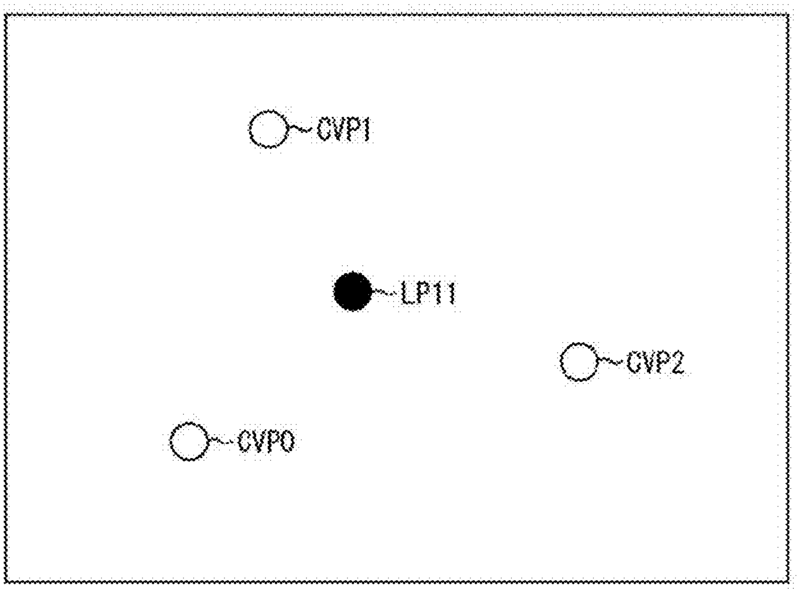
FIG. 19 is a diagram explaining selection of CVPs used for an interpolation process.

For example, as depicted in FIG. 19, it is assumed that any viewpoint position indicated by listener position information in the free viewpoint space (common absolute coordinate system), i.e., the position of the listener at the current time is a listening position LP11. Note that FIG. 19 depicts a state of the free viewpoint space in a bird's eye view as viewed from above.

For example, assuming that a predetermined object is an object of interest, listener reference object position information which indicates a position PosF of the object of interest in a polar coordinate system having an origin located at the listening position LP11 is required to generate reproduction audio data at the listening position LP11 by a rendering process.

Accordingly, for example, the position calculation unit 114 selects multiple CVPs around the listening position LP11 as CVPs used for the interpolation process. In this example, three CVPs of CVP0 to CVP2 are selected as CVPs used for the interpolation process.

For example, three or a larger predetermined number of CVPs located at positions surrounding the listening position LP11 and at the shortest distance from the listening position LP11 may be selected. In this manner, any selection of the CVPs may be made. Moreover, the interpolation process may be performed using all the CVPs. In this case, the position calculation unit 114 can identify the position of each CVP in the common absolute coordinate system with reference to CVP position information contained in configuration information.

Figure 20:
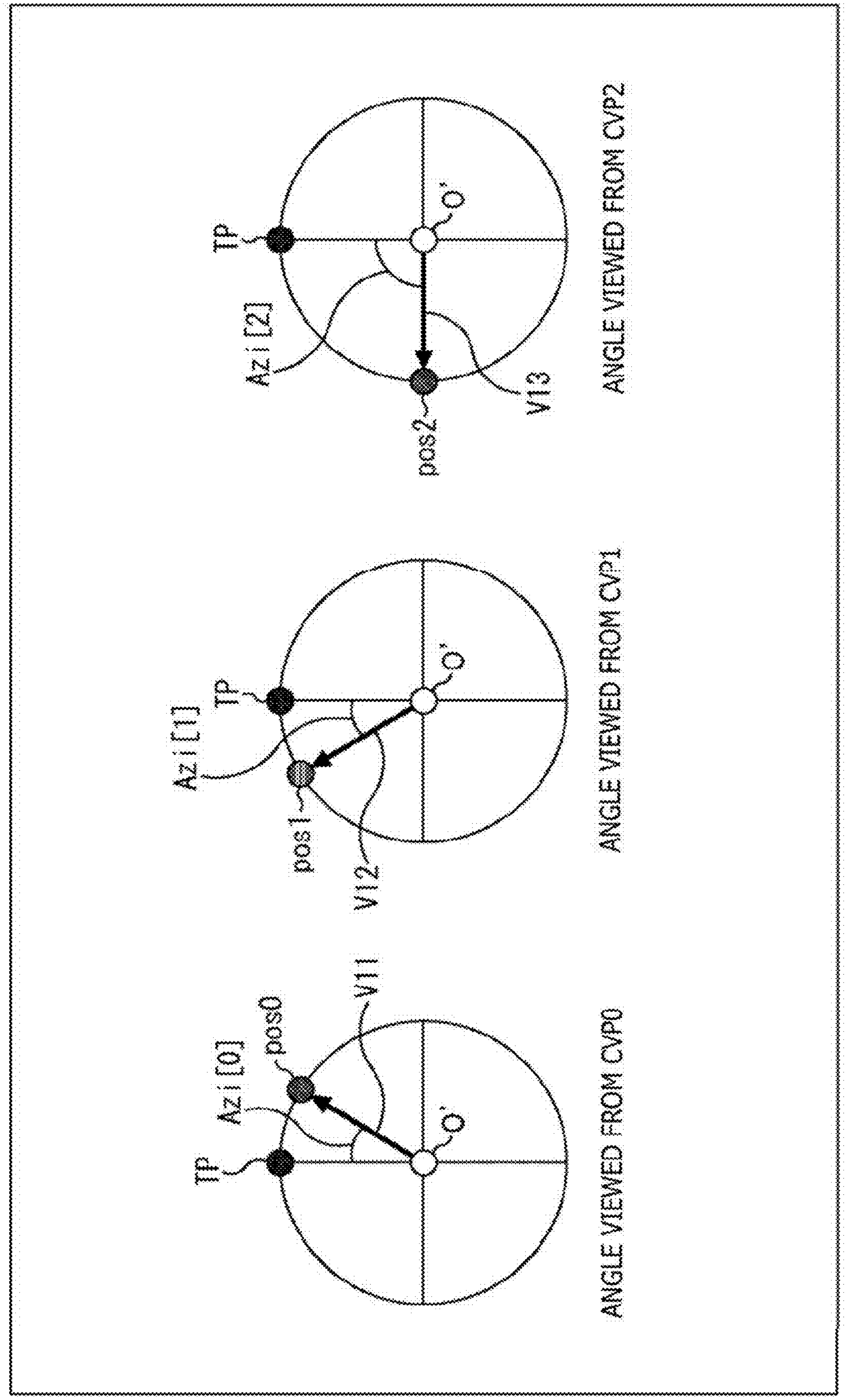
FIG. 20 is a diagram explaining an object three-dimensional position vector.

After the selection of the CVP0 to the CVP2 as the CVPs used for the interpolation process, the position calculation unit 114 obtains object three-dimensional position vectors depicted in FIG. 20, for example.

A position of the object of interest in the polar coordinate space of the CVP0 is depicted in a left part of FIG. 20. In this example, a position Pos0 is a positioning location of the object of interest as viewed from the CVP0. The position calculation unit 114 calculates, as an object three-dimensional position vector for the CVP0, a vector V11 having a start point located at an origin O' of the CVP polar coordinate system of the CVP0 and an end point located at the position Pos0.

Note that a position of the object of interest in the polar coordinate space of the CVP1 is depicted in a central part of the figure. In this example, a position Pos1 is a positioning location of the object of interest as viewed from the CVP1. The position calculation unit 114 calculates, as an object three-dimensional position vector for the CVP1, a vector V12 having a start point located at an origin O' of the CVP polar coordinate system of the CVP1 and an end point located at the position Pos1.

Similarly, a position of the object of interest in the polar coordinate space of the CVP2 is depicted in a right part of the figure. In this example, a position Pos2 is a positioning location of the object of interest as viewed from the CVP2. The position calculation unit 114 calculates, as an object three-dimensional position vector for the CVP2, a vector V13 having a start point located at an origin O' of the CVP polar coordinate system of the CVP2 and an end point located at the position Pos2.

A specific calculation method of the object three-dimensional position vector will herein be described.

For example, it is assumed that an absolute coordinate system (rectangular coordinate system), which has an origin located at an origin O' of a CVP polar coordinate system of a CVPi, and which has an x axis, a y axis, and a z axis corresponding to an x axis, a y axis, and a z axis of the CVP polar coordinate system of the CVPi without change, is referred to as a CVP absolute coordinate system (CVP absolute coordinate space).

The object three-dimensional position vector is a vector expressed by coordinates in the CVP absolute coordinate system.

For example, it is assumed that polar coordinates representing a position Posi of an object of interest in the CVP polar coordinate system of the CVPi are (Azi[i], Ele[i], rad[i]). The Azi[i], Ele[i], rad[i] correspond to PosA[i][j][k], PosB[i][j][k], and PosC[i][j][k] described with reference to FIG. 10. Moreover, it is assumed that a gain of the object of interest as viewed from the CVPi is expressed as g[i]. The gain g[i] corresponds to Gain[i][j][k] described with reference to FIG. 10.

Furthermore, it is assumed that absolute coordinates representing the position Posi of the object of interest in the CVP absolute coordinate system of the CVPi are (vx[i], vy[i], vz[i]).

In this case, an object three-dimensional position vector for the CVPi is (vx[i], vy[i], vz[i]). This object three-dimensional position vector can be obtained by the following equation (2).

[Math. 2]

$$vx[i] = -\sin(Azin[i]) * \cos(Ele[i]) \tag{2}$$

$$vy[i] = \cos(Az\,i[i]) * \sin(Ele[i])$$

$$vz[i] = \mathrm{rad}[i] * \sin(Ele[i])$$

The position calculation unit 114 reads a metadata set index indicating an object metadata set to be referred to by the CVPi from CVP information associated with the CVPi and contained in configuration information. Moreover, the position calculation unit 114 reads object position information and a gain associated with the object of interest at the CVPi from object metadata associated with the object of interest and constituting the object metadata set indicated by the read metadata set index.

Thereafter, the position calculation unit 114 calculates the equation (2) on the basis of object position information associated with the object of interest at the CVPi, to obtain the object three-dimensional position vector (vx[i], vy[i], vz[i]). Such calculation of the equation (2) is conversion from polar coordinates into absolute coordinates.

Figure 21:
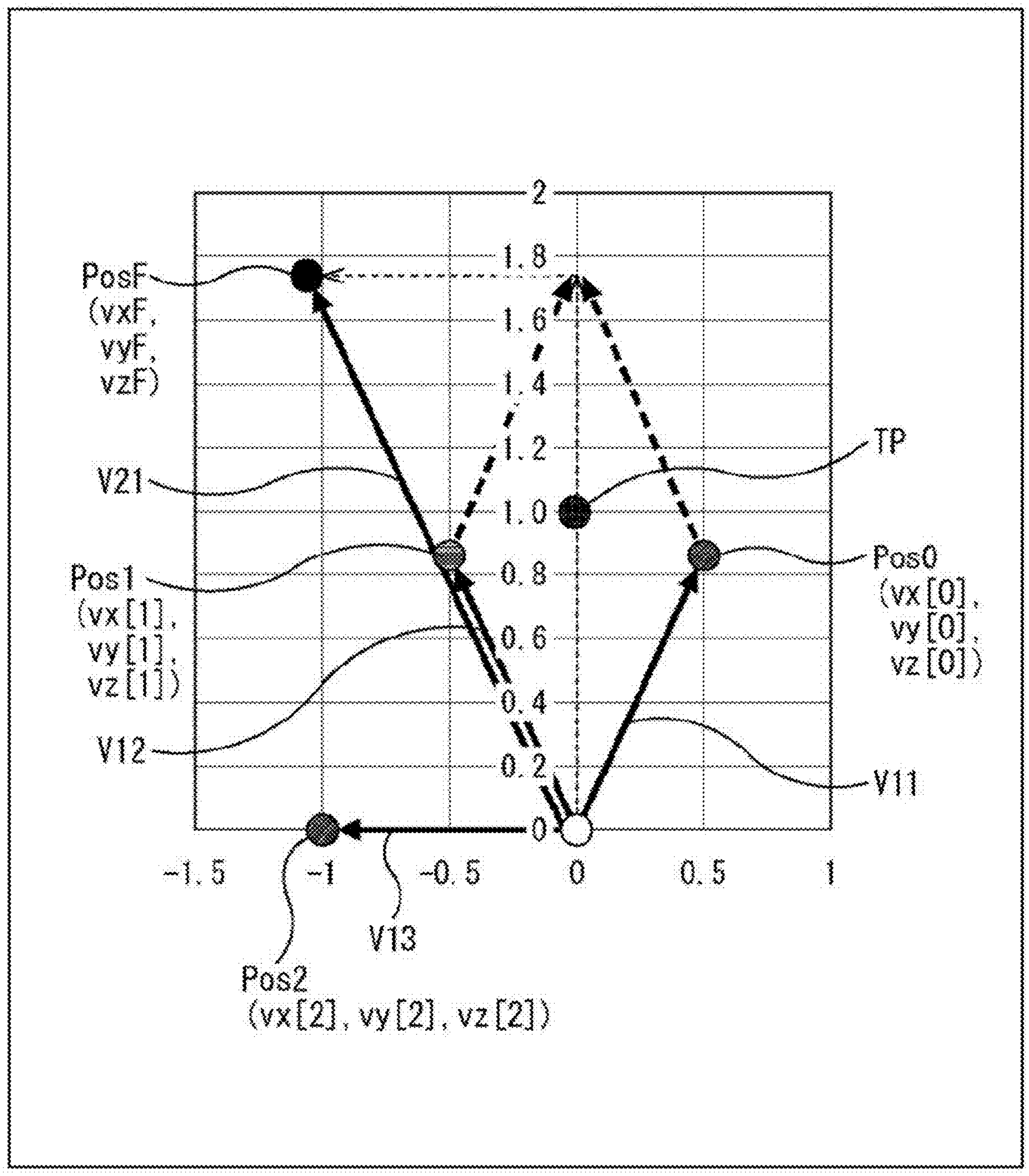
FIG. 21 is a diagram explaining synthesis of object three-dimensional position vectors.

After the vectors V11 to V13 which are the object three-dimensional position vectors depicted in FIG. 20 are obtained using the equation (2), the position calculation unit 114 calculates a vectorial sum of the vectors V11 to V13 as depicted in FIG. 21, for example. Note that parts in FIG. 21 similar to corresponding parts in FIG. 20 are given identical reference signs, and description of these parts will be omitted where appropriate.

In this example, the sum of the vectors V11 to V13 is calculated, and a vector V21 is obtained as a result of the calculation. In other words, the vector V21 is obtained by vector synthesis based on the vectors V11 to V13.

More specifically, the vector V21 is obtained by synthesizing the vectors V11 to V13 on the basis of weights corresponding to contribution rates of the respective CVPs (object three-dimensional position vectors) for calculation of the vector V21 indicating the position PosF. Note that the contribution rate of each CVP is assumed to be 1 in FIG. 21 for simplifying the description.

The vector V21 is a vector indicating the position PosF of the object of interest in the absolute coordinate system as viewed from the listening position LP11. The absolute coordinate system is a coordinate system which has an origin located at the listening position LP11 and a y-axis positive direction corresponding to a direction from the listening position LP11 toward the target point TP.

For example, assuming that absolute coordinates indicating the position PosF in the absolute coordinate system which has the origin located at the listening position LP11 are (vxF, vyF, vzF), the vector V21 is expressed as (vxF, vyF vzF).

Moreover, assuming that a gain of the object of interest as viewed from the listening position LP11 is gF, and that contribution rates of the CVP0 to the CVP2 are dep[0] to dep[2], respectively, the vector (vxF, vyF, vzF), i.e., the vector V21, and the gain gF can be obtained by the following equation (3).

[Math. 3]

$$vxF = dep[0]^*vx[0] + dep[1]^*vx[1] + dep[2]^*vx[2] \quad (3)$$

$$vyF = dep[0]^*vy[0] + dep[1]^*vy[1] + dep[2]^*vy[2]$$

$$vzF = dep[0]^*vz[0] + dep[1]^*vz[1] + dep[2]^*vz[2]$$

$$gF = dep[0]^*g[0] + dep[1]^*g[1] + dep[2]^*g[2]$$

Listener reference object position information can be obtained by converting the vector V21 obtained in the above manner into polar coordinates indicating the position PosF of the object of interest in the polar coordinate system having the origin located at the listening position LP11. Moreover, the gain gF obtained by the equation (3) is a listener reference gain.

According to the present technology, one target point TP common to all CVPs is set. In this manner, desired listening reference object position information and a desired listener reference gain can be obtained by simple calculations.

Vector synthesis will further be touched upon herein.

Figure 22:
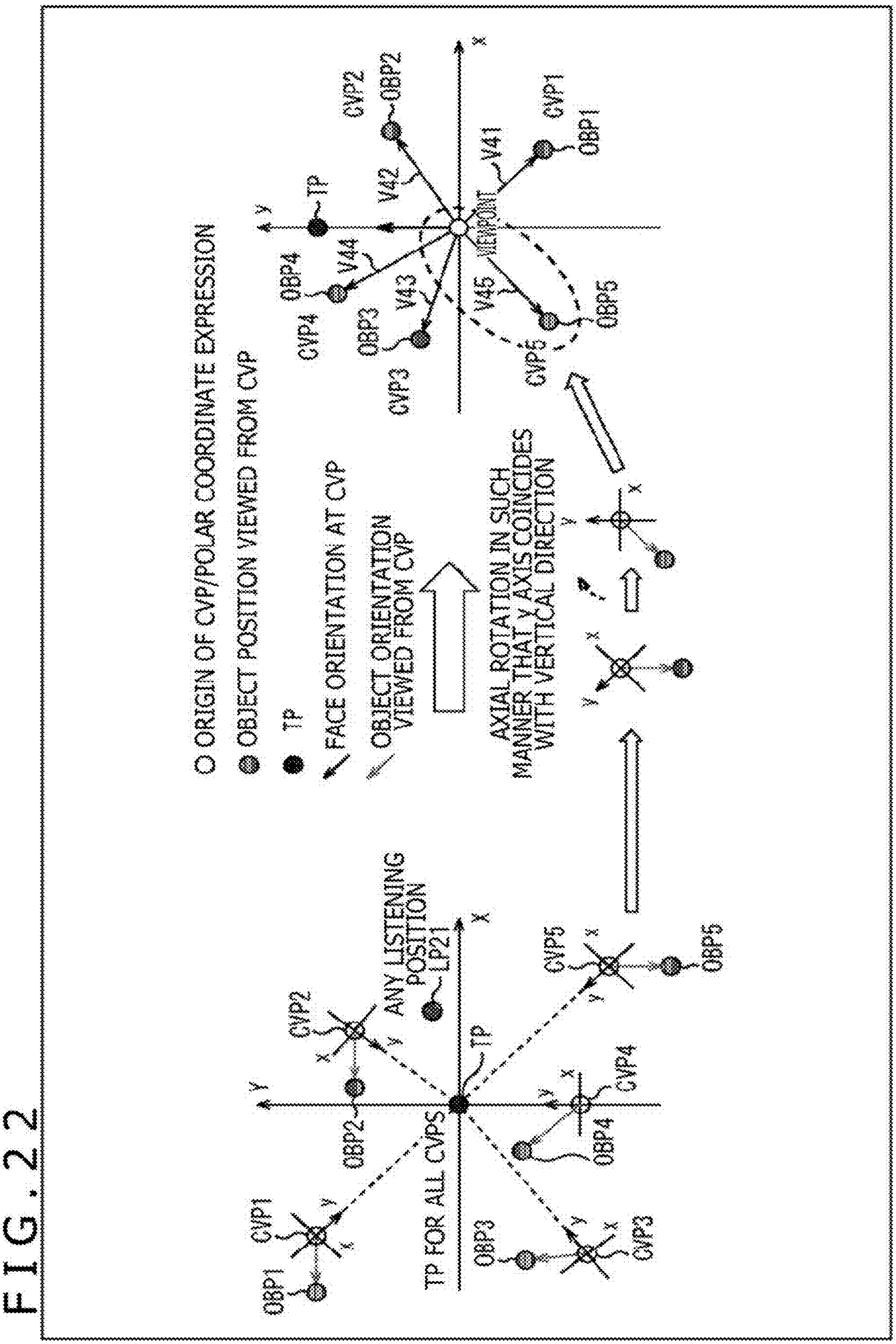
FIG. 22 is a diagram explaining vector synthesis.

For example, it is assumed that a position LP21 in the free viewpoint space is a listening position as depicted in a left part of FIG. 22. It is further assumed that CVP1 to CVP5 are set in the free viewpoint space, and that listener reference object position information is obtained using the CVP1 to the CVP5. Note that FIG. 22 depicts an example where the CVPs are positioned in a two-dimensional plane for simplifying the description.

In this example, the CVP1 to the CVP5 are positioned around the center located on the target point TP. Moreover, a y-axis positive direction of a CVP polar coordinate system of each of the CVPs corresponds to a direction from the corresponding CVP toward the target point TP.

Furthermore, positions OBP1 to OBP5 are positions of the same object of interest as viewed from the CVP1 to the CVP5, respectively. Accordingly, polar coordinates expressed in the CVP polar coordinate system and indicating the positions OBP1 to OBP5 correspond to object position information associated with the CVP1 to the CVP5, respectively.

In this case, it is assumed that axial rotation is made for each of the CVPs in such a manner that the y axis of the CVP polar coordinate system coincides with the vertical direction, i.e., the upward direction in the figure. Moreover, the object of interest is repositioned in such a manner that the origin O' of the CVP polar coordinate system of each of the CVPs after rotation coincides with the origin of one identical CVP polar coordinate system. In this case, the positions OBP1 to OBP5 of the object of interest at the respective CVPs as viewed from the origin of the CVP polar coordinate system exhibit a relation as presented in a right part of the figure. In other words, depicted in the right part of the figure are object positions on an assumption that each of the CVPs is located at the origin, and that the median plane is designated as the Y-axis positive direction.

There is such a limitation that the direction toward the median plane coincides with the direction toward the target point TP in the CVP polar coordinate system of each of the CVPs. Accordingly, the positional relation presented in the right part of the figure can easily be obtained.

Furthermore, it is assumed that vectors V41 to V45 are vectors each having a start point located at the position of the corresponding CVP, i.e., the origin, and having end points located at the positions OBP1 to OBP5 of the object of interest, respectively, in the right part of the figure. The vectors V41 to V45 herein correspond to the vectors V11 to V13 depicted in FIG. 20.

Figure 23:
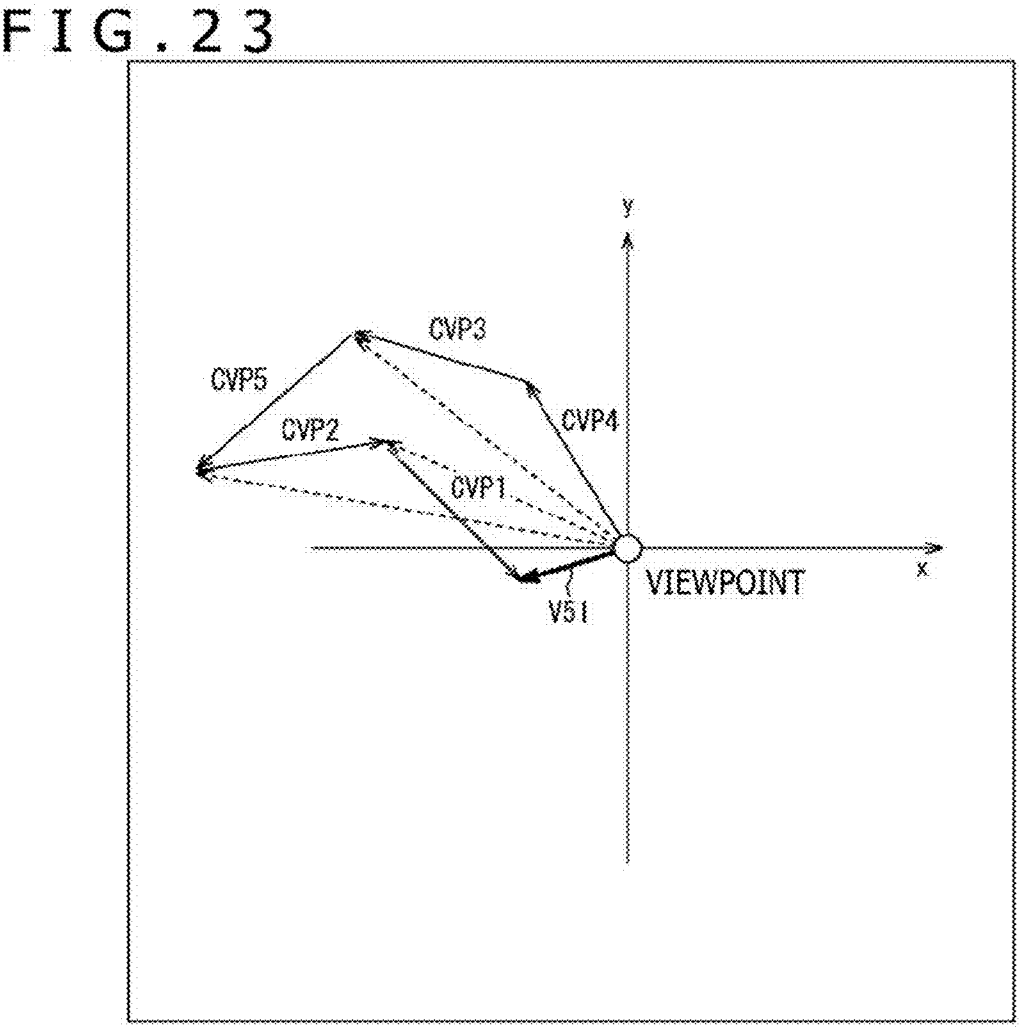
FIG. 23 is a diagram explaining vector synthesis.

Accordingly, as depicted in FIG. 23, a vector V51 indicating the position of the object of interest as viewed from the listening position LP21 can be obtained by synthesizing the vectors V41 to V45 with use of contribution rates of the respective vectors (CVPs) as weights. The vector V51 herein corresponds to the vector V21 depicted in FIG. 21. Note that the contribution rate of each CVP is assumed to be 1 for simplifying the description in the case of FIG. 23.

Moreover, the contribution rate of each of the CVPs during vector synthesis may be obtained on the basis of a distance ratio from the listening position to the corresponding CVP in the free viewpoint space (common absolute coordinate system), for example.

Figure 24:
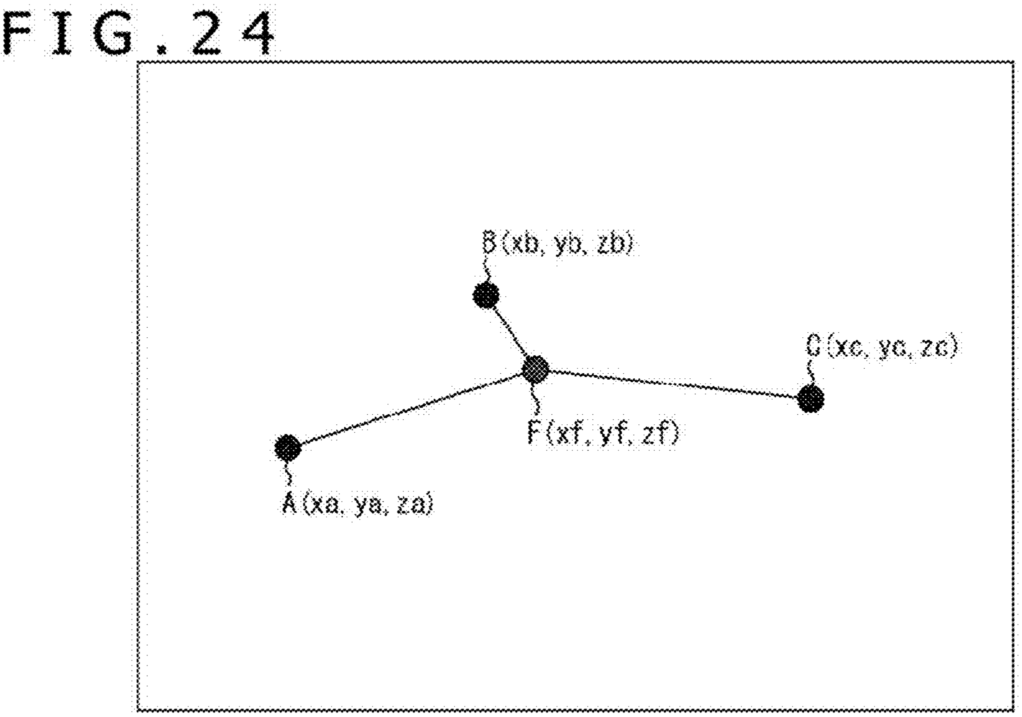
FIG. 24 is a diagram explaining contribution rates of respective vectors at the time of vector synthesis.

Specifically, as depicted in FIG. 24, it is assumed that the listening position indicated by the listener position information is a position F, and that three positions of the CVPs used for the interpolation process are positions A to C, for example. It is further assumed that absolute coordinates of the position F in the common absolute coordinate system are (xf, yf, zf), and that absolute coordinates of the positions A, B, and C in the common absolute coordinate system are (xa, ya, za), (xb, yb, zb), and (xc, yc, zc), respectively. Note that the absolute coordinates indicating the positions of the respective CVPs in the common absolute coordinate system can be obtained with reference to CVP position information contained in configuration information.

At this time, the position calculation unit 114 obtains a ratio (distance ratio) of each of a distance AF from the position F to the position A, a distance BF from the position F to the position B, and a distance CF from the position F to the position C, and designates a reciprocal of each distance ratio as a ratio of the contribution rate (dependency ratio) of the CVP at the corresponding position.

Specifically, the position calculation unit 114 calculates the following equation (4) on an assumption that AF:BF:CF=a:b:c holds and that degrees of dependency of the respective CVPs located at the positions A to C on the listening position (listener reference object position information) are dp(AF), dp(BF), and dp(CF), respectively.

[Math. 4]

$$\text{Degree of dependency } dp(AF):dp(BF):dp(CF) = 1/a:1/b:1/c \quad (4)$$

Note that a, b, and c in the equation (4) are expressed by the following equation (5).

[Math. 5]

$$a = sqrt\left((xa - xf)^2 + (ya - yf)^2 + (za - zf)^2\right) \quad (5)$$
$$b = sqrt\left((xb - xf)^2 + (yb - yf)^2 + (zb - zf)^2\right)$$
$$c = sqrt\left((xc - xf)^2 + (yc - yf)^2 + (zc - zf)^2\right)$$

Moreover, the position calculation unit 114 normalizes the degrees of dependency dp(AF), dp(BF), and dp(CF) presented in the equation (4) by calculation of the following equation (6), and obtains ndp(AF), ndp(BF), and ndp(CF) as degrees of dependency after normalization to acquire final contribution rates. Note that a, b, and c in the equation (6) are also obtained by the equation (5).

[Math. 6]

$$ndp(AF):ndp(BF):ndp(CF) = (1/a)/t:(1/b)/t:(1/c)/t \quad (6)$$
$$\text{where } t = 1/a + 1/b + 1/c$$

The contribution rates ndp(AF) to ndp(CF) thus obtained correspond to the contribution rates dep[0] to dep[2] in the equation (3), respectively. Each of the contribution rates of the CVPs approaches 1 as the distance from the listening position to the corresponding CVP decreases. Note that the method for obtaining the contribution rates of the respective CVPs is not limited to the method described in the above example, and may be any other methods.

The position calculation unit 114 calculates the contribution rates of respective CVPs by obtaining a distance ratio from the listening position to each of the CVPs on the basis of the listener position information and the CVP position information.

For summarizing the points described above, first, the position calculation unit 114 selects CVPs used for the interpolation process on the basis of listener position information, and CVP position information contained in configuration information. Note that the CVPs used for the interpolation process may be some of all the CVPs as CVPs surrounding the listening position, or that all the CVPs may be used for the interpolation process.

The position calculation unit 114 calculates an object three-dimensional position vector for each of the selected CVPs on the basis of the object position information.

For example, assuming that an object three-dimensional position vector for a jth object as viewed from an ith CVPi is expressed as (Obj_vector_x[i][j], Obj_vector_y[i][j], Obj_vector_z[i][j]), the object three-dimensional position vector can be obtained by calculating the following equation (7).

Note that polar coordinates indicated by the object position information associated with the jth object as viewed from the ith CVPi are herein assumed to be (Azi[i][j], Ele[i][j], rad[i][j]).

[Math. 7]

$$\text{Obj\_vector\_x}[i][j] = -\sin(Azi[i][j]) * \cos(Ele[i][j]) \quad (7)$$
$$\text{Obj\_vector\_y}[i][j] = \cos(Azi[i][j]) * \sin(Ele[i][j])$$
$$\text{Obj\_vector\_z}[i][j] = \text{rad}(Azi[i][j]^* \sin(Ele[i][j])$$

The equation (7) presented above is an equation similar to the equation (2) described above.

Subsequently, the position calculation unit 114 carries out calculations similar to the calculations of the equations (4) to (6) described above on the basis of the listening position information, and the CVP position information for each CVPi contained in the configuration information, to obtain a contribution rate dp(i) of each CVPi as a weighting factor during the interpolation process. The contribution rate dp(i) is a weighting factor determined on the basis of a ratio of the distance from the listening position to the corresponding CVPi, more specifically, a reciprocal ratio of the distance.

Moreover, the position calculation unit 114 calculates the following equation (8) on the basis of the object three-dimensional position vector obtained by the calculation of the equation (7), the contribution rate dp(i) of each CVPi, and the gain Obj_gain[i][j] of the jth object as viewed from the corresponding CVPi. In this manner, the listener reference object position information (Intp_x(j), Intp_y(j), Intp_z(j)) and the listener reference gain Intp_gain(j) for the jth object are obtained.

[Math. 8]

$$\text{Intp\_x}(j) = \sum_{i=0,\ numOfCvp} dp(i)^* \text{Obj\_vector\_x}[i][j] \quad (8)$$
$$\text{Intp\_y}(j) = \sum_{i=0,\ numOfCvp} dp(i)^* \text{Obj\_vector\_y}[i][j]$$
$$\text{Intp\_z}(j) = \sum_{i=0,\ numOfCvp} dp(i)^* \text{Obj\_vector\_z}[i][j]$$
$$\text{Intp\_gain}(j) = \sum_{i=0,\ numOfCvp} dp(i)^* \text{Obj\_gain}[i][j]$$

where $i$ : index of $CVP$ $j$ : index of Object $numOfCvp$ : number of $CVP$

A weighted vector sum is obtained by the equation (8). Specifically, a sum total of the object three-dimensional position vectors calculated for each CVPi and multiplied by the contribution rate dp(i) is obtained as the listener reference object position information, while a sum total of the gains calculated for each CVPi and multiplied by the contribution rate dp(i) is obtained as the listener reference gain. The equation (8) presented above is an equation similar to the equation (3) described above.

Note that the listener reference object position information obtained by the equation (8) includes absolute coordinates in an absolute coordinate system which has an origin located at the listening position and the direction from the listening position toward the target point TP designated as a y-axis positive direction, i.e., a direction toward the median plane.

However, the rendering processing unit 115 which performs a rendering process in a polar coordinate system requires listener reference object position information expressed by polar coordinates.

Accordingly, the position calculation unit 114 converts the listener reference object position information (Intp_x(j), Intp_y(j), Intp_z(j)) expressed by absolute coordinates and obtained by the equation (8) into listener reference object position information (Intp_azi(j), Intp_ele(j), Intp_rad(j)) expressed by polar coordinates by calculating the following equation (9).

[Math. 9]

$$Intp\_azi(j) = \arctan(Intp\_x(j)/Intp\_y(j)) \tag{9}$$

$$Intp\_ele(j) = \arctan(Intp\_z(j)/sqrt(Intp\_x(j)^{*}Intp\_x(j) + Intp\_y(j)^{*}Intp\_y(j)))$$

$$Intp\_rad(j) = sqrt(Intp\_x(j)^{*}Intp\_x(j) + Intp\_y(j)^{*}Intp\_z(j)^{*}Intp\_z(j))$$

The position calculation unit 114 outputs the listener reference object position information (Intp_azi(j), Intp_ele (j), Intp_rad(j)) thus obtained to the rendering processing unit 115 as final listener reference object position information.

Note that the listener reference object position information expressed by polar coordinates and obtained by the equation (9) includes polar coordinates in a polar coordinate system which has an origin located at the listening position and the direction from the listening position toward the target point TP designated as a y-axis positive direction, i.e., a direction toward the median plane.

However, the listener actually located at the listening position does not necessarily face in the direction toward the target point TP. Accordingly, in a case where the listener orientation information is acquired by the listener position information acquisition unit 111, a coordinate system rotation process or the like may further be performed for the listener reference object position information expressed by polar coordinates and obtained by the equation (9), to obtain final listener reference object position information.

In this case, for example, the position calculation unit 114 rotates the positions of the objects as viewed from the listening position by a rotation angle determined on the basis of the target point TP known on the client 101 side, the listener position information, and the listener orientation information. The rotation angle (correction amount) at this time is an angle formed by the direction from the listening position toward the target point TP and the orientation (direction) of the face of the listener indicated by the listener orientation information in the free viewpoint space.

Note that the target point TP in the common absolute coordinate system (free viewpoint space) can be calculated by the position calculation unit 114 on the basis of the CVP position information and the CVP orientation information for a plurality of CVPs.

By the processes described above, the listener reference object position information expressed by polar coordinates and indicating more accurate positions of the objects as viewed from the listener can finally be obtained.

Figure 25:
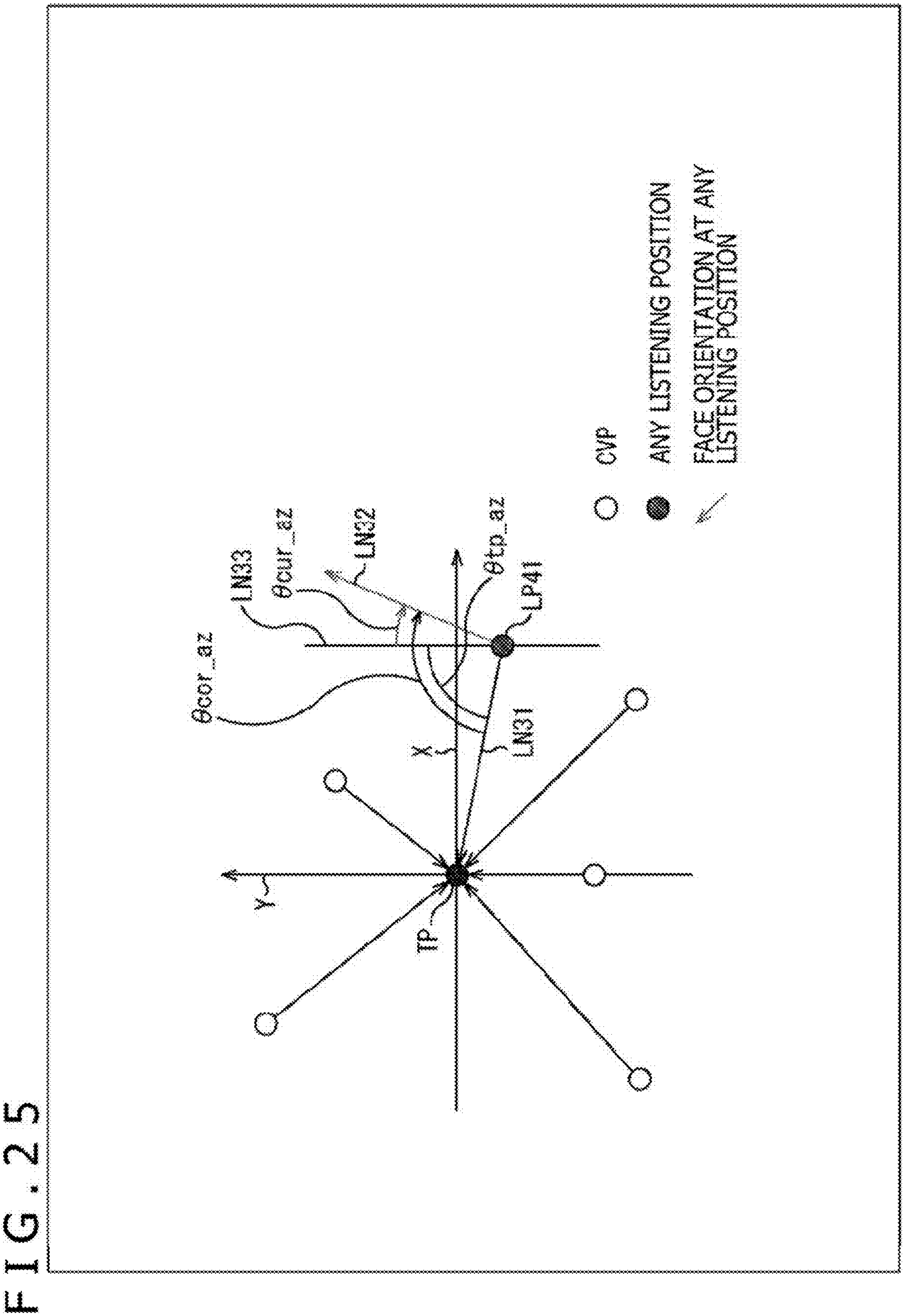
FIG. 25 is a diagram explaining listener reference object position information according to an orientation of the face of a listener.
Figure 26:
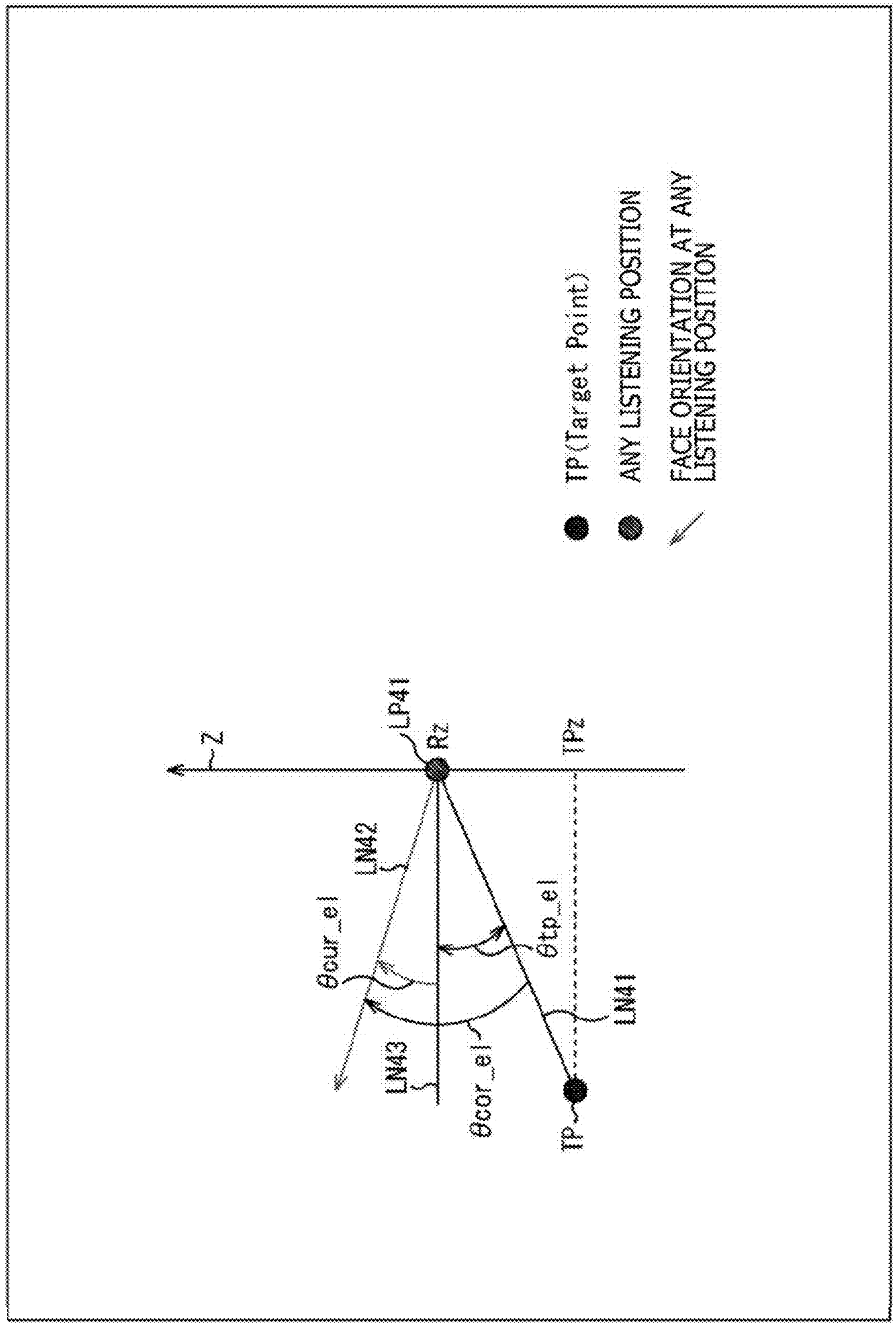
FIG. 26 is a diagram explaining listener reference object position information according to the orientation of the face of the listener.

Described herein will be a specific calculation example of listener reference object position information according to the orientation of the face of the listener with reference to FIGS. 25 and 26. Note that corresponding parts in FIGS. 25 and 26 are given identical reference signs, and description of these parts will be omitted where appropriate.

For example, it is assumed that the target point TP, respective CVPs, and a listening position LP41 are positioned as depicted in FIG. 25 when an X-Y plane of the free viewpoint space (common absolute coordinate system) is viewed.

Note that each circle not hatched (with diagonal lines) represents a CVP in this example. It is assumed that an angle in the vertical direction indicated by CVP Pitch information constituting CVP orientation information is 0 degrees for each CVP. In other words, it is assumed that the free viewpoint space is substantially a two-dimensional plane. Moreover, the target point TP herein corresponds to a position of an origin O of the common absolute coordinate system.

Furthermore, it is assumed that a straight line connecting the target point TP and the listening position LP41 is a line LN31, that a straight line representing an orientation of the face of the listener and indicated by the listener orientation information is a line LN32, and that a straight line passing through the listening position LP41 and parallel with the Y axis of the common absolute coordinate system is a line LN33.

In a case where the Y-axis positive direction has an angle of 0 degrees in the horizontal direction, an angle formed in the horizontal direction and indicating the orientation of the face of the listener, i.e., an angle formed by the line LN32 and the line LN33 is θcur_az. Moreover, in a case where the Y-axis positive direction has an angle of 0 degrees in the horizontal direction, an angle formed in the horizontal direction and indicating the direction toward the target point TP as viewed from any listening position LP41, i.e., an angle formed by the line LN31 and the line LN33 is θtp_az.

In this case, the direction toward the median plane is the direction from any listening position LP41 toward the target point TP. Accordingly, it is sufficient if the angle Intp_azi(j) of the listener reference object position information in the horizontal direction for each object is corrected by a correction amount θcor_az which is an angle formed by the line LN31 and the line LN32. Specifically, the position calculation unit 114 adds the correction amount θcor_az to the angle Intp_azi(j) in the horizontal direction to obtain an angle of final listener reference object position information in the horizontal direction.

The correction amount θcor_az can be obtained by calculating the following equation (10).

[Math. 10]

$$\text{Correction amount } \theta cor\_az = \theta cur\_az + \theta tp\_az \tag{10}$$

Moreover, for example, it is assumed that the target point TP and the listening position LP41 are positioned as depicted in FIG. 26 when the free viewpoint space (common absolute coordinate system) is viewed in a direction parallel with the X-Y plane.

It is assumed herein that a straight line connecting the target point TP and the listening position LP41 is a line LN41, that a straight line representing an orientation of the face of the listener and indicated by the listener orientation information is a line LN42, and that a straight line passing through the listening position LP41 and parallel with the X-Y plane in the common absolute coordinate system is a line LN43.

In addition, it is assumed that a Z-coordinate constituting the listener position information and indicating the listening position LP41 in the common absolute coordinate system is Rz, and that a Z-coordinate indicating the target point TP in the common absolute coordinate system is TPz.

In this case, an absolute value of an angle of the target point TP in the vertical direction (elevation angle) as viewed from the listening position LP41 in the free viewpoint space is an angle θtp_el formed by the line LN41 and the line LN43.

Moreover, an angle formed in the vertical direction (elevation angle) and indicating the orientation of the face of the listener in the free viewpoint space is an angle θcur_el formed by the line LN43 corresponding to a horizontal line and the line LN42 indicating the orientation of the face of the listener. In this case, when the listener faces above the horizontal line, the angle θcur_el has a positive value. When the listener faces below the horizontal line, the angle θcur_el has a negative value.

According to this example, it is sufficient if the angle Intp_ele(j) of the listener reference object position information in the vertical direction for each object is corrected by a correction amount θcor_el which is an angle formed by the line LN41 and the line LN42. Specifically, the position calculation unit 114 adds the correction amount θcor_el to the angle Intp_ele(j) in the vertical direction to obtain an angle of final listener reference object position information in the vertical direction.

The correction amount θcor_el can be obtained by calculating the following equation (11).

[Math. 11]

$$\begin{aligned}\text{Correction amount } \theta\text{cor\_el} \quad (11)\\ &= \theta\text{tp\_el} - \theta\text{cur\_el} \ (\text{where } Rz \geq Tp)\\ &= -\theta\text{tp\_el} - \theta\text{cur\_el} \ (\text{when } Rz < Tp)\end{aligned}$$

Note that described above has been the example which performs vector synthesis as the interpolation process. Alternatively, the listener reference object position information may be obtained by an interpolation process with use of CVPs around the listening position on the basis of Ceva's theorem.

For example, according to an interpolation process using Ceva's theorem, the interpolation process is achieved by constituting a triangle using three CVPs surrounding a listening position, and performing mapping on a triangle constituted by object positions corresponding to the three CVPs on the basis of Ceva's theorem.

In this case, it is not possible to perform the interpolation process when the listening position is located in a region outside the triangle of the CVPs. However, the method of vector synthesis described above can obtain the listener reference object position information even in a case where the listening position is located outside the region surrounded by the CVPs. Moreover, the method of vector synthesis can easily obtain the listener reference object position information with use of a smaller processing volume.

Second Embodiment

<CVP Group>

Meanwhile, the use of the present technology allows free movement of the position of the listener within a space closed by buildings or the like in the live show venue, for example, while reproducing a sound field from a viewpoint intended by the creator for the listener. Moreover, considering a case where the listener moves out of the live show venue, a considerable difference may be produced between the sound field outside the live show venue and the sound field inside the live show venue. Accordingly, many sounds generated inside the live show venue should not be heard outside the live show venue.

However, according to the method of the first embodiment described above, even when sounds outside the live show venue are set, sounds generated within the live show venue and not originally intended to be mixed may be heard during reproduction of the sound field at any position outside the live show venue due to an effect of a combination pattern of object position information inside the live show venue.

Accordingly, for example, three regions including a region inside the live show venue, a region outside the live show venue, and a transition region from the inside the live show venue to the outside the live show venue may be provided, and CVPs to be used may be separated for each of the regions. In such a case, the region where the listener is currently present is selected according to the position of the listener, and listener reference object position information is obtained using only the CVPs belonging to the selected region. Note that the number of regions to be divided may be set to any number on the creator side, or set according to each live show venue.

In this manner, free viewpoint content audio reproduction is achievable using appropriate listener reference object position information and listening reference gains while avoiding mixture of sounds between the inside and the outside of the live show venue.

Note that several methods are considered to be adopted for defining the regions as divisions of the free viewpoint space. Methods using concentric circles, polygons, or the like from predetermined center coordinates are adoptable as general examples. Moreover, any number of small regions having various other shapes may be provided, for example.

Described hereinafter will be a specific example which divides the free viewpoint space into a plurality of regions and selects CVPs used for the interpolation process.

Figure 27:
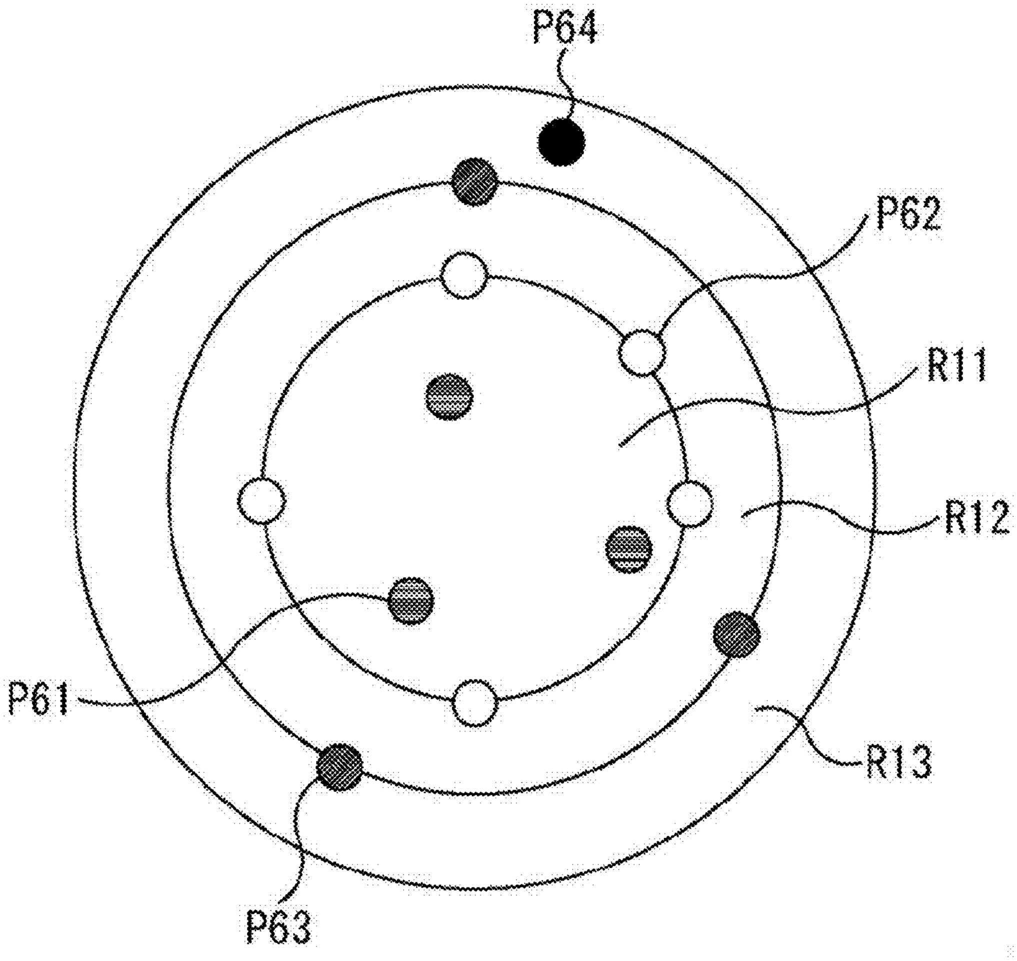
FIG. 27 is a diagram explaining grouping of CVPs.

For example, it is assumed that the free viewpoint space is divided into three regions of a group region R11 to a group region R13 as depicted in FIG. 27. Note that each of small circles in FIG. 27 represents a CVP.

The group region R11 is a circular region (space), the group region R12 is an annular region surrounding the outside of the group region R11, and the group region R13 is an annular region surrounding the outside of the group region R12.

In this example, it is assumed that the group region R12 is a region in a transition section between the group region R11 and the group region R13. Accordingly, for example, the region (space) inside the live show venue may be designated as the group region R11, the region outside the live show venue may be designated as the group region R13, and the region between the inside and the outside of the live show venue may be designated as the group region R12. Note that each of the group regions is set in such a manner as not to produce an overlapping part (region).

In this example, the CVPs used for the interpolation process are divided into groups according to the position of the listener. In other words, the creator groups the CVPs in correspondence with the group regions by designating ranges of the group regions.

For example, grouping is achieved in such a manner that each of the CVPs positioned within the free viewpoint space belongs to at least any one of a CVP group GP1 corresponding to the group region R11, a CVP group GP2 corresponding to the group region R12, and a CVP group GP3 corresponding to the group region R13. In this case, one CVP may belong to a plurality of different CVP groups.

Specifically, grouping is achieved in such a manner that the CVPs located in the group region R11 belong to the CVP group GP1, that the CVPs located in the group region R12 belong to the CVP group GP2, and that the CVPs located in the group region R13 belong to the CVP group GP3.

Accordingly, for example, the CVP located at a position P61 within the group region R11 belongs to the CVP group GP1, while the CVP located at a position P62, which is a boundary position between the group region R11 and the group region R12, belongs to both the CVP group GP1 and the CVP group GP2.

Moreover, the CVP located at a position P63, which is a boundary position between the group region R12 and the group region R13, belongs to both the CVP group GP2 and the CVP group GP3, while the CVP located at a position P64 within the group region R13 belongs to the CVP group GP3.

Figure 28:
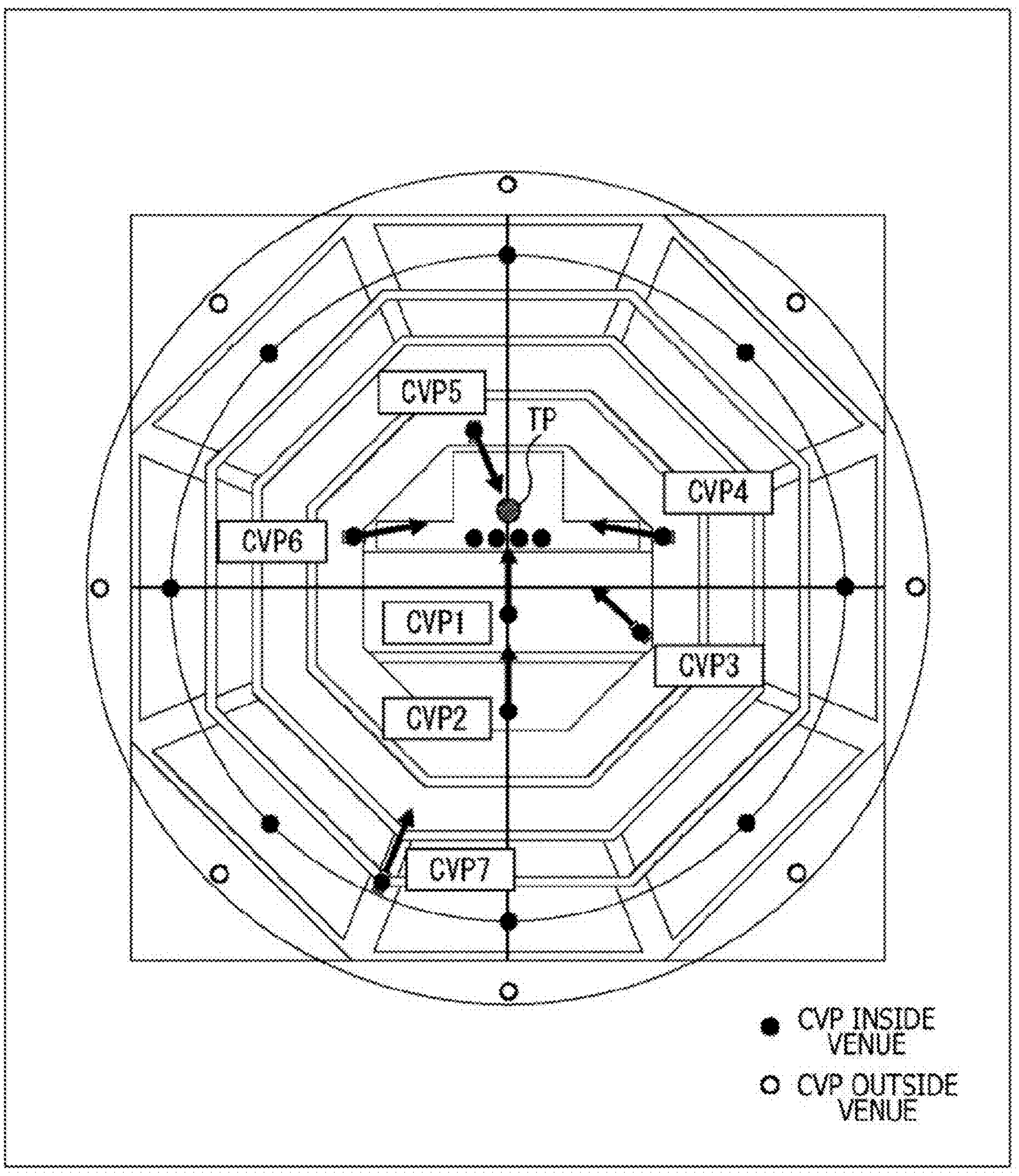
FIG. 28 is a diagram explaining CVP groups and an interpolation process.

If such grouping is applied to the live show venue as the free viewpoint space depicted in FIG. 11, a state depicted in FIG. 28 is produced, for example.

In this example, CVP1 to CVP7 each indicated by a black circle in the figure are contained in a group region (group space) corresponding to the inside of the live show venue, while CVPs each indicated by a white circle are contained in a group region corresponding to the outside of the live show venue, for example.

Note that a specific CVP inside the live show venue and a specific CVP outside the live show venue may be linked with each other (associated with each other) in configuration information, for example. In such a case, when the listener is located between the two CVPs, for example, listener reference object position information may be obtained by vector synthesis using the two CVPs. Moreover, in this case, a gain of a predetermined object to be muted may be set to 0.

The example of FIG. 28 will further specifically be described with reference to FIGS. 29 and 30. Note that corresponding parts in FIGS. 29 and 30 are given identical reference signs, and description of these parts will be omitted where appropriate.

Figure 29:
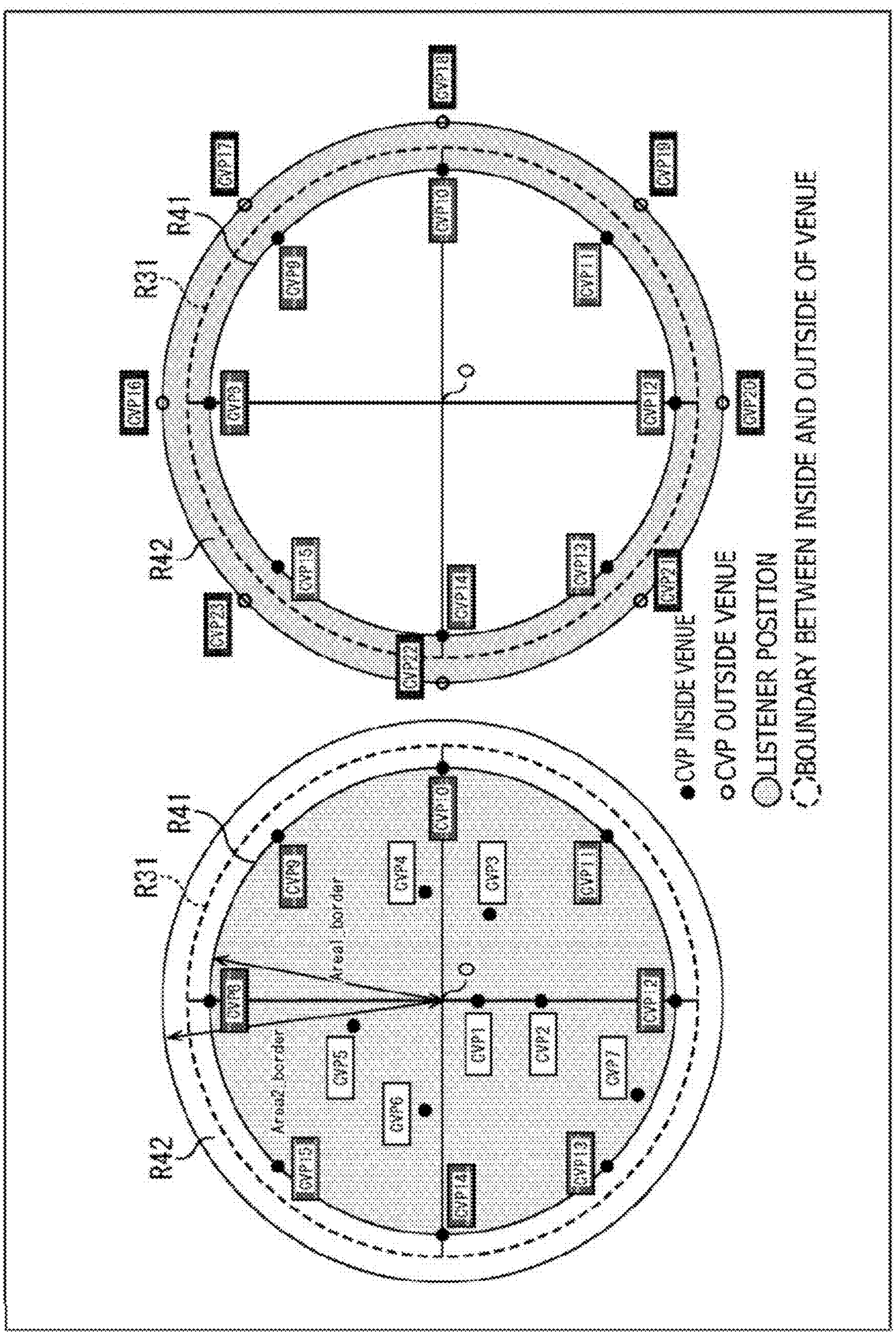
FIG. 29 is a diagram explaining CVP groups and the interpolation process.
Figure 30:
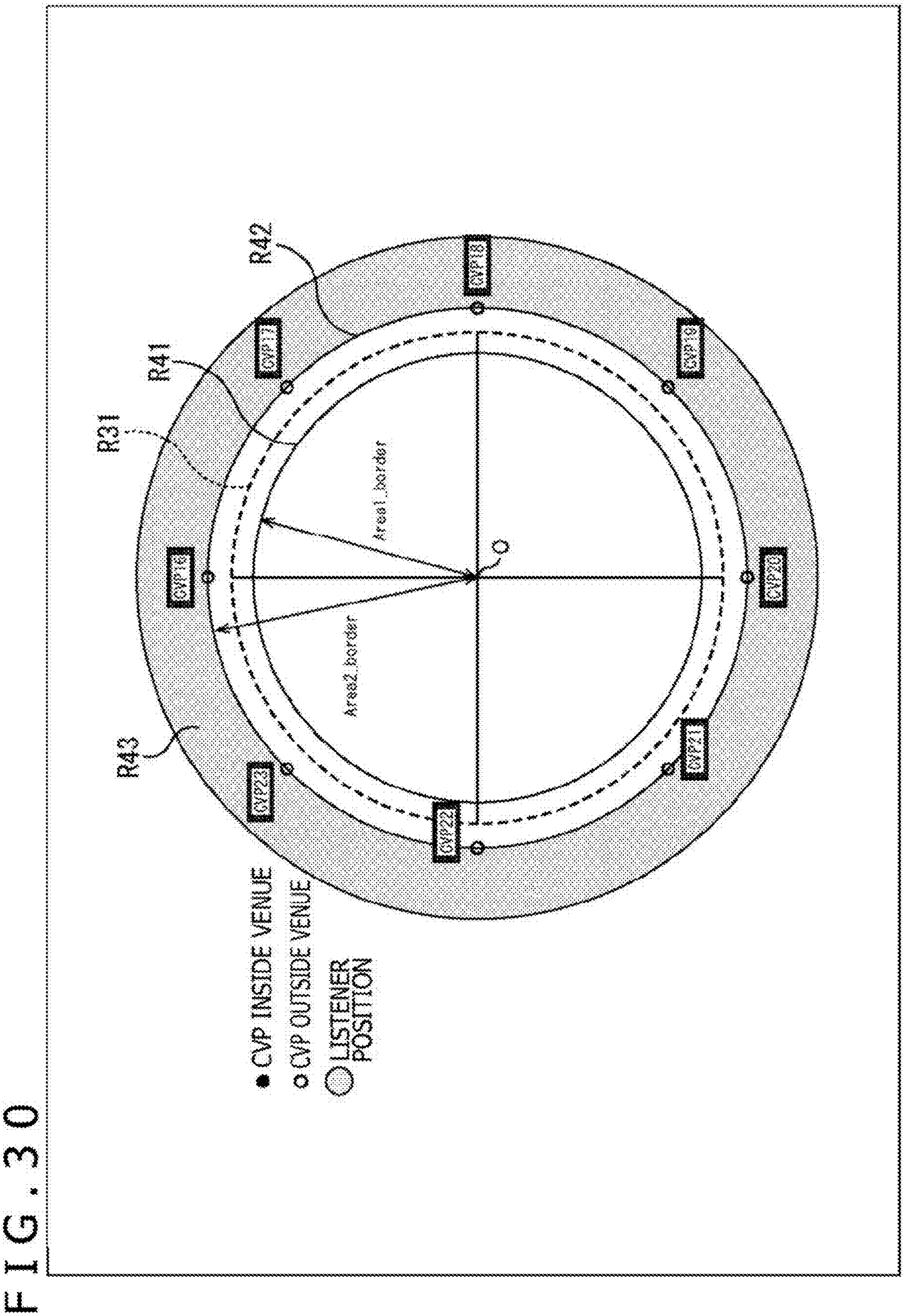
FIG. 30 is a diagram explaining CVP groups and the interpolation process.

For example, as depicted in FIG. 29, it is assumed that a circular region around a center located at an origin O of a common absolute coordinate system in a free viewpoint space is designated as a region inside the live show venue.

Particularly, herein, a circular region R31 drawn by a dotted line corresponds to a region inside the live show venue, while a region outside the region R31 corresponds to a region outside the live show venue.

Moreover, CVP1 to CVP15 are positioned inside the live show venue, while CVP16 to CVP23 are positioned outside the live show venue.

In this case, for example, a region inside a circle having a center located at the origin O and a radius Area1_border is designated as one group region R41, while a group of CVPs including the CVP1 to the CVP15 contained in the group region R41 is designated as a CVP group GPI corresponding to the group region R41. The group region R41 is a region inside the live show venue.

Moreover, as depicted in a right part of the figure, a region between a boundary of the circle having the center located at the origin O and having the radius Area1_border and a boundary of a circle having the center located at the origin O and having a radius Area2_border is designated as a group region R42. The group region R42 is a transition region between the inside and the outside the live show venue.

The group of the CVPs including the CVP8 to the CVP23 and contained in the group region R42 is designated as a CVP group GPM corresponding to the group region R42.

Particularly in this example, the CVP8 to the CVP15 are located at the boundary between the group region R41 and the group region R42. Accordingly, the CVP8 to the CVP15 belong to both the CVP group GPI and the CVP group GPM.

Further, as depicted in FIG. 30, a region that is disposed outside the circle having the center located at the origin O and the radius Area2_border and that contains the boundary of this circle is designated as a group region R43. The group region R43 is a region outside the live show venue.

The group of the CVPs including the CVP16 to the CVP23 and contained in the group region R43 is designated as a CVP group GPO corresponding to the group region R43. Particularly in this example, the CVP16 to the CVP23 are located at the boundary between the group region R42 and the group region R43. Accordingly, the CVP16 to the CVP23 belong to both the CVP group GPM and the CVP group GPO.

In a case where the group regions and the CVP groups are defined as described above, the position calculation unit 114 performs an interpolation process in a manner described below to obtain listener reference object position information and a listener reference gain.

Specifically, as depicted in a left part of FIG. 29, for example, the position calculation unit 114 performs the interpolation process using some or all of the CVP1 to the CVP15 belonging to the CVP group GPI when the listening position is located within the group region R41.

Moreover, as depicted in the right part of FIG. 29, for example, the position calculation unit 114 performs the interpolation process using some or all of the CVP8 to the CVP23 belonging to the CVP group GPM when the listening position is located within the group region R42.

Furthermore, as depicted in FIG. 30, for example, the position calculation unit 114 performs the interpolation process using some or all of the CVP16 to the CVP23 belonging to the CVP group GPO when the listening position is located within the group region R43.

Figure 31:
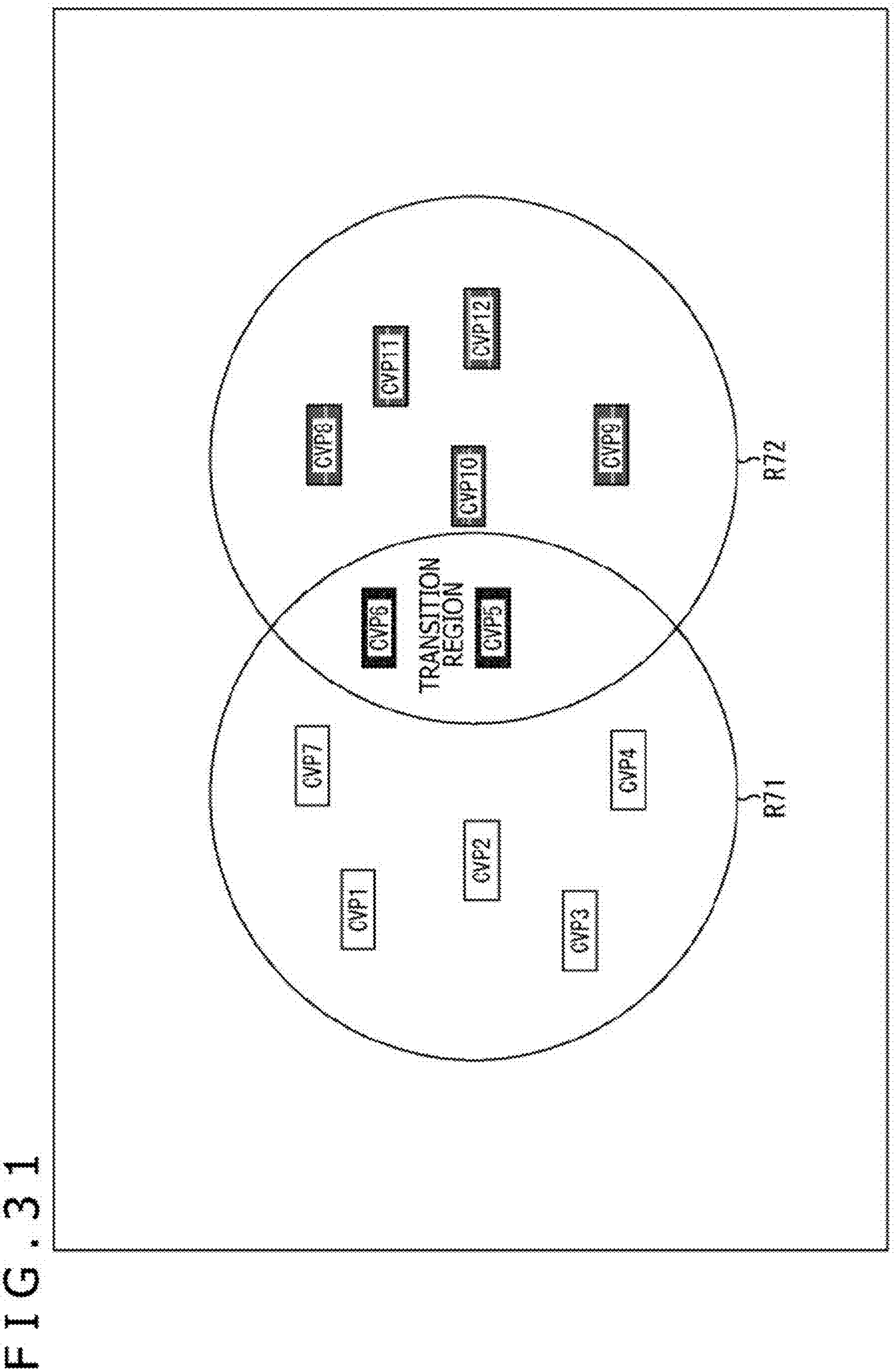
FIG. 31 is a diagram explaining CVP groups and the interpolation process.

Note that described above has been the example which defines the group regions each having a concentric shape. However, for example, regions R71 and R72 that have center positions different from each other and that each have a circular shape and include a transition region overlapping each other may be defined as depicted in FIG. 31.

In this example, the CVP1 to the CVP7 are contained in the region R71, while the CVP5, the CVP6, and the CVP8 to the CVP12 are contained in the region R72. Moreover, the CVP5 and the CVP6 are contained in the transition region which is a region where the region R71 and the region R72 overlap each other.

It is assumed herein that a region included in the region R71 but other than the transition region, a region included in the region R72 but other than the transition region, and the transition region are each designated as a group region.

In such a case, when the listening position is located within the region included in the region R71 but other than the transition region, for example, the interpolation process is performed using some or all of the CVP1 to the CVP7.

Moreover, when the listening position is located within the transition region, for example, the interpolation process is performed using the CVP5 and the CVP6. Furthermore, when the listening position is located within the region included in the region R72 but other than the transition region, the interpolation process is performed using some or all of the CVP5, the CVP6, and the CVP8 to the CVP12.

As described above, in a case where the creator is allowed to designate the group region, i.e., the CVP group, configuration information has a format presented in FIG. 32, for example.

In the example presented in FIG. 32, a format similar to the format presented in FIG. 7 is basically adopted. The configuration information contains frame length index "FrameLengthIndex," number-of-object information "NumOfObjects," number-of-CVP information "NumOfControlViewpoints," number-of-metadata-set information "NumOfObjectMetaSets," CVP information "ControlViewpointInfo(i)," and coordinate mode information "CoordinateMode[i][j]."

Moreover, the configuration information presented in FIG. 32 further includes a CVP group information presence flag "cvp_group_present."

The CVP group information presence flag "cvp_group_present" is flag information indicating whether or not CVP group information "CvpGroupInfo2D( )," which is information associated with the CVP group, is contained in the configuration information.

For example, in a case where the CVP group information presence flag has a value "1," the CVP group information "CvpGroupInfo2D( )" is stored the configuration information. In a case where the CVP group information presence flag has a value "0," the CVP group information "CvpGroupInfo2D( )" is not stored in the configuration information.

Moreover, the CVP group information "CvpGroupInfo2D( )" contained in the configuration information has a format presented in FIG. 33, for example. Note that described herein is an example of a case where the free viewpoint space is a two-dimensional region (space) for simplifying the description. Needless to say, however, the CVP group information presented in FIG. 33 may further be applied to a case where the free viewpoint space is a three-dimensional region (space).

In this example, "numOfCVPGroup" indicates the number of CVP groups, i.e., the CVP group count. The same number of pieces of information associated with the CVP group described below as the number of CVP groups are stored in the CVP group information.

"vertex_idx" indicates a number-of-vertex index. The number-of-vertex index is index information indicating the number of vertexes of the group region corresponding to the CVP group.

For example, in a case where the value of the number-of-vertex index ranges from 0 to 5, the group region is identified as a polygonal region having the number of vertexes calculated by adding 3 to the value of the number-of-vertex index. Moreover, in a case where the value of the number-of-vertex index is 225, for example, the group region is identified as a circular region.

In a case where the value of the number-of-vertex index is 255, i.e., in a case where the shape type of the group region is a circle, a normalized X coordinate "center_x[i]," a normalized Y coordinate "center_y[i]," and a normalized radius "radius[i]" are stored in the CVP group information as information for identifying the group region (the boundary of the group region) having a circular shape.

For example, the normalized X coordinate "center_x[i]" and the normalized Y coordinate "center_y[i]" are items of information indicating an X coordinate and a Y coordinate, respectively, of the center of the circle corresponding to the group region in the common absolute coordinate system (free viewpoint space), while the normalized radius "radius [i]" is a radius of the circle corresponding to the group region. In this manner, which region corresponds to the group region in the free viewpoint space can be identified.

Moreover, in a case where the value of the number-of-vertex index is any one of values in a range from 0 to 5, i.e., in a case where the group region is a polygonal region, a normalized X coordinate "border_pos_x[j]" and a normalized Y coordinate "border_pos_y[j]" are stored in the CVP group information for each of the vertexes of the group region.

For example, the normalized X coordinate "border_pos_x [j]" and the normalized Y coordinate "border_pos_y[j]" are items of information indicating an X coordinate and a Y coordinate, respectively, of the jth vertex of the polygonal region as the group region in the common absolute coordinate system (free viewpoint space).

The polygonal region as the group region in the free viewpoint space can be identified on the basis of the normalized X coordinate and the normalized Y coordinate of each of the vertexes described above.

Moreover, number-of-in-group-CVP information "numOfCVP_ingroup[i]" indicating the number of CVPs belonging to the CVP group, and further the same number of in-group CVP indexes "CvpIndex_ingroup[i][j]" as the number indicated by the number-of-in-group-CVP information are stored in the CVP group information. The in-group CVP index "CvpIndex_ingroup[i][j]" is index information for identifying the jth CVP belonging to the ith CVP group.

For example, the value of the in-group CVP index indicating a predetermined CVP may be equalized with the value of the CVP index that is contained in the CVP information and indicates the predetermined CVP.

As described above, the CVP group information includes the number of CVP groups, the number-of-vertex index for indicating the shape type of the group region, the information for identifying the group region, the number-of-in-group-CVP information, and the in-group CVP index. Particularly, the information for identifying the group region is considered as information for identifying the boundary of the group region.

Figure 14:
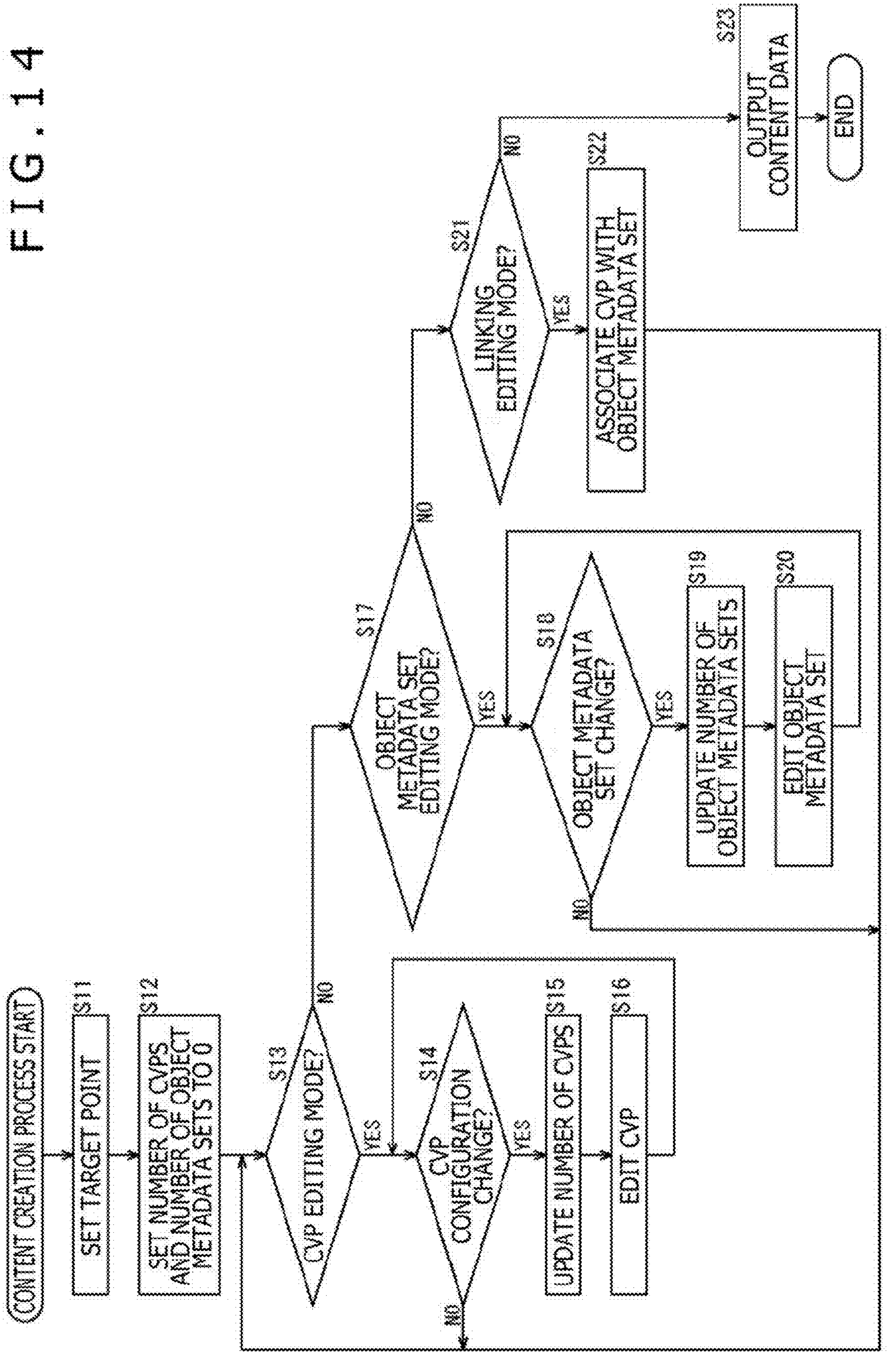
FIG. 14 is a flowchart explaining a content creation process.

Note that the information processing device 11 basically performs the content creation process described with reference to FIG. 14 in a similar manner in a case where the configuration information in the format presented in FIG. 32 is generated.

In this case, however, the creator performs operations for designating the group region and the CVPs belonging to the CVP group at any timing such as in step S11 and step S16, for example.

In this case, the control unit 26 determines (sets) the group region and the CVPs belonging to the CVP group according to the operations performed by the creator. Thereafter, the control unit 26 in step S23 generates the configuration information that is presented in FIG. 32 and that contains the CVP group information presented in FIG. 33 as necessary on the basis of a setting result of the group region and the CVPs belonging to the CVP group.

<Description of Reproduction Audio Data Generation Process>

Figure 34:
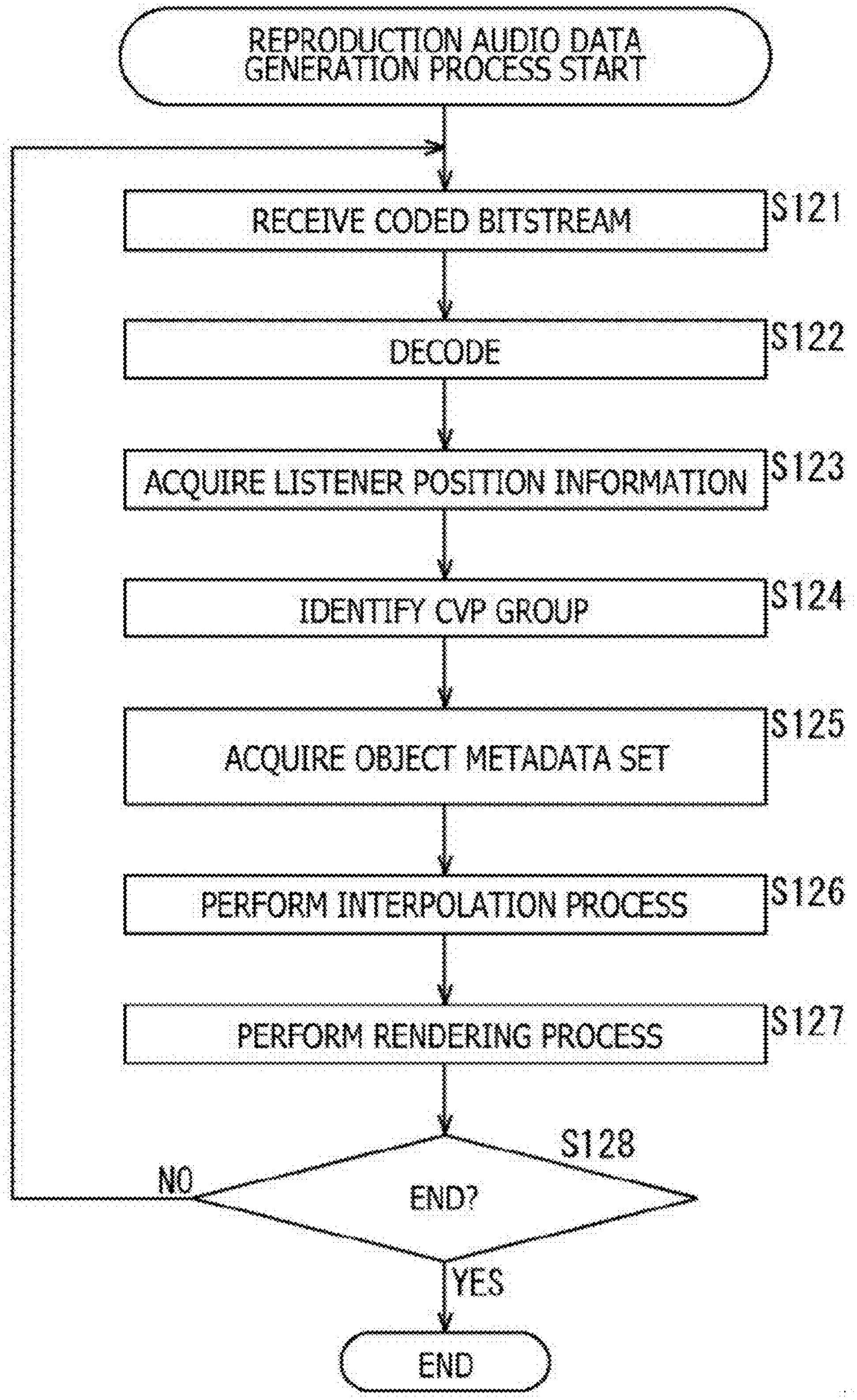
FIG. 34 is a flowchart explaining a reproduction audio data generation process.

In addition, in a case where configuration information has the format presented in FIG. 32, the client 101 performs a reproduction audio data generation process presented in FIG. 34, for example.

The reproduction audio data generation process performed by the client 101 will hereinafter be described with reference to a flowchart presented in FIG. 34.

Note that processing from step S121 to step S123 is similar to the processing from step S81 to step S83 in FIG. 18. Accordingly, description of the processing is omitted.

In step S124, the position calculation unit 114 identifies a CVP group corresponding to a group region including a listening position on the basis of listener position information and configuration information.

For example, the position calculation unit 114 identifies the group region containing the listening position (hereinafter referred to also as a target group region) on the basis of a normalized X coordinate and a normalized Y coordinate each corresponding to information which is contained in CVP group information included in the configuration information and is provided for identifying regions corresponding to respective group regions.

In addition, when the listening position is located at a boundary position between multiple group regions, the multiple group regions are designated as target group regions.

When the target group region is identified in this manner, identification of the CVP group corresponding to the target group region is considered to be completed.

In step S125, the position calculation unit 114 designates the respective CVPs belonging to the identified CVP group as target CVPs and acquires object metadata sets associated with the target CVPs.

For example, the position calculation unit 114 reads an in-group CVP index of the CVP group corresponding to the target group region from the CVP group information to identify the CVPs belonging to the CVP group, i.e., the target CVPs.

Moreover, the position calculation unit 114 reads a metadata set index associated with the respective target CVPs from the CVP information to identify the object metadata set corresponding to the target CVPs, and reads the identified object metadata set.

After completion of the processing in step S125, processing from step S126 to step S128 is then performed. Thereafter, the reproduction audio data generation process ends. This processing is similar to the processing from step S84 to step S86 in FIG. 18. Accordingly, description of the processing is omitted.

In step S126, however, the interpolation process is carried out using some or all of the target CVPs identified in step S124 and step S125. Specifically, listener reference object position information and a listener reference gain are calculated using CVP position information associated with the target CVPs and object position information.

In this manner, reproduction audio data for reproducing an appropriate sound field can be obtained according to the position of the listener, such as a case where the listener is present inside the live show venue and a case where the listener is present outside the live show venue.

In the manner described above, the client 101 performs the interpolation process using appropriate CVPs on the basis of the listener position information, the configuration information, and the object metadata set, and calculates the listener reference gain and the listener reference object position information at the listening position.

In this manner, content reproduction having musicality can be achieved according to intention of the content creator, and therefore, amusingness of the content can sufficiently be conveyed to the listener.

Third Embodiment

<Object Position Information and Gain Interpolation Process>

Meanwhile, a plurality of CVPs set by the content creator beforehand is present in the free viewpoint space. Described above has been the specific example which uses a reciprocal ratio of a distance from any current position of the listener (listening position) to each of CVPs for the interpolation process for obtaining listener reference object position information and a listener reference gain.

In this example, it is assumed that a large value of an object gain is set for the CVP located at a long distance from the listening position, for example.

In this case, it may not be possible to reduce an auditory effect that is produced by the gain of the object for the CVP located away from the listening position and that is imposed on the listener reference gain, i.e., a sound of the object heard by the listener, even in a state where the CVP is originally located at a long distance from the listening position. In such a case, audio image movement of the sound of the object presented to the listener consequently becomes unnatural, and therefore, sound quality of content deteriorates.

The case where unnatural audio image movement is caused due to the foregoing positional relation between the listening position and the CVP will hereinafter be referred to also as a case A.

Moreover, assuming that a gain of an object at a particular CVP is set to 0, the content creator may not be aware of the object position of this object, and therefore, this object position may be kept neglected. Specifically, the content creator may neglect the object whose gain has been set to 0, without setting the object position. As a result, object position information may be set to an inappropriate value.

However, such neglected object position information is also used for the interpolation process for obtaining listener reference object position information. In this case, the position of the object as viewed from the listener may be positioned at a location not intended by the content creator under the effect of the neglected and inappropriate object position information.

The case where the position of the object as viewed from the listener and indicated by the listener reference object position information is positioned at a location not intended by the content creator under the effect of the neglected object position will hereinafter be referred to also as a case B.

Higher-quality content reproduction based on intention of the content creator is achievable by reducing occurrence of the case A and the case B described above.

Accordingly, a third embodiment is aimed at reduction of occurrence of the case A and the case B described above.

For example, to the case A where the listener reference gain is affected by the large object gain at the CVP located at a distance away from the current listening position, a sensitivity coefficient for raising the distance to the Nth power for sensitivity adjustment is applied using all CVPs.

In this manner, weighting of degrees of dependency (contribution rates) of the respective CVPs is achieved for the interpolation process for obtaining the listener reference gain. The method for reducing occurrence of the case A by applying the sensitivity coefficient will hereinafter particularly be referred to also as a method SLA1.

The degree of the effect of the CVP located away from the current listening position can further be lowered by appropriately controlling the sensitivity coefficient. Accordingly, occurrence of the case A can be reduced. In this manner, reduction of unnatural gain fluctuations is achievable when the listener moves between the CVPs, for example.

Note that the value of the sensitivity coefficient, i.e., the value of N, is a Float value or the like. The value of the sensitivity coefficient for each of the CVPs may be written to configuration information as a default value corresponding to intention of the content creator and transferred to the client 101, or the value of the sensitivity coefficient may be set on the listener side.

Moreover, the sensitivity coefficient for each of the CVPs may be a value common to all the objects. Alternatively, the sensitivity coefficient may be individually set for each of the objects according to intention of the content creator for each of the CVPs. Furthermore, a sensitivity coefficient common to all objects or a sensitivity coefficient for each of the objects may be set for each group including one or a plurality of CVPs.

On the other hand, for the case B where listener reference object position information not meeting intention of the content creator is calculated by adding object position information associated with the neglected object, such as an object having a gain of 0, to elements of a vectorial sum in the interpolation process, a gain is added to contribution items, or only objects each having a gain larger than 0 are used. Specifically, a method SLB1 or a method SLB2 described below is applied to reduce occurrence of the case B.

According to the method SLB1, an object having a gain of a predetermined threshold or smaller at a CVP is regarded as an object having a gain of 0 (hereinafter referred to also as a mute object). In addition, object position information at a CVP for an object regarded as a mute object is not used for the interpolation process. In other words, this CVP is excluded from target CVPs used for the interpolation process.

The method SLB2 uses a Mute flag indicating whether or not the gain of the object designated by the content creator or the like is 0, i.e., whether or not the object is a mute object.

Specifically, object position information associated with a CVP corresponding to a mute object on the basis of the Mute flag is not used for the interpolation process. In other words, the CVP corresponding to the object recognized beforehand as an object not to be used is excluded from target CVPs used for the interpolation process.

According to the method SLB1 and the method SLB2 described above, an appropriate interpolation process using only CVPs corresponding to objects not regarded as objects each having a gain of 0 is achievable by excluding the CVP of the object regarded as a neglected object having a gain of 0 from the processing targets.

Particularly, the method SLB2 can eliminate the necessity of a process for checking whether the gain of each of the objects is regarded as 0 for all CVPs like the process performed by the method SLB1 for each frame. Accordingly, a processing load can further be reduced.

<CVP Positioning Pattern PTT1>

Described next will be an example of an actual CVP positioning pattern where the case A or the case B described above occurs.

Figure 35:
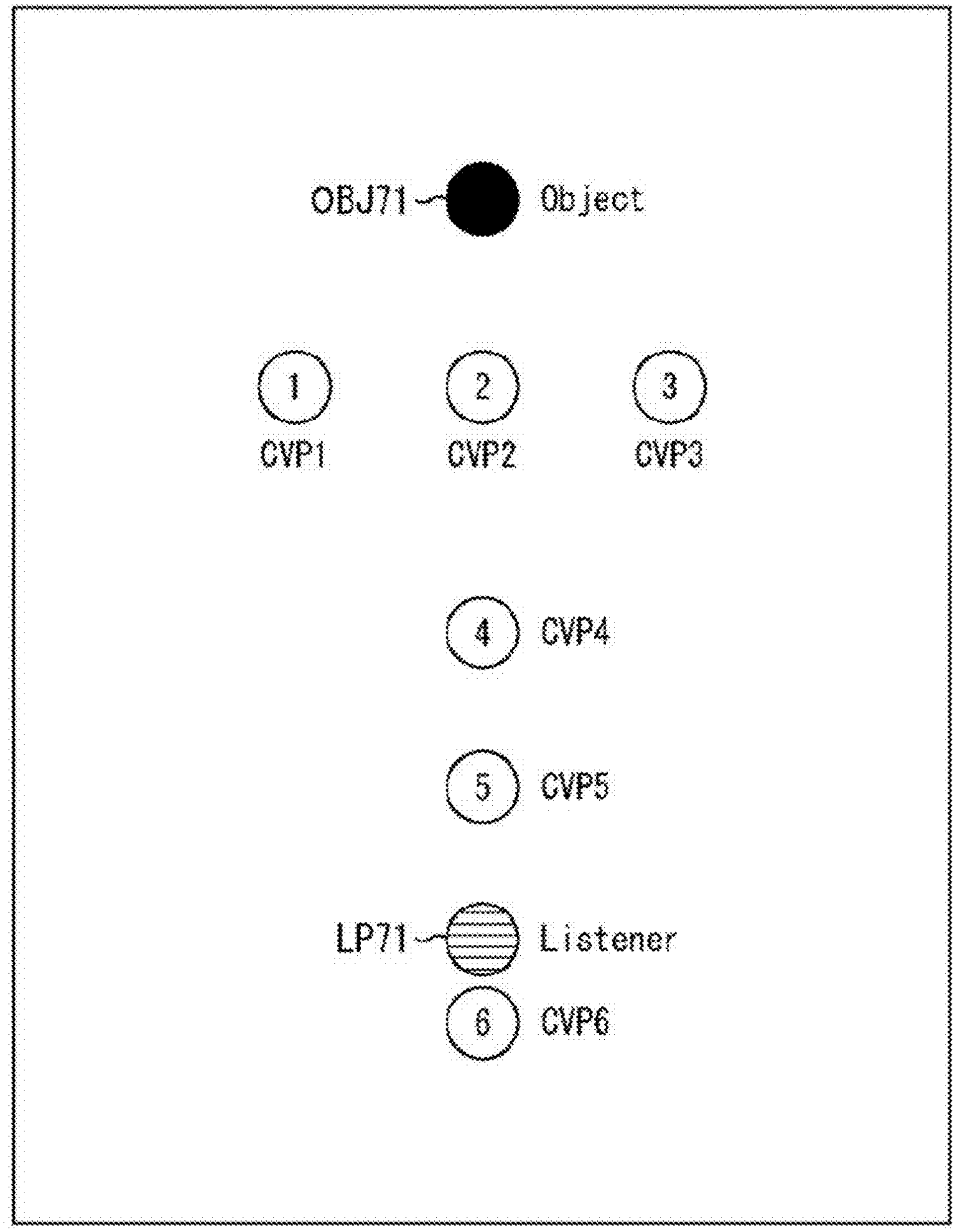
FIG. 35 is a diagram presenting an example of positioning patterns of CVPs.

Initially, FIG. 35 depicts a first CVP positioning pattern (hereinafter referred to also as a CVP positioning pattern PTT1). In this example, an object is positioned on the front side with respect to each of CVPs.

In FIG. 35, each circle to which a numerical value is given represents one CVP. Particularly, the numerical value given to the inside of the circle representing the corresponding CVP indicates what number the corresponding CVP is. It is assumed hereinafter that a kth CVP to which a numerical value k (k: 1, 2, and up to 6) is given will particularly be referred to as CVPk.

It is assumed that this example focuses on a certain one object OBJ71 present in the free viewpoint space.

For example, for each of a CVP1 to a CVP6 positioned in the free viewpoint space, object position information and a gain associated with an object OBJ71 as viewed from the corresponding CVP are determined.

It is considered herein to obtain listener reference object position information and a listener reference gain associated with a predetermined listening position LP71 by performing the interpolation process using the equations (7) to (11) described above on the basis of the object position information and the gains at the CVP1 to the CVP6.

In such a case, neither the case A nor the case B described above occurs if the gain of the object OBJ71 has the same value other than 0 for each of the CVP1 to the CVP6, for example.

On the other hand, if the gain of the object OBJ71 at each of the CVP1 to the CVP3 is larger than the gain of the object OBJ71 at each of the CVP5 and the CVP6, for example, the case A may occur.

This is because the original large gain considerably affects the listener reference gain even in a state where each proportion ratio of the CVP1 to the CVP3 is small, i.e., a contribution rate dp(i) obtained by calculation similar to the calculation of the equations (4) to (6) is small, due to a long (far) distance from the listening position LP71 to each of the CVP1 to the CVP3.

Moreover, the object OBJ71 is a mute object at the CVP6, for example. However, when an angle Azimuth in the horizontal direction as object position information is considerably different from angles Azimuth at other CVPs, such as −180 degrees, the case B occurs. This is because an effect of the object position information at the CVP6 closest to the listening position LP71 increases at the time of calculation of the listener reference object position information.

Figure 36:
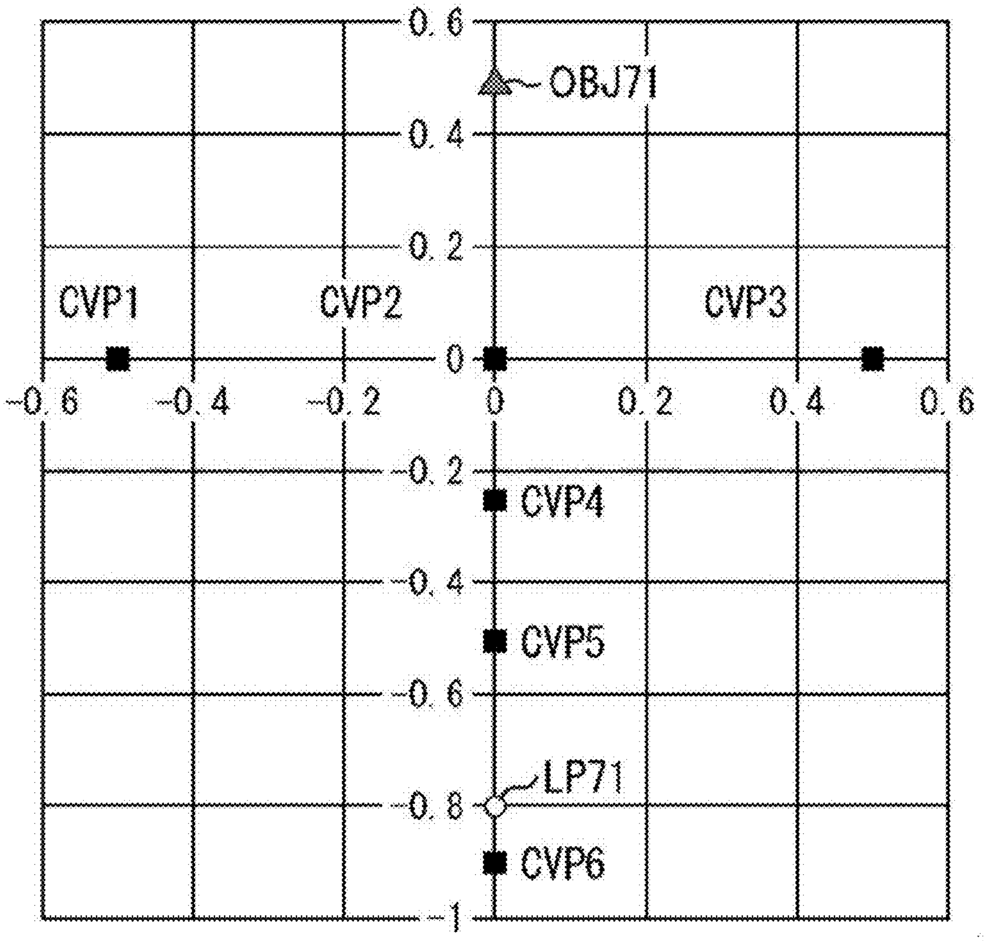
FIG. 36 is a diagram presenting a positioning example of CVPs and the like in a common absolute coordinate system.

FIG. 36 herein depicts a positioning example of CVPs and the like in the common absolute coordinate system when a positional relation between the listener and the CVPs has a relation presented in FIG. 35 (CVP positioning pattern PTT1) in the free viewpoint space which is substantially a two-dimensional plane. Note that parts in FIG. 36 similar to corresponding parts in FIG. 35 are given identical reference signs, and description of these parts will be omitted where appropriate.

In FIG. 36, a horizontal axis and a vertical axis represent an X axis and a Y axis, respectively, in the common absolute coordinate system. Moreover, assuming that a position (coordinates) in the common absolute coordinate system is expressed as (x, y), the listening position LP71 is expressed as (0, −0.8), for example.

FIG. 37 presents an example of an object position and a gain of the object OBJ71 at each of the CVPs and an example of listener reference object position information and a listener reference gain of the object OBJ71 at each of the CVPs in such positioning in the common absolute coordinate system when the case A or the case B occurs. Note that a contribution rate dp(i) in the example of FIG. 37 is obtained by calculation similar to the calculation of the equations (4) to (6) described above.

In FIG. 37, an example of the object position and the gain of the object OBJ71 at the time of occurrence of the case A is presented in a column of a character "Case A."

Particularly, "azi(0)" represents an angle Azimuth as object position information associated with the object OBJ71, while "Gain(0)" represents a gain of the object OBJ71.

In this example, the gain (Gain(0)) at each of the CVP1 to the CVP3 is "1," while the gain (Gain(0)) at each of the CVP5 and the CVP6 is "0.2." In this case, the gain at each of the CVP1 to CVP3 away from the listening position LP71 is larger than the gain at each of the CVP5 and the CVP6 near the listening position LP71. Accordingly, the listener reference gain (Gain(0)) at the listening position LP71 is "0.37501."

In this example, the listening position LP71 is positioned between the CVP5 and the CVP6 each corresponding to the gain of 0.2. Accordingly, the listener reference gain ideally has a value close to the gain "0.2" at each of the CVP5 and the CVP6. In an actual situation, however, the listener reference gain has the value "0.37501" larger than "0.2" due to the effect of the CVP1 to the CVP3 each having a large gain.

Moreover, an example of the object position and the gain of the object OBJ71 at the time of occurrence of the case B is presented in a column of a character "Case B."

Particularly, "azi(1)" represents an angle Azimuth as object position information associated with the object OBJ71, while "Gain(1)" represents a gain of the object OBJ71.

In this example, the gain (Gain(1)) and the angle Azimuth (azi(1)) at each of the CVP1 to the CVP5 are "1" and "0," respectively. Accordingly, the object OBJ71 is not a mute object at each of the CVP1 to the CVP5.

On the other hand, the gain (Gain(1)) and the angle Azimuth (azi(1)) at the CVP6 are "0" and "120," respectively. Accordingly, the object OBJ71 is a mute object at the CVP6.

Moreover, the angle Azimuth (azi(1)) as the listener reference object position information at the listening position LP71 is "67.87193."

In this example, the gain (Gain(1)) at the CVP6 is "0." Accordingly, the angle Azimuth (azi(1)) "120" at the CVP6 needs to be ignored. In an actual situation, however, the angle Azimuth at the CVP6 is used for calculation of the listener reference object position information. Accordingly, the angle Azimuth (azi(1)) at the listening position LP71 becomes "67.87193" which is considerably larger than "0."

<CVP Positioning Pattern PTT2>

Figure 38:
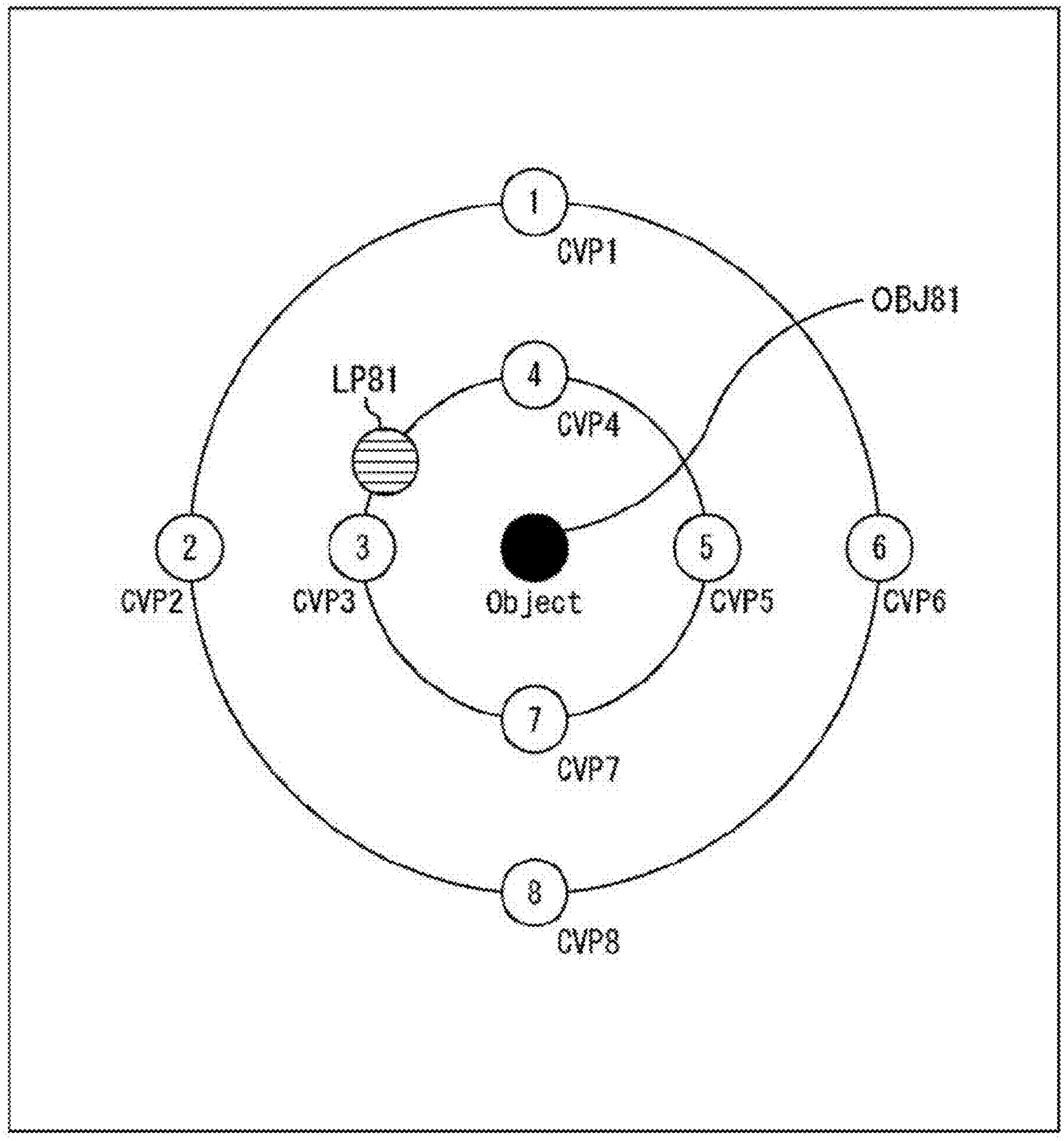
FIG. 38 is a diagram presenting an example of positioning patterns of CVPs.

Subsequently, FIG. 38 depicts a second CVP positioning pattern (hereinafter referred to also as a CVP positioning pattern PTT2). In this example, respective CVPs are positioned at such locations as to surround an object.

As in the case of FIG. 35, a circle to which a numerical value is given represents one CVP in FIG. 38. It is assumed that a kth CVP to which a numerical value k (k: 1, 2, and up to 8) is given is particularly referred to also as CVPk.

This example considered herein focuses on one object OBJ81 and performs the interpolation process for the listening position LP81 with use of the equations (7) to (11) described above on the basis of object position information and gains at a CVP1 to a CVP8.

In such a case, neither the case A nor the case B described above occurs if the gain of the object OBJ81 has the same value other than 0 for each of the CVP1 to the CVP8, for example.

On the other hand, if the gain of the object OBJ81 at each of the CVP1, the CVP2, the CVP6, and the CVP8 is larger than the gain of the object OBJ81 at each of the CVP3 and the CVP4, for example, the case A may occur.

This is because the original large gain considerably affects the listener reference gain even in a state where each proportion ratio of the CVP1, the CVP2, the CVP6, and the CVP8 is small due to a long (far) distance from the listening position LP81 to the CVP1, the CVP2, the CVP6, and the CVP8.

Moreover, the object OBJ81 is a mute object at the CVP3, for example. However, when an angle Azimuth in the horizontal direction as object position information is considerably different from angles Azimuth at other CVPs, such as −180 degrees, the case B occurs. This is because an effect of object position information at the CVP3 closest to the listening position LP81 increases at the time of calculation of the listener reference object position information.

Figure 39:
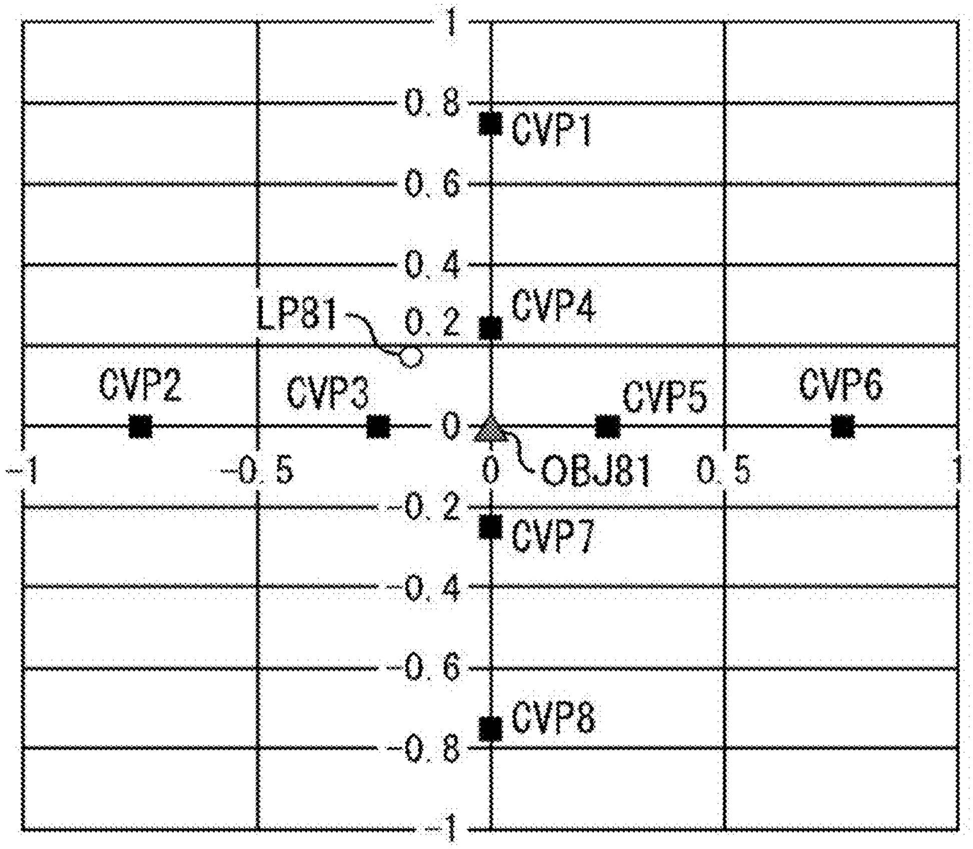
FIG. 39 is a diagram presenting a positioning example of CVPs and the like in the common absolute coordinate system.

FIG. 39 herein depicts a positioning example of CVPs and the like in the common absolute coordinate system when a positional relation between the listener and the CVPs has a relation presented in FIG. 38 (CVP positioning pattern PTT2) in the free viewpoint space which is substantially a two-dimensional plane. Note that parts in FIG. 39 similar to corresponding parts in FIG. 38 are given identical reference signs, and description of these parts will be omitted where appropriate.

In FIG. 39, a horizontal axis and a vertical axis represent an X axis and a Y axis, respectively, in the common absolute coordinate system. Moreover, assuming that a position (coordinates) in the common absolute coordinate system is expressed as (x, y), the listening position LP81 is expressed as (−0.1768, 0.176777), for example.

FIG. 40 presents an example of an object position and a gain of the object OBJ81 at each of the CVPs and an example of listener reference object position information and a listener reference gain of the object OBJ81 at each of the CVPs in such positioning in the common absolute coordinate system when the case A or the case B occurs. Note that a contribution rate dp(i) in the example of FIG. 40 is obtained by calculation similar to the calculation of the equations (4) to (6) described above.

In FIG. 40, an example of the object position and the gain of the object OBJ81 at the time of occurrence of the case A is presented in a column of a character "Case A."

Particularly, "azi(0)" represents an angle Azimuth as object position information associated with the object OBJ81, while "Gain(0)" represents a gain of the object OBJ81.

In this example, the gain (Gain(0)) at each of the CVP1, the CVP2, the CVP6, the CVP8 is "1," while the gain (Gain(0)) at each of the CVP3 and the CVP4 is "0.2." Accordingly, the listener reference gain (Gain(0)) at the listening position LP81 is "0.501194."

In this example, the listening position LP81 is positioned between the CVP3 and the CVP4 each corresponding to the gain of 0.2. Accordingly, the listener reference gain ideally has a value close to the gain "0.2" at each of the CVP3 and the CVP4. In an actual situation, however, the listener reference gain has the value "0.501194" larger than "0.2" due to the effect of the CVP1, the CVP2, and the like each having a large gain.

Moreover, an example of the object position and the gain of the object OBJ81 at the time of occurrence of the case B is presented in a column of a character "Case B."

Particularly, "azi(1)" represents an angle Azimuth as object position information associated with the object OBJ81, while "Gain(1)" represents a gain of the object OBJ81.

In this example, the gain (Gain(1)) and the angle Azimuth (azi(1)) at each of the CVPs other than the CVP3 are "1" and "0," respectively. Accordingly, the object OBJ81 is not a mute object at each of the CVPs other than the CVP3.

On the other hand, the gain (Gain(1)) and the angle Azimuth (azi(1)) at the CVP3 are "0" and "120," respectively. Accordingly, the object OBJ81 is a mute object at the CVP3.

Moreover, the angle Azimuth (azi(1)) as the listener reference object position information at the listening position LP81 is "20.05743."

In this example, the gain (Gain(1)) at the CVP3 is "0." Accordingly, the angle Azimuth (azi(1)) "120" at the CVP3 needs to be ignored. In an actual situation, however, the angle Azimuth at the CVP3 is used for calculation of the listener reference object position information. As a result, the angle Azimuth (azi(1)) at the listening position LP81 becomes "20.05743" which is considerably larger than "0."

According to this embodiment, occurrence of the case A and the case B described above is reduced by the method SLA1, the method SLB1, and the method SLB2.

In the method SLA1, a sensitivity coefficient is set to N, and the contribution rate dp(i) is obtained on the basis of a reciprocal of a value obtained by raising, to the Nth power, a distance from the listening position to the CVP. At this time, for example, the content creator may designate any positive real number as a sensitivity coefficient and store the sensitivity coefficient in configuration information, or the client 101 side may set the sensitivity coefficient in a case where the listener or the like is allowed to change the sensitivity coefficient.

Moreover, in the method SLB1, it is determined whether or not the gain of the object at the CVP is 0 or a value regarded as 0, for each object in each of the frames. Thereafter, the CVP corresponding to the object having the gain of 0 or a value regarded as 0 is excluded from use in the interpolation process. In other words, this CVP is excluded from the targets of calculation of the vectorial sum in the interpolation process.

In the method SLB2, the Mute flag which signals whether the object is a mute object for each object is stored in the configuration information for each of the CVPs. Thereafter, the CVP corresponding to the object having the Mute flag of 1, i.e., the CVP corresponding to a mute object, is excluded from the targets of calculation of the vectorial sum in the interpolation process.

Figure 41:
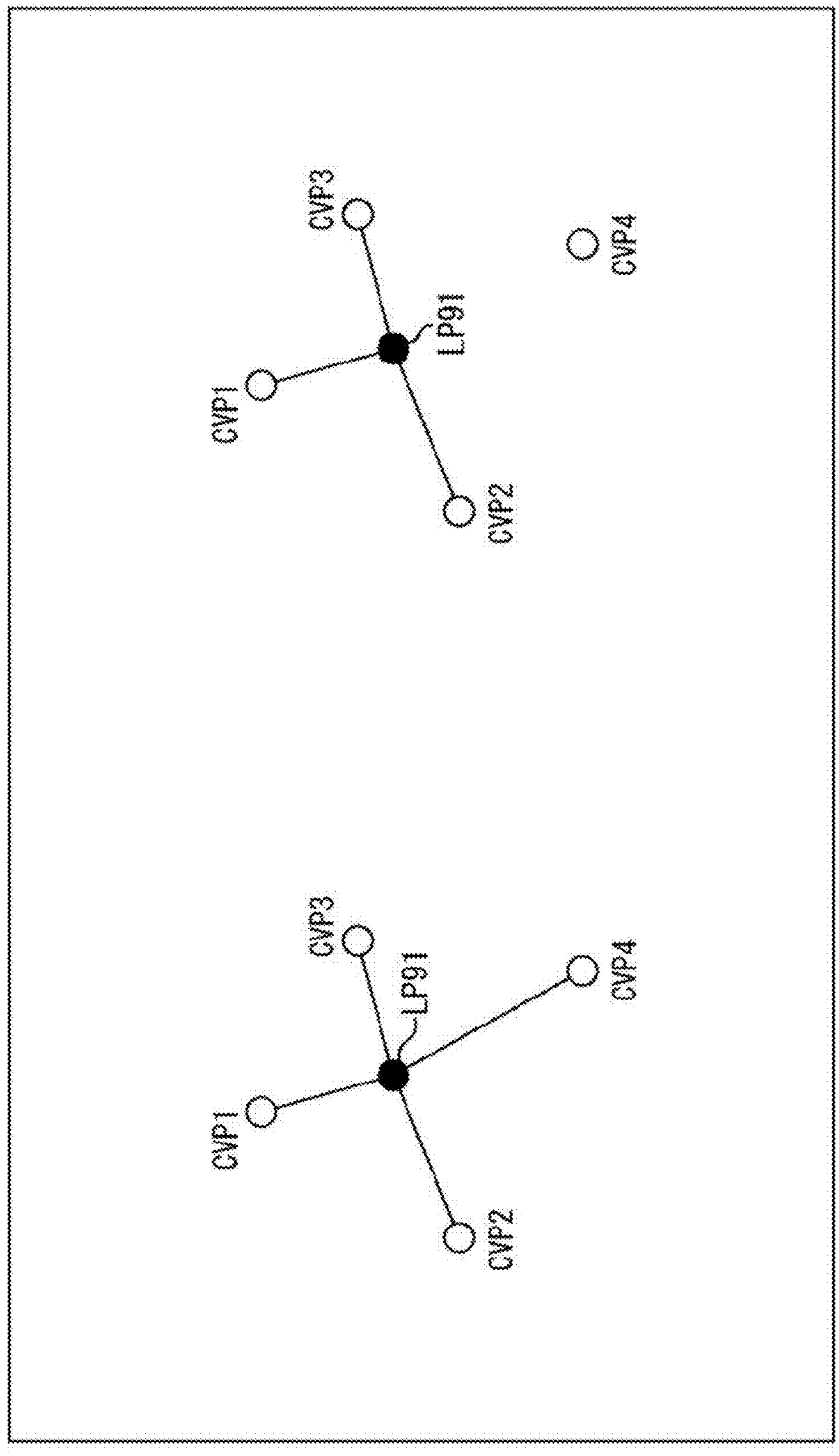
FIG. 41 is a diagram depicting a selection example of CVPs used for the interpolation process.

Each of the methods SLB1 and SLB2 described above selects CVPs used for the interpolation process as depicted in FIG. 41, for example.

Specifically, in a case where the method SLB1 or SLB2 is not applied, for example, all of CVP1 to CVP4 located around a listening position LP91 are used in the interpolation process for obtaining listener reference object position information associated with the listening position LP91 as depicted in a left part of the figure. In other words, the interpolation process is performed using object position information associated with each of the CVP1 to the CVP4.

On the other hand, in a case where the method SLB1 or SLB2 is applied, the CVP4 corresponding to a mute object is excluded from the targets of the interpolation process as depicted in a right part of the figure. Specifically, the object position information associated with the three CVPs of the CVP1 to the CVP3 except for the CVP4 is used for the interpolation process for obtaining the listener reference object position information associated with the listening position LP91.

In a case where the method SLA1 and the method SLB1 or SLB2 are simultaneously performed, results presented in FIGS. 42 and 43 are obtained as results of the interpolation process presented in the examples depicted in FIGS. 37 and 40. Note that description of parts in FIGS. 42 and 43 identical to corresponding parts in FIGS. 37 and 40 will be omitted where appropriate.

FIG. 42 presents an example of a case where the method SLA1 and the method SLB1 or SLB2 are applied to the CVP positioning pattern PTT1 depicted in FIGS. 36 and 37.

In FIG. 42, an angle Azimuth and a gain at each of the CVPs are presented in a part indicated by an arrow Q71 for each of the "case A" and the "case B."

Moreover, an angle Azimuth as listener reference object position information and a listener reference gain are presented in a part indicated by an arrow Q72 in a case where the value of the sensitivity coefficient is varied for the "case A" and the "case B." It is apparent from this figure that occurrence of the case A and the case B is reduced.

For example, in a case where the value of the sensitivity coefficient is set to "3" for the "case A," i.e., when attention is paid to the part of the column presenting "1/distance ratio cubed," it is understood from the figure that the listener reference gain (Gain(0)) at the listening position LP71 is "0.205033."

In this example, it is obvious that effects of the CVP1 to the CVP3 each located away from the listening position LP71 considerably decrease, and that the listener reference gain becomes an ideal value close to the gain "0.2" at the CVP5 and the CVP6 located near the listening position LP71, as a result of application of the method SLA1.

Specifically, the listener reference gain at the listening position LP71 located between the CVP5 and the CVP6 has a value close to the gain at each of the CVP5 and the CVP6. Accordingly, occurrence of unnatural audio image movement decreases.

Moreover, when attention is paid to the "case B," the angle Azimuth (azi(1)) as the listener reference object position information at the listening position LP71 is "0" regardless of the value of the sensitivity coefficient.

According to this example, the value "120" of the angle Azimuth (azi(1)) at the CVP6 corresponding to the gain of "0" is excluded from the interpolation process by application of the method SLB1 or the method SLB2. In other words, the angle Azimuth "120" at the CVP6 is excluded from the targets of the interpolation process.

Accordingly, the angle Azimuth (azi(1)) at the listening position LP71 has the same value "0" as the value of the angle Azimuth at all the CVPs not excluded from the targets. It is therefore obvious that appropriate listener reference object position information has been obtained.

FIG. 43 presents an example of a case where the method SLA1 and the method SLB1 or SLB2 are applied to the CVP positioning pattern PTT2 depicted in FIGS. 39 and 40.

In FIG. 43, an angle Azimuth and a gain at each of the CVPs are presented in a part indicated by an arrow Q81 for each of the "case A" and the "case B."

Moreover, an angle Azimuth as listener reference object position information and a listener reference gain are presented in a part indicated by an arrow Q82 in a case where the value of the sensitivity coefficient is varied for the "case A" and the "case B." It is apparent from this figure that occurrence of the case A and the case B is reduced.

For example, when attention is paid to a case where the value of the sensitivity coefficient is set to "3" for the "case A," it is understood from the figure that the listener reference gain (Gain(0)) at the listening position LP81 is "0.25492."

In this example, it is obvious that effects of the CVP1, the CVP2, the CVP6, and the CVP8 each located away from the listening position LP81 considerably decrease, and that the listener reference gain becomes an ideal value close to the gain "0.2" at the CVP3 and the CVP4 located near the listening position LP81, as a result of application of the method SLA1.

Specifically, it is obvious that the listener reference gain at the listening position LP81 located between the CVP3 and the CVP4 has a value close to the gain at each of the CVP3 and the CVP4 under control of the sensitivity coefficient. Accordingly, occurrence of unnatural audio image movement decreases.

Moreover, when attention is paid to the "case B," the angle Azimuth (azi(1)) as the listener reference object position information at the listening position LP81 is "0" regardless of the value of the sensitivity coefficient.

According to this example, the value "120" of the angle Azimuth (azi(1)) at the CVP3 corresponding to the gain of "0" is excluded from the interpolation process by application of the method SLB1 or the method SLB2. In other words, the angle Azimuth "120" at the CVP3 is excluded from the targets of the interpolation process.

Accordingly, the angle Azimuth (azi(1)) at the listening position LP81 has the same value "0" as the value of the angle Azimuth at all the CVPs not excluded from the targets. It is therefore obvious that appropriate listener reference object position information has been obtained.

<Format Example of Configuration Information>

Moreover, in a case of application of the method SLB2, a configuration (information) presented in FIG. 44 is stored in configuration information, for example.

Note that FIG. 44 presents a format (syntax) example of a part of the configuration information in a case of application of the method SLB2.

More specifically, the configuration information contains the configuration presented in FIG. 7 in addition to the configuration presented in FIG. 44. In other words, the configuration information contains the configuration presented in FIG. 44 in a part of the configuration presented in FIG. 7. Alternatively, a part of the configuration information presented in FIG. 32 may contain the configuration presented in FIG. 44.

According to the example presented in FIG. 44, "NumOfControlViewpoints" represents number-of-CVP information, i.e., the number of CVPs set by the creator, while "numOfObjs" represents the number of objects.

The same number of Mute flags "MuteObjIdx[i][j]" corresponding to combinations of the CVPs and the objects as the number of objects are stored in the configuration information for each of the CVPs.

The Mute flag "MuteObjIdx[i][j]" is flag information indicating whether the jth object is regarded as a mute object (whether the jth object is a mute object) as viewed from the ith CVP, i.e., when the listening position (viewpoint position) is located at the ith CVP. Specifically, the value "0" of the Mute flag "MuteObjIdx[i][j]" indicates that the object is not a mute object, while the value "1" of the Mute flag "MuteObjIdx[i][j]" indicates that the object is a mute object, i.e., the object is in a mute state.

Note that described herein has been the example which stores the Mute flag in the configuration information as mute information for identifying the object designated as a mute object at the CVP. However, this example is not required to be adopted. For example, "MuteObjIdx[i][j]" may be index information indicating the object designated as a mute object.

In such a case, "MuteObjIdx[i][j]" for all the objects need not be stored in the configuration information. Instead, "MuteObjIdx[i][j]" for the objects designated as mute objects are only required to be stored in the configuration information. In this example, too, the client 101 side is capable of specifying whether or not each of the objects is designated as a mute object at the CVP with reference to "MuteObjIdx[i][j]."

<Description of Contribution Coefficient Calculation Process>

Described next will be operations performed by the information processing device 11 and the client 101 in a case where the method SLA1 and the method SLB1 or SLB2 are applied.

For example, in a case where the method SLB2 is applied, the information processing device 11 performs the content creation process described with reference to FIG. 14.

In this case, however, the control unit 26 accepts a designation operation for determining whether or not to designate the object at the CVP as a mute object at any timing, for example, and generates configuration information containing a Mute flag indicating a value corresponding to the designation operation in step S23.

Moreover, in a case where a sensitivity coefficient is stored in the configuration information, for example, the control unit 26 accepts a designation operation for designating the sensitivity coefficient at any timing, and generates configuration information containing the sensitivity coefficient designated by the designation operation in step S23.

Moreover, in a case where the method SLA1 and the method SLB1 or SLB2 are applied, the client 101 basically performs the reproduction audio data generation process described with reference to FIG. 18 or FIG. 34. However, in step S84 in FIG. 18, or in step S126 in FIG. 34, the interpolation process based on the method SLA1 and the method SLB1 or SLB2 is performed.

Figure 45:
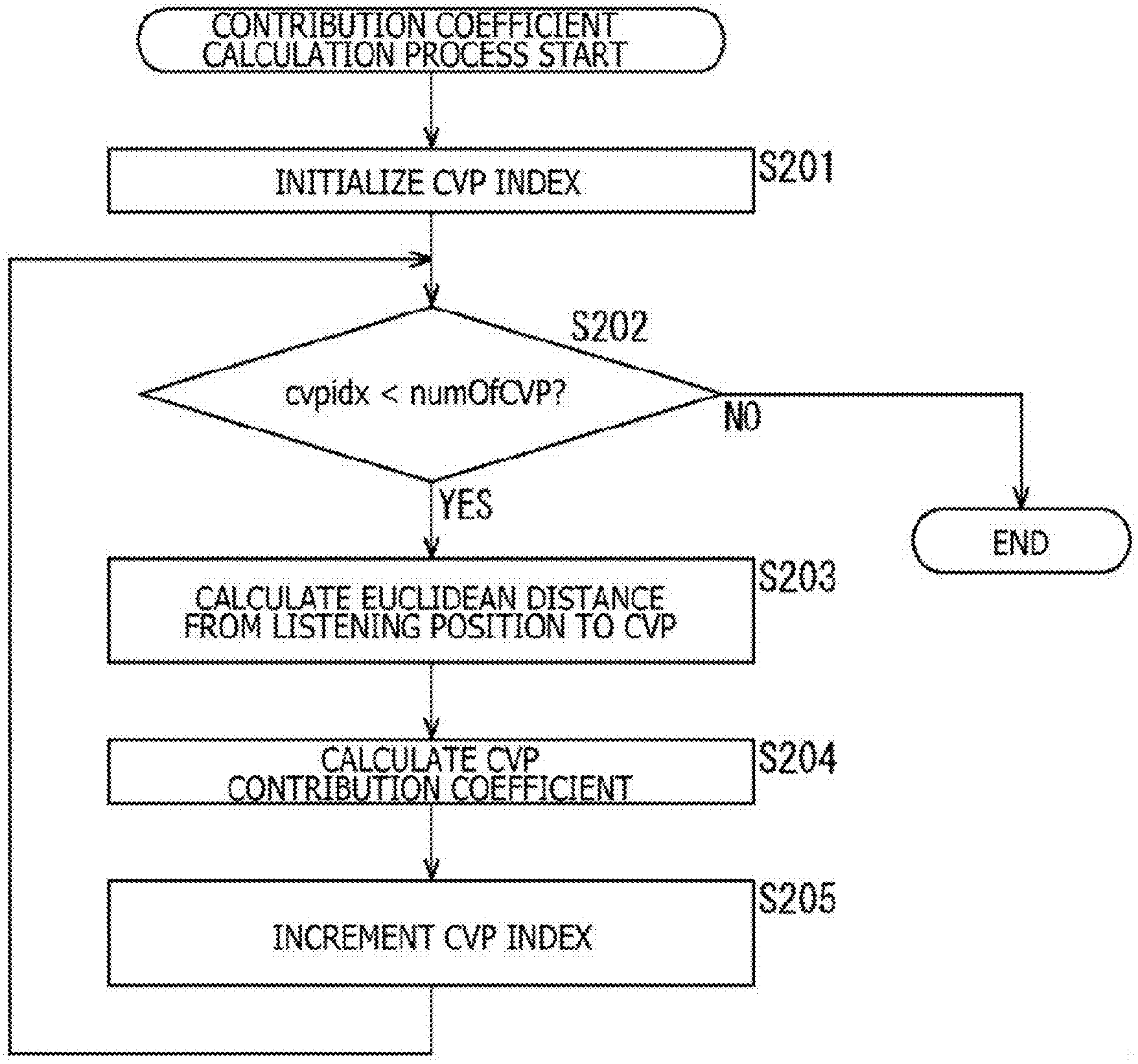
FIG. 45 is a flowchart explaining a contribution coefficient calculation process.

Specifically, the client 101 first performs a contribution coefficient calculation process presented in FIG. 45 to calculate a contribution coefficient for obtaining a contribution rate.

The contribution coefficient calculation process performed by the client 101 will hereinafter be described with reference to a flowchart presented in FIG. 45.

In step S201, the position calculation unit 114 initializes an index cvpidx indicating a CVP corresponding to a processing target. In this manner, the value of the index cvpidx is set to 0.

In step S202, the position calculation unit 114 determines whether or not the value of the index cvpidx indicating the CVP as the processing target is smaller than the number of all CVPs numOfCVP, i.e., cvpidx<numOfCVP.

Note that the number of CVPs numOfCVP is equivalent to the number of candidates of CVPs used for the interpolation process. Specifically, the number indicated by the number-of-CVP information, the number of CVPs meeting a particular condition such as presence around the listening position, the number of CVPs belonging to a CVP group corresponding to a target group region, or the like is designated as numOfCVP.

In a case of determination that cvpidx<numOfCVP is met in step S202, calculation of the contribution coefficient for all the CVPs as candidates for the interpolation process is not yet completed. Accordingly, the process proceeds to step S203.

In step S203, the position calculation unit 114 calculates a Euclidean distance from the listening position to the CVP corresponding to the processing target on the basis of the listener position information and the CVP position information associated with the CVP corresponding to the processing target, and retains a calculation result thus obtained as distance information dist[cvpidx]. For example, the position calculation unit 114 calculates the distance information dist[cvpidx] by performing calculation similar to the calculation of the equation (5) described above.

In step S204, the position calculation unit 114 calculates a contribution coefficient cvp_contri_coef[cvpidx] of the CVP as the processing target on the basis of the distance information dist[cvpidx] and a sensitivity coefficient WeightRatioFactor.

For example, the sensitivity coefficient WeightRatioFactor may be read from the configuration information, or may be designated by a designation operation performed by the listener or the like for a not-depicted input unit or the like. Alternatively, the position calculation unit 114 may calculate the sensitivity coefficient WeightRatioFactor on the basis of a positional relation between the listening position and the respective CVPs, gains of objects at each of the CVPs, or the like.

Note that the sensitivity coefficient WeightRatioFactor herein has a value of a real number such as 2 or more, for example. However, the value of the sensitivity coefficient WeightRatioFactor is not limited to this value and may be any value.

For example, the position calculation unit 114 calculates the distance information dist[cvpidx] raised to the power of the exponent equivalent to the sensitivity coefficient WeightRatioFactor, and divides 1 by the value thus obtained, i.e., obtains a reciprocal of the value thus obtained to calculate the contribution coefficient cvp_contri_coef[cvpidx].

Specifically, the contribution coefficient cvp_contri_coef[cvpidx] is obtained by performing a computing operation of cvp_contri_coef[cvpidx]=1.0/pow(dist[cvpidx], WeightRatioFactor). Note herein that pow( ) represents a function for performing a calculation of power.

In step S205, the position calculation unit 114 increments the value of the index cvpidx of the CVP.

After the processing in step S205 is completed, the process then returns to step S202 to repeat the processing described above. Specifically, the contribution coefficient cvp_contri_coef[cvpidx] is calculated for the CVP newly designated as the processing target.

Moreover, in a case of determination that cvpidx<numOfCVP is not met in step S202, all the CVPs are designated as the processing targets, and the contribution coefficient cvp_contri_coef[cvpidx] is calculated for these targets. After completion of this calculation, the contribution coefficient calculation process ends.

In the manner described above, the client 101 calculates the contribution coefficient according to the distance between the listening position and each of the CVPs. In this manner, the interpolation process based on the method SLA1 can be achieved, and therefore, occurrence of unnatural audio image movement can be reduced.

<Description of Normalized Contribution Coefficient Calculation Process>

In addition, after completion of the contribution coefficient calculation process described with reference to FIG. 45, the client 101 subsequently performs a normalized contribution coefficient calculation process based on the method SLB1 or the method SLB2 to obtain a normalized contribution coefficient as a contribution rate.

Figure 46:
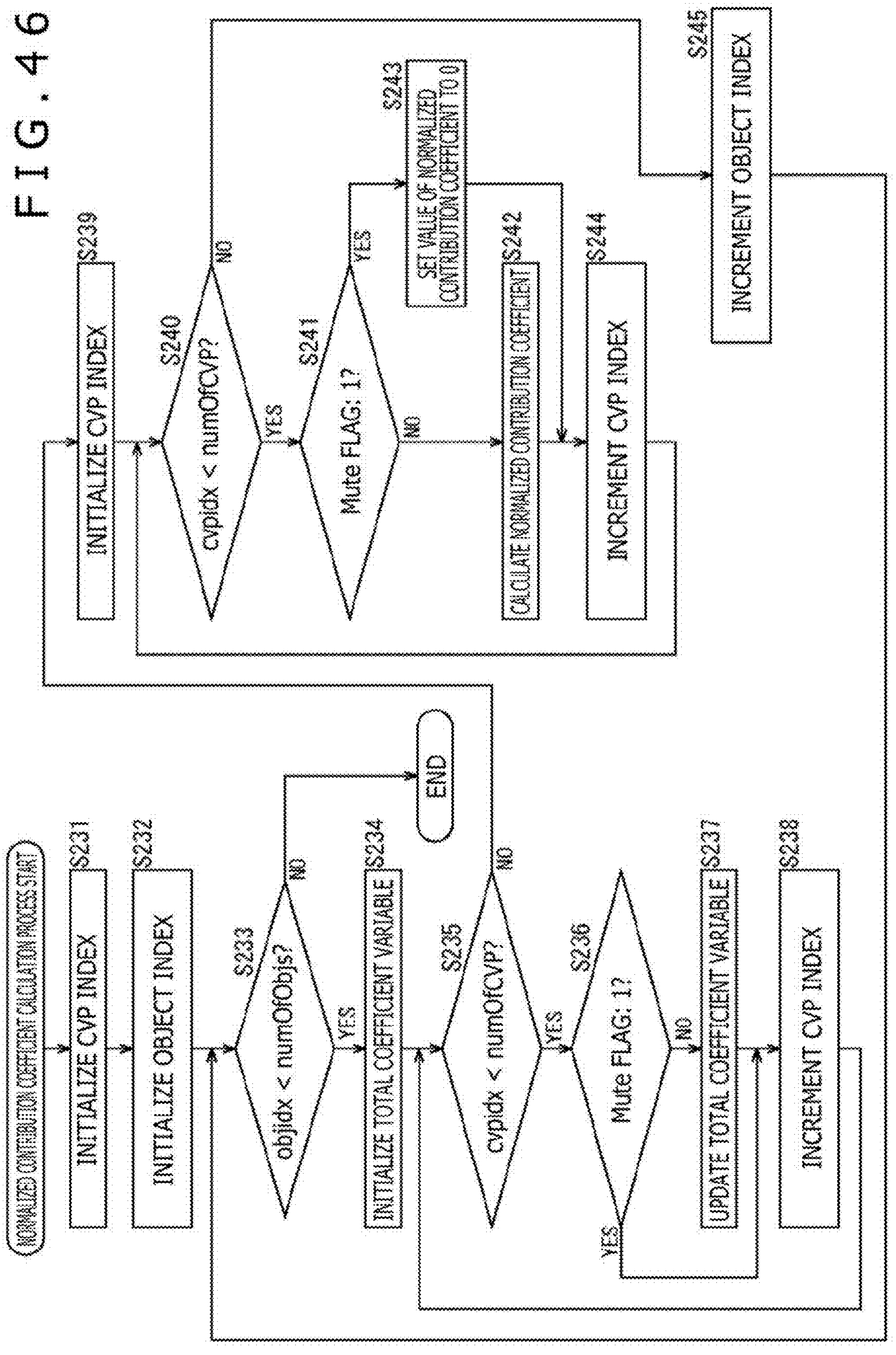
FIG. 46 is a flowchart explaining a normalized contribution coefficient calculation process.

Described first herein will be a normalized contribution coefficient calculation process based on the method SLB2 and performed by the client 101, with reference to a flowchart in FIG. 46.

The normalized contribution coefficient calculation process based on the method SLB2 herein is a normalized contribution coefficient calculation process based on a Mute flag contained in the configuration information.

In step S231, the position calculation unit 114 initializes an index cvpidx indicating a CVP corresponding to a processing target. In this manner, the value of the index cvpidx is set to 0.

Note that CVPs identical to the CVPs corresponding to the processing targets in the contribution coefficient calculation process in FIG. 45 are processed as the processing targets in the normalized contribution coefficient calculation process. Accordingly, the number of CVPs numOfCVP as the processing targets is the same as the number of CVPs of the contribution coefficient calculation process in FIG. 45.

In step S232, the position calculation unit 114 initializes an index objidx indicating an object corresponding to a processing target.

In this manner, the value of the index objidx is set to 0. Note herein that the number of objects numOfObjs corresponding to the processing targets is set to the number of all the objects constituting content, i.e., the number indicated by number-of-object information contained in the configuration information. In the following steps, the CVP indicated by the index cvpidx and the object indicated by the index objidx as viewed from the CVP are sequentially processed in order.

In step S233, the position calculation unit 114 determines whether or not the value of the index objidx is smaller than the number of all the objects numOfObjs, i.e., objidx<numOfObjs.

In a case of determination that objidx<numOfObjs is met in step S233, the position calculation unit 114 in step S234 initializes the value of a total coefficient variable total_coef. In this manner, the value of the total coefficient variable total_coef of the object that corresponds to the processing target and that is indicated by the index objidx is set to 0.

The total coefficient variable total_coef is a coefficient used for normalizing the contribution coefficient cvp_contri_coef[cvpidx] of each of the CVPs for the object that corresponds to the processing target and that is indicated by the index objidx. As will be described below, the sum total of the contribution coefficients cvp_contri_coef[cvpidx] of all the CVPs used for the interpolation process for one object eventually becomes the total coefficient variable total_coef.

In step S235, the position calculation unit 114 determines whether or not the value of the index cvpidx indicating the CVP as the processing target is smaller than the number of all CVPs numOfCVP, i.e., cvpidx<numOfCVP.

In a case of determination that cvpidx<numOfCVP is met in step S235, the process proceeds to step S236.

In step S236, the position calculation unit 114 determines whether or not the value of the Mute flag of the object that corresponds to the processing target and that is indicated by the index objidx at the CVP indicated by the index cvpidx is 1, i.e., whether or not the object is a mute object.

In a case of determination that the value of the Mute flag is not 1 in step S236, i.e., the object is not a mute object, the position calculation unit 114 in step S237 adds the contribution coefficient of the CVP corresponding to the processing target to the retained value of the total coefficient variable, to update the total coefficient variable.

Specifically, total_coef+=cvp_contri_coef[cvpidx] is calculated. In other words, the contribution coefficient cvp_contri_coef[cvpidx] of the CVP corresponding to the processing target and indicated by the index cvpidx is added to the current value of the total coefficient variable total_coef that is retained by the position calculation unit 114 and that is associated with the object corresponding to the processing target and indicated by the index objidx, and a result of this addition is designated as a total coefficient variable total_coef after update.

After the processing in step S237 is completed, the process then proceeds to step S238.

In addition, in a case of determination that the value of the Mute flag is 1 in step S236, i.e., the object is a mute object, the processing in step S237 is not performed, and the process then proceeds to step S238. This is because the CVP corresponding to the processing target object designated as a mute object is excluded from the processing target of the interpolation process.

In a case where the processing in step S237 has been performed, or the value of the Mute flag is determined to be 1 in step S236, the position calculation unit 114 in step S238 increments the index cvpidx indicating the CVP corresponding to the processing target.

After the processing in step S238 is completed, the process then returns to step S235 to repeat the processing described above.

By repeating the processing from step S235 to step S238, the sum total of the contribution coefficients of the CVPs each not corresponding to a mute object is obtained for the object corresponding to the processing target, and the sum total thus obtained is designated as a final total coefficient variable of the object corresponding to the processing target. The total coefficient variable corresponds to a variable t in the equation (6) described above.

In addition, in a case of determination that cvpidx<numObCVP is not met in step S235, the position calculation unit 114 in step S239 initializes the index cvpidx indicating the CVP corresponding to the processing target. In this manner, the following processing is performed while sequentially designating each of the CVPs as a new processing target in order for the object corresponding to the processing target.

In step S240, the position calculation unit 114 determines whether or not cvpidx<numOfCVP is met.

In a case of determination that cvpidx<numOfCVP is met in step S240, the process proceeds to step S241.

In step S241, the position calculation unit 114 determines whether or not the value of the Mute flag of the object that corresponds to the processing target and that is indicated by the index objidx at the CVP indicated by the index cvpidx is 1.

In a case of determination that the value of the Mute flag is not 1 in step S241, i.e., the object is not a mute object, the position calculation unit 114 in step S242 calculates a normalized contribution coefficient contri_norm_ratio [objidx][cvpidx].

For example, calculation of contri_norm_ratio[objidx] [cvpidx]=cvp_contri_coef[cvpidx]/total_coef is performed to normalize the contribution coefficient, and the contribution coefficient thus normalized is designated as a normalized contribution coefficient.

In other words, the position calculation unit 114 achieves normalization by dividing the contribution coefficient cvp_contri_coef[cvpidx] of the CVP, which corresponds to the processing target and is indicated by the index cvpidx, by the total coefficient variable total_coef of the object, which corresponds to the processing target and is indicated by the index objidx. In this manner, the normalized contribution coefficient contri_norm_ratio[objidx][cvpidx] of the CVP corresponding to the processing target and indicated by the index cvpidx is obtained for the object that corresponds to the processing target and that is indicated by the index objidx.

According to this embodiment, the normalized contribution coefficient contri_norm_ratio[objidx][cvpidx] is used as the contribution rate dp(i) in the equation (8), i.e., the contribution degree of the CVP. In other words, the normalized contribution coefficient is used as a weight of the CVP for each of the objects in the interpolation process.

More specifically, the same contribution rate dp(i) common to all the objects is used for the same CVP in the equation (8). In this embodiment, however, the CVP corresponding to the mute object is excluded from the interpolation process. Accordingly, the normalized contribution coefficient (contribution rate dp(i)) is obtained for each of the objects even for the same CVP.

In this case, the normalized contribution coefficient is calculated on the basis of the contribution coefficient obtained using the value of distance information raised to the power of the exponent equivalent to the sensitivity coefficient in the contribution coefficient calculation process in FIG. 45. The interpolation process based on the method SLA1 is therefore achievable.

After the processing in step S242 is completed, the process then proceeds to step S244.

In addition, in a case of determination that the value of the Mute flag is 1 in step S241, i.e., the object is a mute object, the processing in step S242 is not performed, and the process then proceeds to step S243.

In step S243, the position calculation unit 114 sets the normalized contribution coefficient contri_norm_ratio [objidx][cvpidx] of the CVP corresponding to the processing target and indicated by the index cvpidx to 0, for the object corresponding to the processing target and indicated by the index objidx.

In this manner, the CVP corresponding to the object designated as a mute object is excluded from the targets of the interpolation process. The interpolation process based on the method SLB2 is therefore achievable.

After the processing in step S242 or step S243 is completed, the position calculation unit 114 in step S244 increments the index cvpidx indicating the CVP corresponding to the processing target.

After the processing in step S244 is completed, the process then returns to step S240 to repeat the processing described above.

By repeating the processing from step S240 to step S244, the normalized contribution coefficient of each of the CVPs is obtained for the object corresponding to the processing target.

In addition, in a case of determination that cvpidx<numOfCVP is not met in step S240, the position calculation unit 114 in step S245 increments the index objidx indicating the object corresponding to the processing target. In this manner, a new object not selected as the processing target yet is designated as the processing target.

After the processing in step S245 is completed, the process then returns to step S233 to repeat the processing described above.

In addition, in a case of determination that objidx<numOfObjs is not met in step S233, calculation of the normalized contribution coefficients of the respective CVPs, i.e., the contribution rates dp(i), is completed for all of the objects. Accordingly, the normalized contribution coefficient calculation process ends.

As described above, the client 101 calculates the normalized contribution coefficients of the respective CVPs for each object according to the Mute flag of each object. In this manner, the interpolation process based on the method SLB2 is achievable. Accordingly, appropriate listener reference object position information is acquirable.

While described above has been the normalized contribution coefficient calculation process based on the method SLB2, a process similar to the process of the method SLB2 is also performed as a normalized contribution coefficient calculation process based on the method SLB1.

Figure 47:
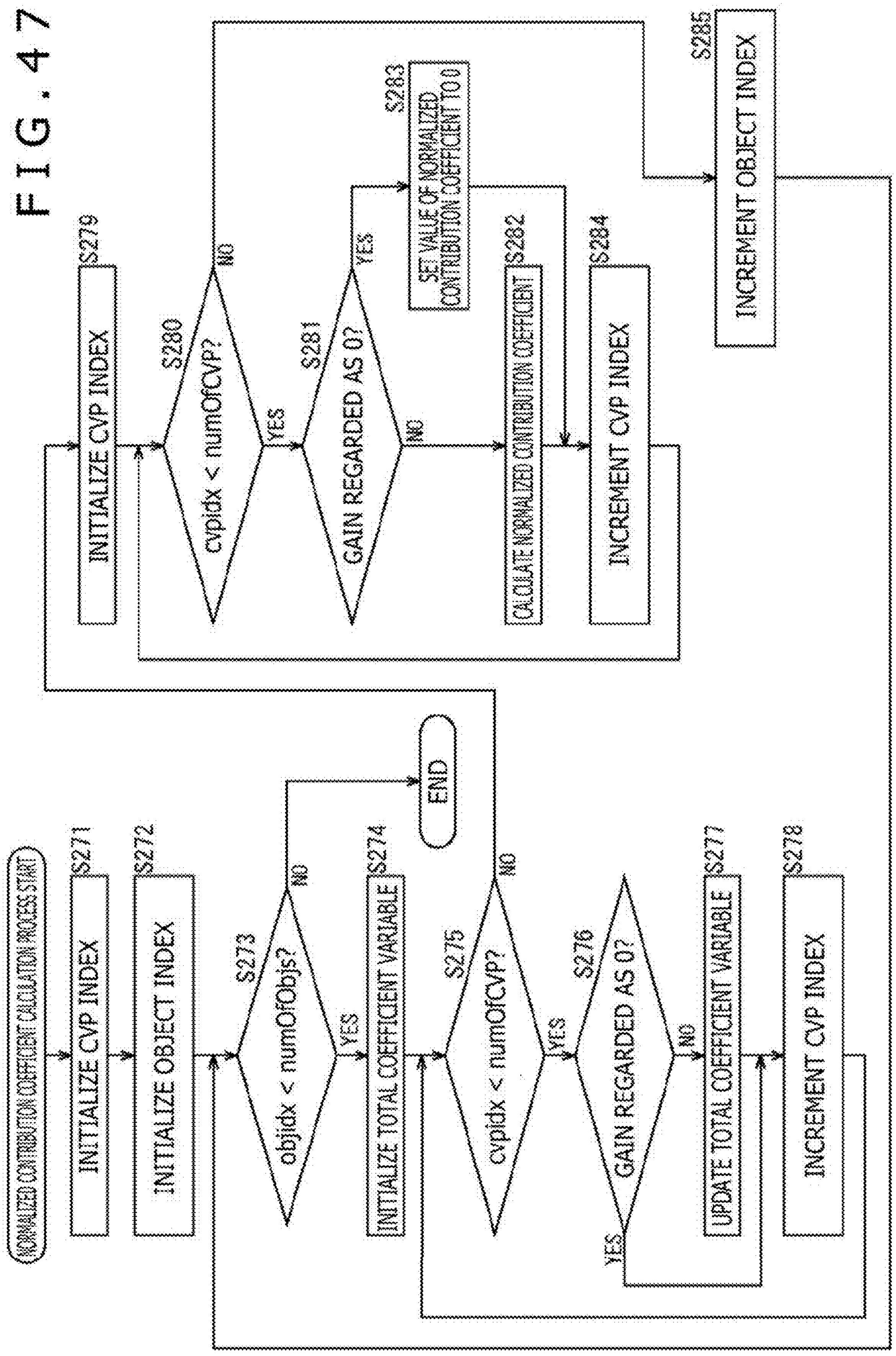
FIG. 47 is a flowchart explaining a normalized contribution coefficient calculation process.

Described hereinafter will be the normalized contribution coefficient calculation process based on the method SLB1 and performed by the client 101, with reference to a flowchart in FIG. 47.

In the normalized contribution coefficient calculation process based on the method SLB1 presented in FIG. 47, i.e., in step S271 to step S285, processing similar to the processing from step S231 to step S245 of the normalized contribution coefficient calculation process described with reference to FIG. 46 is basically performed.

However, in steps S276 and S281, it is not determined whether or not the value of the Mute flag is 1, but it is determined whether or not the gain of the object, which corresponds to the processing target and is indicated by the index objidx, at the CVP indicated by the index cvpidx is regarded as 0.

Specifically, in a case where the value of the gain of the object is a predetermined threshold or smaller, it is determined that the gain of the object is regarded as 0.

In a case of determination that the gain is not regarded as 0 in step S276, the CVP is not a CVP corresponding to a mute object. Accordingly, the process proceeds to step S277 to update the total coefficient variable.

On the other hand, in a case of determination that the gain is regarded as 0 in step S276, the CVP is a CVP corresponding to a mute object. Accordingly, the corresponding CVP is excluded from the processing targets of the interpolation process, and then process proceeds to step S278.

In addition, in a case of determination that the gain is not regarded as 0 in step S281, the CVP is not a CVP corresponding to a mute object. Accordingly, the process proceeds to step S282 to calculate a normalized contribution coefficient.

On the other hand, in a case of determination that the gain is regarded as 0 in step S281, the CVP is a CVP corresponding to a mute object. Accordingly, the process proceeds to step S283, and the CVP is excluded from the targets of the interpolation process by setting the normalized contribution coefficient to 0.

According to the normalized contribution coefficient calculation process based on the method SLB1 as described above, the interpolation process based on the method SLB1 is achievable. Accordingly, appropriate listener reference object position information is acquirable.

In step S84 in FIG. 18 or in step S126 in FIG. 34, after completion of the normalized contribution coefficient calculation process based on the method SLB1 or the method SLB2, the position calculation unit 114 then performs the interpolation process using the obtained normalized contribution coefficient.

Specifically, the position calculation unit 114 calculates the equation (7) to obtain an object three-dimensional position vector, and calculates the equation (8) using the normalized contribution coefficient contri_norm_ratio[objidx][cvpidx] obtained by the process described above instead of the contribution rate dp(i). In other words, the interpolation process of the equation (8) is performed using the normalized contribution coefficient.

Moreover, the position calculation unit 114 calculates the equation (9) on the basis of a calculation result of the equation (8), and also carries out correction by a correction amount obtained by calculation of the equation (10) and the equation (11) as necessary.

In this manner, final listener reference object position information and a final listener reference gain to which the method SLA1 and the method SLB1 or SLB2 have been applied are obtained.

Accordingly, occurrence of the case A or the case B described above decreases. Specifically, reduction of occurrence of unnatural audio image movement, and acquisition of appropriate listener reference object position information are both achievable.

By using either the method SLB1 or the method SLB2, the position calculation unit 114 performs the interpolation process on the basis of CVP position information associated with a CVP corresponding to an object which is not substantially a mute object, object position information, a gain of the object, and listener position information, and calculates listener reference object position information and a listener reference gain.

At this time, according to the method SLB2, the position calculation unit 114 identifies a CVP corresponding to an object which is not a mute object, on the basis of a Mute flag as mute information. On the other hand, according to the method SLB1, the position calculation unit 114 identifies a CVP corresponding to an object which is not a mute object, on the basis of a gain of the object as viewed from the CVP, i.e., a determination result of whether or not the gain is a threshold or smaller.

Fourth Embodiment

<Object Position Information and Gain Interpolation Process>

Meanwhile, for performing the interpolation process for obtaining listener reference object position information and a listener reference gain, the reproduction side, i.e., the listener side, may intentionally select the CVP used for the interpolation process.

In this case, the listener can enjoy content by using only CVPs meeting preference of the listener and desired to be listened to in a limited manner. For example, content reproduction or the like can be achieved using only CVPs corresponding to all artists as objects positioned at positioning locations close to the listener.

Figure 48:
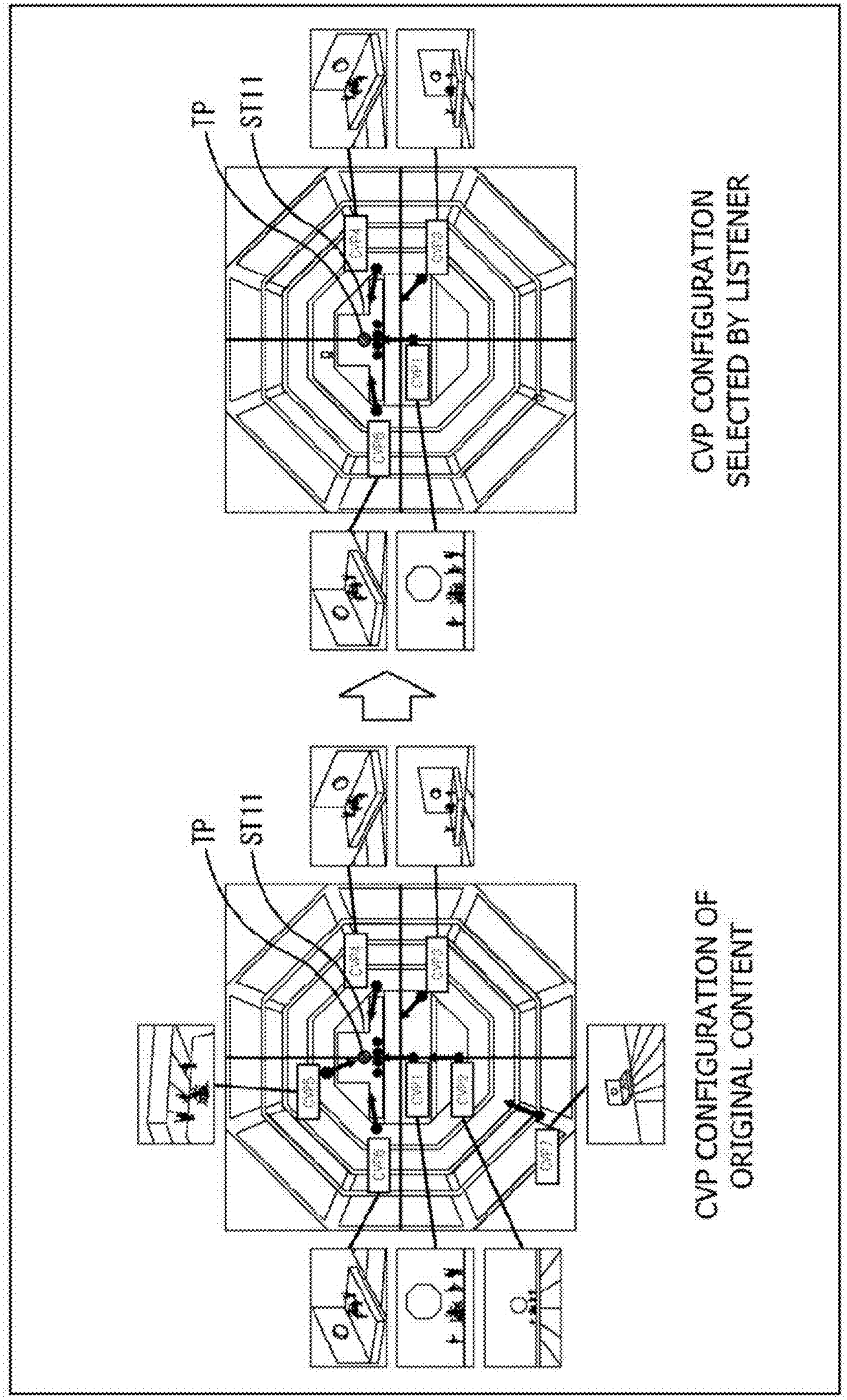
FIG. 48 is a diagram explaining selection of CVPs on a reproduction side.

Specifically, as depicted in FIG. 48, for example, it is assumed that the stage ST11, the target point TP, and respective CVPs are positioned at locations similar to those of the example depicted in FIG. 11 in the free viewpoint space, and that the listener (user) is allowed to select CVPs used for the interpolation process. Note that parts in FIG. 48 similar to corresponding parts in FIG. 11 are given identical reference signs, and description of these parts will be omitted where appropriate.

According to the example depicted in FIG. 48, it is assumed that CVP1 to CVP7 are defined as CVPs constituting an original CVP configuration, i.e., CVPs set by the content creator, as depicted in a left part of the figure, for example.

In this case, it is assumed that the listener selects the CVP1, the CVP3, the CVP4, and the CVP6 located close to the stage ST11 from the CVP1 to the CVP7 described above, as depicted in a right part of the figure, for example.

In this case, at the time of actual reproduction of the content, the listener feels as if the artists as objects are located close to the listener in comparison with a case where all the CVPs are used for the interpolation process.

Figure 49:
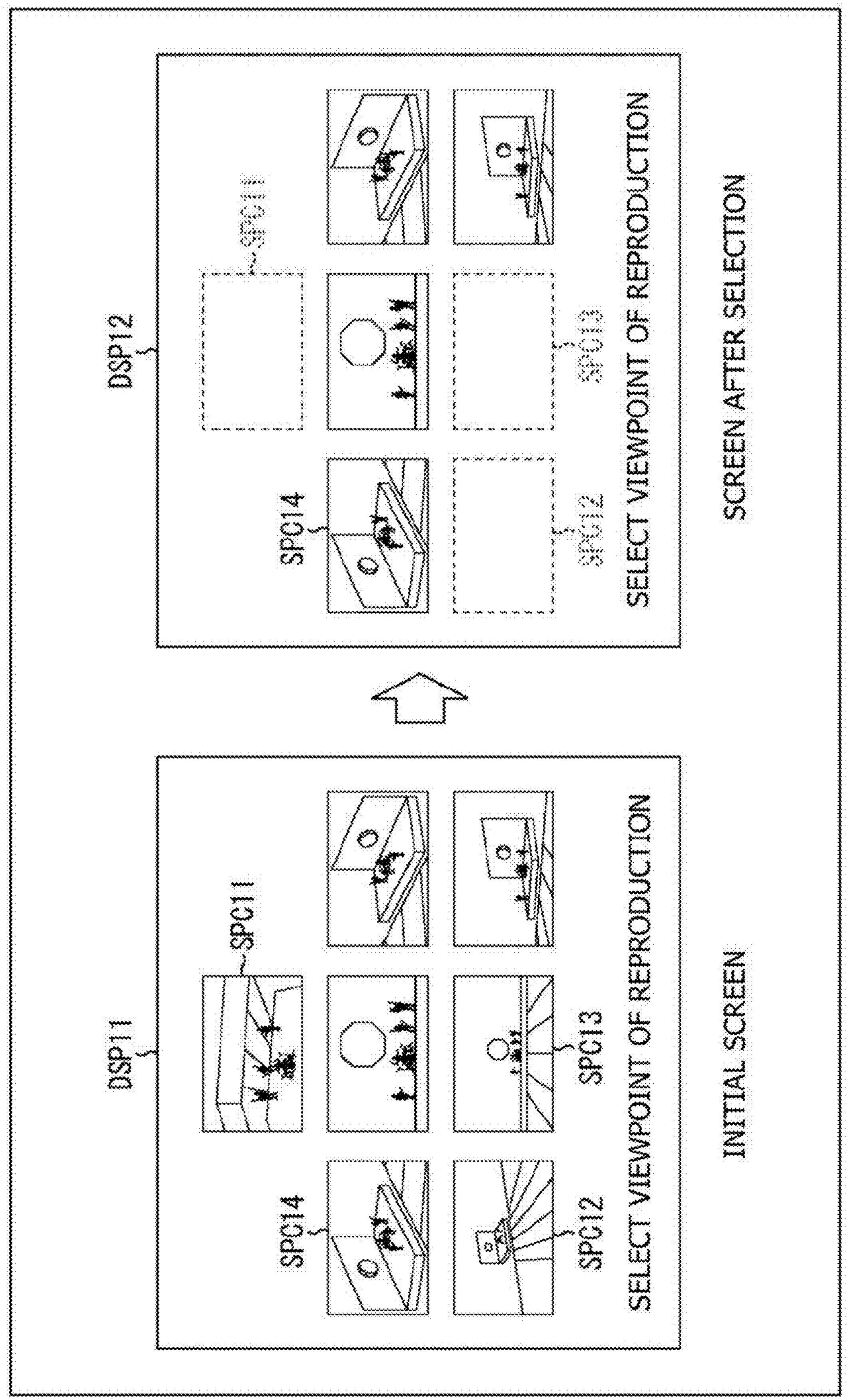
FIG. 49 is a diagram depicting an example of a CVP selection screen.

In addition, at the time of selection of the CVPs by the listener, a CVP selection screen as depicted in FIG. 49 may be displayed on the client 101, for example.

According to this example, a left part of the figure depicts a CVP selection screen DSP11 displayed as a screen containing a plurality of arranged viewpoint images for each of the CVPs depicted in FIG. 48, the viewpoint images each indicating a state when the target point TP, i.e., the stage ST11, is viewed from the corresponding CVP.

For example, viewpoint images SPC11 to SCP14 are viewpoint images formed when the CVP5, the CVP7, the CVP2, and the CVP6 are designated as viewpoint positions (listening positions), respectively. Moreover, a message "select viewpoint of reproduction" which urges selection of the CVPs is also displayed in the CVP selection screen DSP11.

When the CVP selection screen DSP11 thus configured is displayed, the listener (user) selects the viewpoint images corresponding to the favorite CVPs to select the CVPs used for the interpolation process. As a result, the display of the CVP selection screen DSP11 presented in the left part of the figure is updated, and a CVP selection screen DSP12 presented in a right part of the figure is displayed, for example.

In the CVP selection screen DSP12, each of the viewpoint images of the CVPs not selected by the listener is displayed in a display form different from that of each of the viewpoint images of the selected CVPs, such as gray display in a light color.

For example, the CVP5, the CVP7, and the CVP2 corresponding to the viewpoint images SPC11 to SPC13 are not selected herein, and the viewpoint images of those CVPs are presented in gray display. In addition, the display of the viewpoint images corresponding to the CVP6, the CVP1, the CVP3, and the CVP4 selected by the listener is the display in the CVP selection screen DSP11 without change.

By the display of such a CVP selection screen, the listener is allowed to perform an appropriate CVP selection operation while visually checking the state viewed from each of the CVPs. Moreover, an image of the entire venue depicted in FIG. 48, i.e., the entire free viewpoint space, may also be displayed in the CVP selection screen.

Furthermore, in a case where the listener is allowed to select the CVPs used for the interpolation process, information concerning whether or not the CVPs are selectable may be stored in configuration information. In this case, intention of the content creator can be transferred to the listener (client 101) side.

In a case where the information concerning whether or not the CVPs are selectable is stored in the configuration information, the listener selects the CVPs only from the target CVPs allowed to be selected on the reproduction side, and selection or non-selection of the CVPs by the listener is detected (specified). Thereafter, in a case where the CVPs not selected by the listener are present in the CVPs allowed to be selected (hereinafter the CVPs not selected will be referred to also as non-selection CVPs), the interpolation process for calculating listener reference object position information and a listener reference gain is performed after the non-selection CVPs are excluded.

<Format Example of Configuration Information>

According to this embodiment, information presented in FIG. 50 is stored in the configuration information as information indicating whether or not CVPs are selectable, i.e., selection possibility information.

Note that FIG. 50 presents a format (syntax) example of a part of the configuration information.

More specifically, the configuration information contains the configuration presented in FIG. 7 in addition to the configuration presented in FIG. 50. In other words, the configuration information contains the configuration presented in FIG. 50 in a part of the configuration presented in FIG. 7. Alternatively, a part of the configuration information presented in FIG. 32 may contain the configuration presented in FIG. 50, or the information presented in FIG. 44 may further be stored in the configuration information.

According to the example presented in FIG. 50, "CVPSelectAllowPresentFlag" indicates a CVP selection information presence flag. The CVP selection information presence flag is flag information indicating whether or not information associated with CVPs selectable on the listening side is present in the configuration information, i.e., whether or not the listener side is allowed to select the CVPs.

A value "0" of the CVP selection information presence flag indicates that the information associated with selectable CVPs is not contained (stored) in the configuration information.

In addition, a value "1" of the CVP selection information presence flag indicates that the information associated with selectable CVPs is contained in the configuration information.

In a case where the value of the CVP selection information presence flag is "1," "numOfAllowedCVP" indicating the number of CVPs selectable by the listener and index information "AllowedCVPIdx[i]" indicating the CVPs selectable by the listener are further stored in the configuration information.

For example, the index information "AllowedCVPIdx[i]" indicates a value of a CVP index "ControlViewpointIndex [i]" indicating the CVPs selectable by the listener and presented in FIG. 9, or the like. Moreover, index information "AllowedCVPIdx[i]" indicating the same number of selectable CVPs as the number indicated by "numOfAllowedCVP" is stored in the configuration information.

As described above, according to the example presented in FIG. 50, the CVP selection information presence flag "CVPSelectAllowPresentFlag," the number of selectable CVPs "numOfAllowedCVP," and the index information "AllowedCVPIdx[i]" are contained in the configuration information as selection possibility information indicating whether or not the CVPs used for calculation of the listener reference object position information and the listener reference gain are selectable.

By using such a type of configuration information, it is possible for the client 101 to identify which CVPs are allowed to be selected in the CVPs constituting the content.

Note that this embodiment can be combined with any one or more of the first embodiment to the third embodiment described above.

Also in the case where the configuration presented in FIG. 50 is contained in the configuration information, the information processing device 11 performs the content creation process described with reference to FIG. 14.

In this case, however, the control unit 26 accepts a designation operation for designating whether or not the CVPs are allowed to be selected, at any timing such as step S16, for example. Thereafter, the control unit 26 in step S23 generates configuration information containing any necessary information selected from the CVP selection information presence flag, the number of selectable CVPs, and index information indicating selectable CVPs, according to the designation operation.

<Configuration Example of Client>

Figure 51:
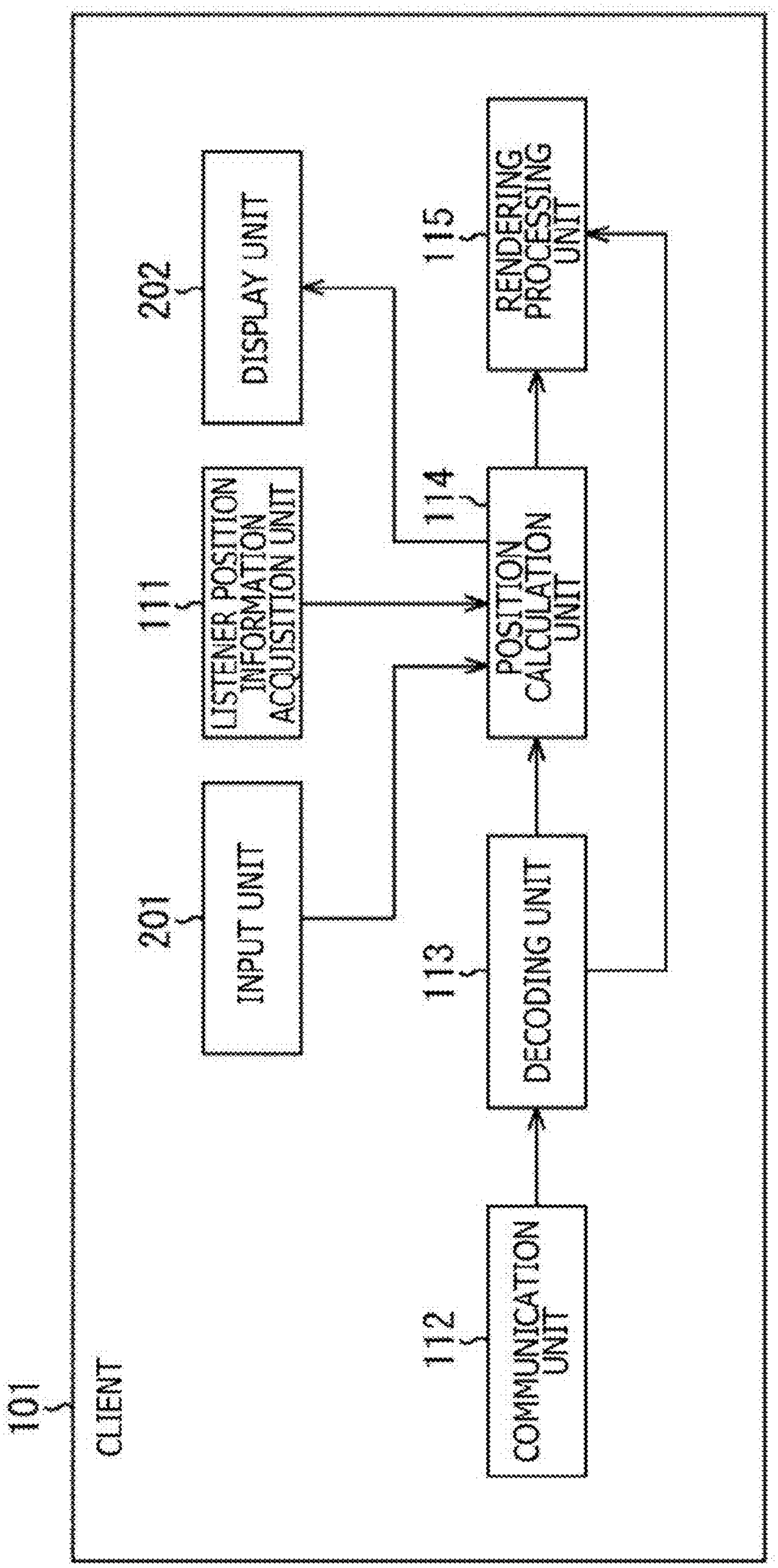
FIG. 51 is a diagram depicting a configuration example of a client.

In addition, in a case where the CVPs used for the interpolation process are selectable on the client 101 (listener) side, the client 101 has a configuration depicted in FIG. 51, for example. Note that parts in FIG. 51 similar to corresponding parts in FIG. 17 are given identical reference signs, and description of these parts will be omitted where appropriate.

The configuration of the client 101 depicted in FIG. 51 has a configuration including an input unit 201 and a display unit 202 newly added to the configuration depicted in FIG. 17.

For example, the input unit 201 includes input devices such as a touch panel, a mouse, a keyboard, and a button and supplies, to the position calculation unit 114, a signal corresponding to an input operation performed by the listener (user).

The display unit 202 includes a display and displays various types of images, such as a CVP selection screen, according to an instruction issued from the position calculation unit 114 or the like.

<Description of Selective Interpolation Process>

Also in a case where the CVPs used for the interpolation process are selectable on the client 101 side as necessary, the client 101 basically performs the reproduction audio data generation process described with reference to FIG. 18 or 34.

Figure 52:
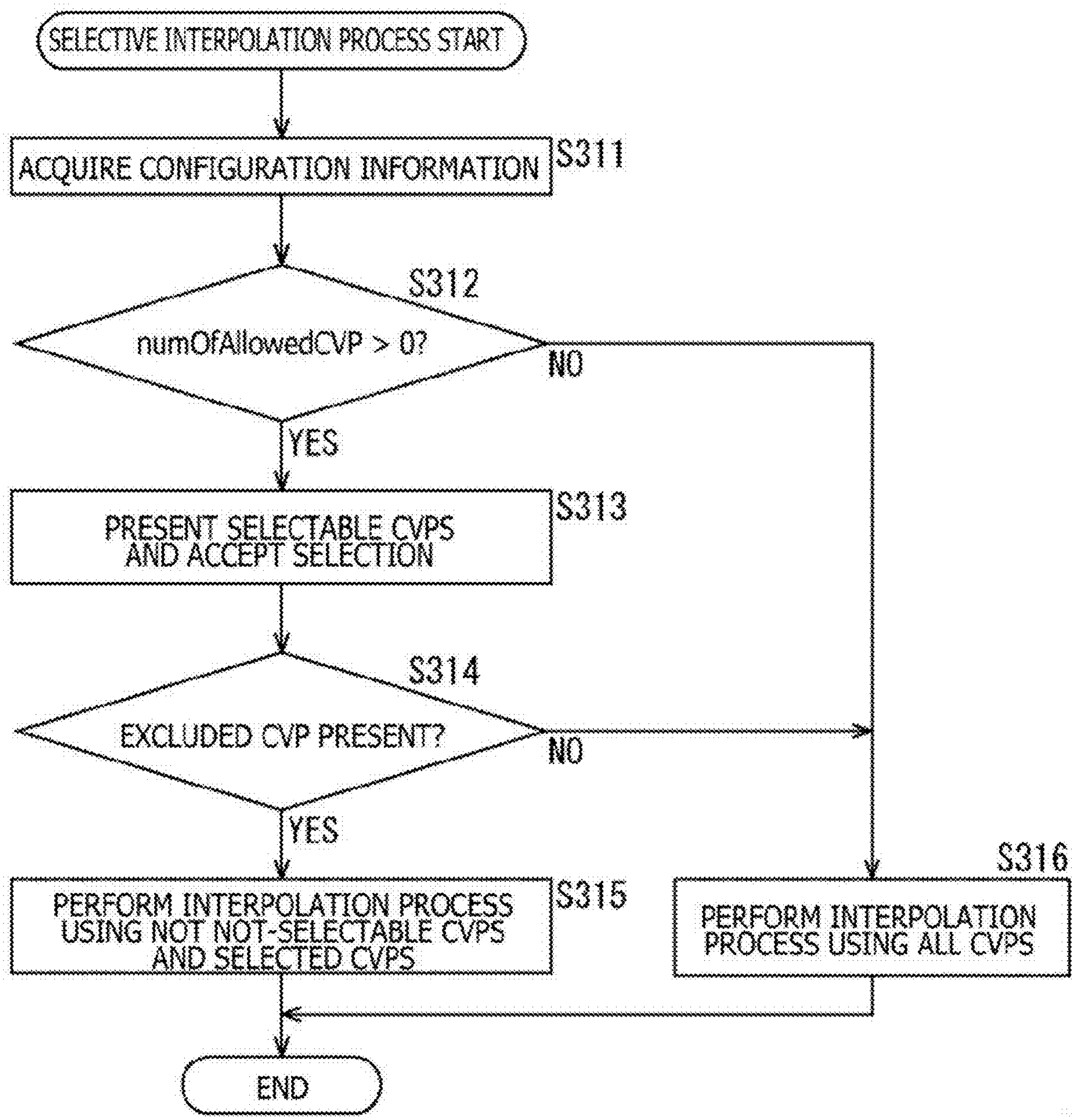
FIG. 52 is a flowchart explaining a selective interpolation process.

However, in step S84 in FIG. 18 or in step S126 in FIG. 34, a selective interpolation process presented in FIG. 52 is performed to obtain listener reference object position information and a listener reference gain.

The selective interpolation process performed by the client 101 will hereinafter be described with reference to a flowchart presented in FIG. 52.

In step S311, the position calculation unit 114 acquires configuration information from the decoding unit 113.

In step S312, the position calculation unit 114 determines whether or not the number of selectable CVPs is larger than 0, i.e., whether or not numOfAllowedCVP>0 is met, on the basis of the configuration information.

In a case of determination that numOfAllowedCVP>0 is met in step S312, i.e., the CVPs selectable by the listener are present, the position calculation unit 114 in step S313 presents the selectable CVPs and accepts selection of the CVPs by the listener.

For example, on the basis of index information "AllowedCVPIdx[i]" indicating selectable CVPs and contained in the configuration information, the position calculation unit 114 generates a CVP selection screen presenting the CVPs indicated by the index information as selectable CVPs and causes the display unit 202 to display the generated CVP selection screen. In this case, the display unit 202 displays the CVP selection screen depicted in FIG. 49, for example.

The listener (user) operates the input unit 201 while viewing the CVP selection screen displayed on the display unit 202 to select desired CVPs as CVPs used for the interpolation process.

Thereafter, a signal corresponding to the selection operation performed by the listener is supplied from the input unit 201 to the position calculation unit 114. Accordingly, the position calculation unit 114 updates the screen on the display unit 202 according to the signal supplied from the input unit 201. As a result, the display on the display unit 202 is updated from the display depicted in the left part of FIG. 49 to the display depicted in the right part of FIG. 49, for example.

Note that selection of the CVPs made by the listener on the CVP selection screen may be achieved before content reproduction or may be carried out any number of times at any timing during content reproduction.

In step S314, the position calculation unit 114 determines whether or not the CVPs excluded from the interpolation process are present in the selectable CVPs, i.e., whether or not the CVPs not selected by the listener are present, on the basis of the signal supplied from the input unit 201 according to the selection operation by the listener.

In a case of determination that the excluded CVPs are present in step S314, the process subsequently proceeds to step S315.

In step S315, the position calculation unit 114 performs the interpolation process using the CVPs not selectable and the CVPs selected by the listener, to obtain the listener reference object position information and the listener reference gain.

More specifically, the interpolation process is performed on the basis of CVP position information associated with a plurality of CVPs including the CVPs not selectable and the CVPs selected by the listener, object position information, gains of objects, and the like, and further on the basis of listener position information.

Note herein that the CVPs not selectable are CVPs for which the index information "AllowedCVPIdx[i]" is not contained in the configuration information. In other words, the CVPs not selectable are CVPs that are not designated as selectable and that are identified by selection possibility information contained in the configuration information.

Accordingly, in step S315, the interpolation process is performed using all the remaining CVPs after exclusion of the CVPs not selected by the listener, i.e., non-selection CVPs, from all the CVPs.

Specifically, for example, the interpolation process is performed using all the CVPs except for the non-selection CVPs in a manner similar to the manner of the first embodiment or the third embodiment, to obtain the listener reference object position information and the listener reference gain.

Note that the example which excludes the non-selection CVPs from all the CVPs is not required to be adopted. For example, the interpolation process may be performed using the CVPs remaining after exclusion of the non-selection CVPs from the CVPs meeting a specific condition such as presence around the listening position, or using the CVPs remaining after exclusion of the non-selection CVPs from the CVPs belonging to a CVP group corresponding to a target group region.

After completion of the processing in step S315, the selective interpolation process ends.

In addition, in a case of determination that numOfAllowedCVP>0 is not met, i.e., selectable CVPs are absent, in step S312, or in a case of determination that excluded CVPs are absent in step S314, the process subsequently proceeds to step S316.

In step S316, the position calculation unit 114 performs the interpolation process using all the CVPs to obtain the listener reference object position information and the listener reference gain. Thereafter, the selective interpolation process ends.

In step S316, an interpolation process similar to the interpolation process performed in step S315, except that the CVPs used for the interpolation process are different, is performed. Note that the interpolation process may similarly be performed in step S316 using the CVPs meeting a specific condition or using the CVPs belonging to a CVP group corresponding to a target group region.

In the manner described above, the client 101 performs the interpolation process selectively using CVPs selected according to selection by the listener or the like. In this manner, the client 101 can reproduce content reflecting preference of the listener (user) as well while reflecting intention of the content creator.

<Configuration Example of Computer>

Meanwhile, a series of processes described above may be executed by either hardware or software. In a case where the series of processes are executed by software, a program constituting the software is installed in a computer. Examples of the computer herein include a computer incorporated in dedicated hardware, and a computer capable of executing various types of functions under various types of installed programs, such as a general-purpose personal computer.

Figure 53:
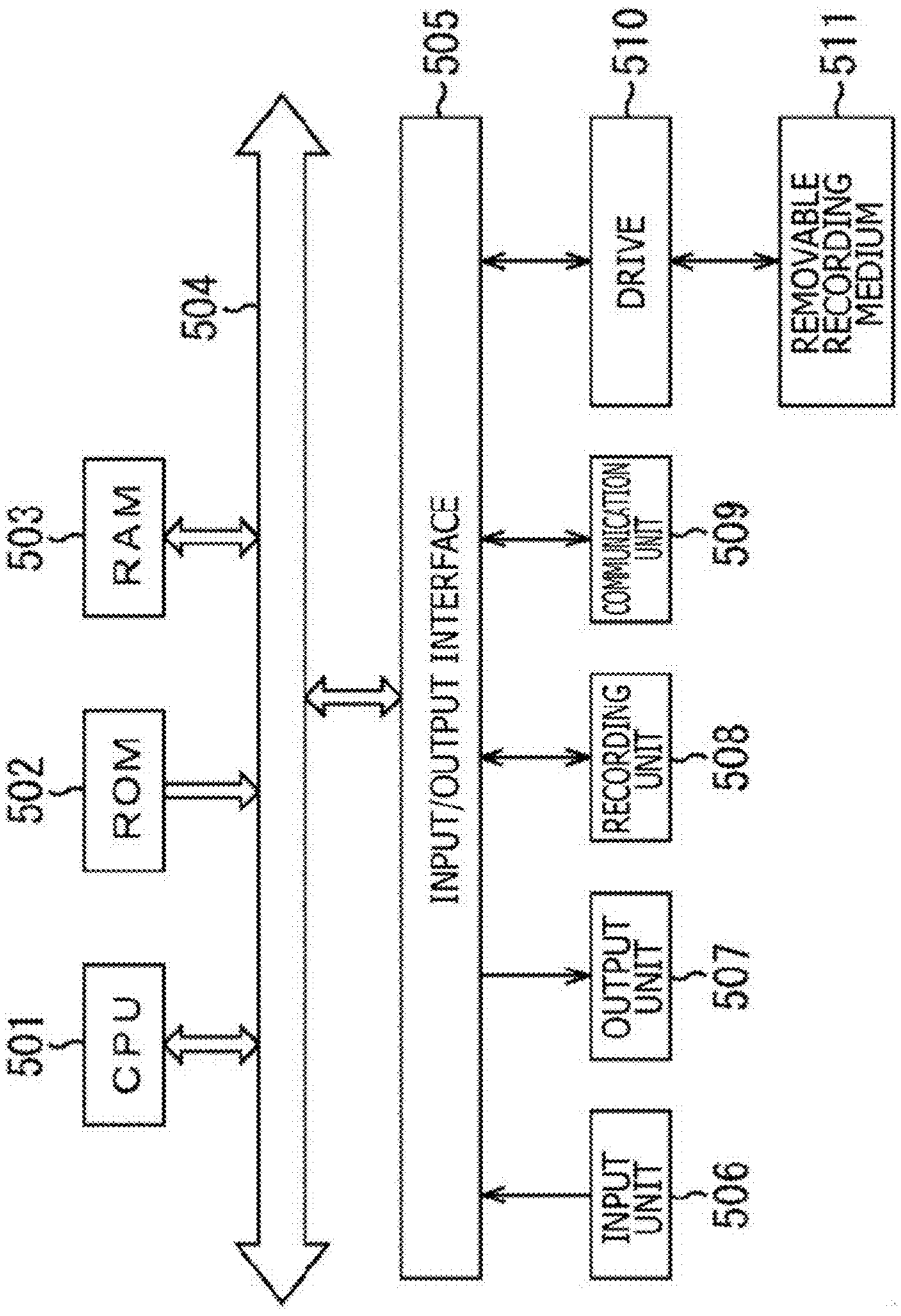
FIG. 53 is a diagram depicting a configuration example of a computer.

FIG. 53 is a block diagram depicting a configuration example of hardware of a computer which executes the series of processes described above under a program.

In the computer, a CPU (Central Processing Unit) 501, a ROM (Read Only Memory) 502, and a RAM (Random Access Memory) 503 are connected to each other via a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, and a semiconductor memory.

According to the computer configured as above, the CPU 501 loads a program recorded in the recording unit 508 into the RAM 503 via the input/output interface 505 and the bus 504 and executes the loaded program, for example, to perform the series of processes described above.

For example, the program executed by the computer (CPU 501) may be recorded in the removable recording medium 511 such as a package medium, and provided in this form. Moreover, the program may be provided via a wired or wireless transfer medium, such as a local area network, the Internet, and digital satellite broadcasting.

The program of the computer can be installed into the recording unit 508 via the input/output interface 505 from the removable recording medium 511 attached to the drive 510. Alternatively, the program can be received by the communication unit 509 via a wired or wireless transfer medium, and installed in the recording unit 508. Instead, the program can be installed beforehand in the ROM 502 or the recording unit 508.

Note that the program executed by the computer may be a program where processes are performed in time series in the order described in the present description, or may be a program where processes are performed in parallel or at necessary timing such as an occasion when a call is made.

In addition, embodiments of the present technology are not limited to the embodiments described above, and may be modified in various manners without departing from the subject matters of the present technology.

For example, the present technology may have a configuration of cloud computing where one function is shared and processed by a plurality of devices operating in cooperation with each other via a network.

Moreover, the respective steps described in the above flowcharts may be executed by one device, or may be shared and executed by a plurality of devices.

Further, in a case where a plurality of processes are included in one step, the plurality of processes included in the one step may be executed by one device or may be shared and executed by a plurality of devices.

In addition, the present technology may have the following configurations.

(1)

An information processing device including:

a control unit configured to generate a plurality of metadata sets each including metadata associated with a plurality of objects, the metadata containing object position information indicating positions of the objects as viewed from a control viewpoint when a direction from the control viewpoint toward a target point in a space is designated as a direction toward a median plane, for each of a plurality of the control viewpoints, generate control viewpoint information that contains control viewpoint position information indicating a position of the corresponding control viewpoint in the space and information indicating the metadata set associated with the corresponding control viewpoint in a plurality of the metadata sets, and generate content data containing a plurality of the metadata sets different from each other and configuration information containing the control viewpoint information associated with a plurality of the control viewpoints.

(2)

The information processing device according to (1), in which the metadata contains gains of the objects.

(3)

The information processing device according to (1) or (2), in which the control viewpoint information contains control viewpoint orientation information indicating a direction from the control viewpoint toward the target point in the space or target point information indicating the target point in the space.

(4)

The information processing device according to any one of (1) to (3), in which the configuration information contains at least any one of number-of-object information indicating the number of the objects constituting content, number-of-control-viewpoint information indicating the number of the control viewpoints, and number-of-metadata-set information indicating the number of the metadata sets.

(5)

The information processing device according to any one of (1) to (4), in which the configuration information contains control viewpoint group information associated with a control viewpoint group including the control viewpoints contained in a predetermined group region in the space, and, for one or a plurality of the control viewpoint groups, the control viewpoint group information contains information indicating the control viewpoints belonging to the control viewpoint group and information for identifying the group region corresponding to the control viewpoint group.

(6)

The information processing device according to (5), in which the configuration information contains information indicating whether or not the control viewpoint group information is contained.

(7)

The information processing device according to (5) or (6), in which the control viewpoint group information contains at least either information indicating the number of the control viewpoints belonging to the control viewpoint group or information indicating the number of the control viewpoint groups.

(8)

The information processing device according to any one of (1) to (7), in which the configuration information contains mute information for identifying the object designated as a mute object as viewed from any one of the control viewpoints.

(9)

The information processing device according to any one of (1) to (8), in which the configuration information contains selection possibility information concerning whether or not the control viewpoint used for calculation of listener reference object position information indicating positions of the objects as viewed from a listening position or calculation of gains of the objects as viewed from the listening position is selectable.

(10)

An information processing method performed by an information processing device, including:

generating a plurality of metadata sets each including metadata associated with a plurality of objects, the metadata containing object position information indicating positions of the objects as viewed from a control viewpoint when a direction from the control viewpoint toward a target point in a space is designated as a direction toward a median plane;

for each of a plurality of the control viewpoints, generating control viewpoint information that contains control viewpoint position information indicating a position of the corresponding control viewpoint in the space and information indicating the metadata set associated with the corresponding control viewpoint in a plurality of the metadata sets; and generating content data containing a plurality of the metadata sets different from each other and configuration information containing the control viewpoint information associated with a plurality of the control viewpoints.

(11)

A program causing a computer to execute processes of:

generating a plurality of metadata sets each including metadata associated with a plurality of objects, the metadata containing object position information indicating positions of the objects as viewed from a control viewpoint when a direction from the control viewpoint toward a target point in a space is designated as a direction toward a median plane;

for each of a plurality of the control viewpoints, generating control viewpoint information that contains control viewpoint position information indicating a position of the corresponding control viewpoint in the space and information indicating the metadata set associated with the corresponding control viewpoint in a plurality of the metadata sets; and generating content data containing a plurality of the metadata sets different from each other and configuration information containing the control viewpoint information associated with a plurality of the control viewpoints.

(12)

An information processing device including:

an acquisition unit configured to acquire object position information indicating a position of an object as viewed from a control viewpoint when a direction from the control viewpoint toward a target point in a space is designated as a direction toward a median plane and control viewpoint position information indicating a position of the control viewpoint in the space;

a listener position information acquisition unit configured to acquire listener position information indicating a listening position in the space; and a position calculation unit configured to calculate listener reference object position information indicating a position of the object as viewed from the listening position on the basis of the listener position information, the control viewpoint position information associated with a plurality of the control viewpoints, and the object position information associated with a plurality of the control viewpoints.

(13)

The information processing device according to (12), in which the acquisition unit acquires a metadata set including metadata of a plurality of the objects and containing the object position information, the control viewpoint position information, and designation information indicating the metadata set associated with the control viewpoint, and the position calculation unit calculates the listener reference object position information on the basis of the object position information contained in the metadata set indicated by the designation information in a plurality of the metadata sets different from each other.

(14)

The information processing device according to (12) or (13), in which the position calculation unit calculates the listener reference object position information by performing an interpolation process on the basis of the listener position information, the control viewpoint position information associated with a plurality of the control viewpoints, and the object position information associated with a plurality of the control viewpoints.

(15)

The information processing device according to (14), in which the interpolation process includes vector synthesis.

(16)

The information processing device according to (15), in which the position calculation unit performs the vector synthesis by using weights obtained on the basis of the listener position information and the control viewpoint position information associated with a plurality of the control viewpoints.

(17)

The information processing device according to any one of (14) to (16), in which the position calculation unit performs the interpolation process on the basis of the control viewpoint position information associated with the control viewpoint corresponding to the object that is not a mute object and on the basis of the object position information.

(18)

The information processing device according to (17), in which the acquisition unit further acquires mute information for identifying the object designated as the mute object as viewed from the control viewpoint, and the position calculation unit identifies the control viewpoint corresponding to the object that is not the mute object on the basis of the mute information.

(19)

The information processing device according to (17), in which the acquisition unit further acquires a gain of the object as viewed from the control viewpoint for each of a plurality of the control viewpoints, and the position calculation unit identifies the control viewpoint corresponding to the object that is not the mute object on the basis of the gain.

(20)

The information processing device according to any one of (14) to (19), in which the acquisition unit further acquires selection possibility information concerning whether or not the control viewpoints used for calculation of the listener reference object position information are selectable, and the position calculation unit performs the interpolation process on the basis of the control viewpoint position information associated with the control viewpoint selected by a listener from the control viewpoints selectable with reference to the selection possibility information and on the basis of the object position information.

(21)

The information processing device according to (20), in which the position calculation unit performs the interpolation process on the basis of the control viewpoint position information associated with the control viewpoint not selectable with reference to the selection possibility information and on the basis of the object position information, as well as on the basis of the control viewpoint position information associated with the control viewpoint selected by the listener and on the basis of the object position information.

(22)

The information processing device according to any one of (12) to (21), in which the listener position information acquisition unit acquires listener orientation information indicating an orientation of a listener in the space, and the position calculation unit calculates the listener reference object position information on the basis of the listener orientation information, the listener position information, the control viewpoint position information associated with a plurality of the control viewpoints, and the object position information associated with a plurality of the control viewpoints.

(23)

The information processing device according to (22), in which the acquisition unit further acquires control viewpoint orientation information indicating a direction from the control viewpoint toward the target point in the space for each of a plurality of the control viewpoints, and the position calculation unit calculates the listener reference object position information on the basis of the control viewpoint orientation information associated with a plurality of the control viewpoints, the listener orientation information, the listener position information, the control viewpoint position information associated with a plurality of the control viewpoints, and the object position information associated with a plurality of the control viewpoints.

(24)

The information processing device according to any one of (12) to (23), in which the acquisition unit further acquires a gain of the object as viewed from the control viewpoint for each of a plurality of the control viewpoints, and the position calculation unit calculates a gain of the object as viewed from the listening position by performing an interpolation process on the basis of the listener position information, the control viewpoint position information associated with a plurality of the control viewpoints, and the gains as viewed from a plurality of the control viewpoints.

(25)

The information processing device according to (24), in which the position calculation unit performs the interpolation process on the basis of a weight obtained from a reciprocal of a value of a distance that is defined from the listening position to the control viewpoint, the value being raised to power of an exponent that is a predetermined sensitivity coefficient.

(26)

The information processing device according to (25), in which the sensitivity coefficient is set for each of the control viewpoints or for each of the objects as viewed from the control viewpoints.

(27)

The information processing device according to any one of (24) to (26), in which the acquisition unit further acquires selection possibility information concerning whether or not the control viewpoints used for calculation of the gain of the object as viewed from the listening position are selectable, and the position calculation unit performs the interpolation process on the basis of the control viewpoint position information associated with the control viewpoint selected by a listener from the control viewpoints selectable with reference to the selection possibility information and on the basis of the gain.

(28)

The information processing device according to (27), in which the position calculation unit performs the interpolation process on the basis of the control viewpoint position information associated with the control viewpoint not selectable with reference to the selection possibility information and on the basis of the gain, as well as on the basis of the control viewpoint position information associated with the control viewpoint selected by the listener and on the basis of the gain.

(29)

The information processing device according to any one of (12) to (28), further including:

a rendering processing unit configured to perform a rendering process on the basis of audio data of the object and the listener reference object position information.

(30)

The information processing device according to any one of (12) to (29), in which the listener reference object position information includes information that indicates the position of the object and that is expressed by coordinates in a polar coordinate system that has an origin located at the listening position.

(31)

The information processing device according to any one of (12) to (30), in which the acquisition unit further acquires control viewpoint group information that is associated with a control viewpoint group including the control viewpoints contained in a predetermined group region in the space and that contains, for one or a plurality of the control viewpoint groups, information indicating the control viewpoint belonging to the control viewpoint group and information for identifying the group region corresponding to the control viewpoint group, and the position calculation unit calculates the listener reference object position information on the basis of the control viewpoint position information associated with the control viewpoint belonging to the control viewpoint group corresponding to the group region containing the listening position and on the basis of the object position information and the listener position information.

(32)

The information processing device according to (31), in which the position calculation unit acquires configuration information that contains control viewpoint information associated with a plurality of the control viewpoints and containing the control viewpoint position information and that contains information indicating whether or not the control viewpoint group information is contained, and the configuration information contains the control viewpoint group information according to the information indicating whether or not the control viewpoint group information is contained.

(33)

The information processing device according to (31) or (32), in which the control viewpoint group information contains at least either information indicating the number of the control viewpoints belonging to the control viewpoint group or information indicating the number of the control viewpoint groups.

(34)

The information processing device according to any one of (12) to (33), in which the acquisition unit acquires configuration information that contains control viewpoint information associated with a plurality of the control viewpoints and containing the control viewpoint position information, and at least any one of number-of-object information indicating the number of the objects constituting content, number-of-control-viewpoint information indicating the number of the control viewpoints, and number-of-metadata-set information indicating the number of metadata sets including metadata of a plurality of the objects and containing the object position information.

(35)

An information processing method performed by an information processing device, including acquiring object position information indicating a position of an object as viewed from a control viewpoint when a direction from the control viewpoint toward a target point in a space is designated as a direction toward a median plane and control viewpoint position information indicating a position of the control viewpoint in the space;

acquiring listener position information indicating a listening position in the space; and calculating listener reference object position information indicating a position of the object as viewed from the listening position on the basis of the listener position information, the control viewpoint position information associated with a plurality of the control viewpoints, and the object position information associated with a plurality of the control viewpoints.

(36)

A program causing a computer to execute processes of:

acquiring object position information indicating a position of an object as viewed from a control viewpoint when a direction from the control viewpoint toward a target point in a space is designated as a direction toward a median plane and control viewpoint position information indicating a position of the control viewpoint in the space;

acquiring listener position information indicating a listening position in the space; and calculating listener reference object position information indicating a position of the object as viewed from the listening position on the basis of the listener position information, the control viewpoint position information associated with a plurality of the control viewpoints, and the object position information associated with a plurality of the control viewpoints.

REFERENCE SIGNS LIST

11: Information processing device
21: Input unit
22: Display unit
24: Communication unit
26: Control unit
51: Server
61: Communication unit
62: Control unit
71: Coding unit
101: Client
111: Listener position information acquisition unit
112: Communication unit
113: Decoding unit
114: Position calculation unit
115: Rendering processing unit

The invention claimed is:

1. An information processing device comprising:

a control unit configured to generate a plurality of metadata sets each including metadata associated with a plurality of objects, the metadata containing object position information indicating positions of the objects as viewed from a control viewpoint when a direction from the control viewpoint toward a target point in a space is designated as a direction toward a median plane, for each of a plurality of the control viewpoints, generate control viewpoint information that contains control viewpoint position information indicating a position of a corresponding control viewpoint in the space and information indicating the metadata set associated with the corresponding control viewpoint in a plurality of the metadata sets, and generate content data containing a plurality of the metadata sets different from each other and configuration information containing the control viewpoint information associated with a plurality of the control viewpoints.

2. The information processing device according to claim 1, wherein the metadata contains gains of the objects.

3. The information processing device according to claim 1, wherein the control viewpoint information contains control viewpoint orientation information indicating a direction from the control viewpoint toward the target point in the space or target point information indicating the target point in the space.

4. The information processing device according to claim 1, wherein the configuration information contains at least any one of number-of-object information indicating a number of the objects constituting content, number-of-control-viewpoint information indicating the number of the control viewpoints, and number-of-metadata-set information indicating the number of the metadata sets.

5. The information processing device according to claim 1, wherein the configuration information contains control viewpoint group information associated with a control viewpoint group including the control viewpoints contained in a predetermined group region in the space, and, for one or a plurality of the control viewpoint groups, the control viewpoint group information contains information indicating the control viewpoints belonging to the control viewpoint group and information for identifying the group region corresponding to the control viewpoint group.

6. The information processing device according to claim 5, wherein the configuration information contains information indicating whether or not the control viewpoint group information is contained.

7. The information processing device according to claim 5, wherein the control viewpoint group information contains at least either information indicating a number of the control viewpoints belonging to the control viewpoint group or information indicating the number of the control viewpoint groups.

8. The information processing device according to claim 1, wherein the configuration information contains mute information for identifying the object designated as a mute object as viewed from any one of the control viewpoints.

9. The information processing device according to claim 1, wherein the configuration information contains selection possibility information concerning whether or not the control viewpoint used for calculation of listener reference object position information indicating positions of the objects as viewed from a listening position or calculation of gains of the objects as viewed from the listening position is selectable.

10. An information processing method performed by an information processing device, comprising:

generating a plurality of metadata sets each including metadata associated with a plurality of objects, the metadata containing object position information indicating positions of the objects as viewed from a control viewpoint when a direction from the control viewpoint toward a target point in a space is designated as a direction toward a median plane;

for each of a plurality of the control viewpoints, generating control viewpoint information that contains control viewpoint position information indicating a position of a corresponding control viewpoint in the space and information indicating the metadata set associated with the corresponding control viewpoint in a plurality of the metadata sets; and generating content data containing a plurality of the metadata sets different from each other and configuration information containing the control viewpoint information associated with a plurality of the control viewpoints.

11. At least one non-transitory computer-readable medium storing instructions thereon that, when executed by a computer, cause the computer to execute a process of:

generating a plurality of metadata sets each including metadata associated with a plurality of objects, the metadata containing object position information indicating positions of the objects as viewed from a control viewpoint when a direction from the control viewpoint toward a target point in a space is designated as a direction toward a median plane;

for each of a plurality of the control viewpoints, generating control viewpoint information that contains control viewpoint position information indicating a position of a corresponding control viewpoint in the space and information indicating the metadata set associated with the corresponding control viewpoint in a plurality of the metadata sets; and generating content data containing a plurality of the metadata sets different from each other and configuration information containing the control viewpoint information associated with a plurality of the control viewpoints.

12. An information processing device comprising:

an acquisition unit configured to acquire object position information indicating a position of an object as viewed from a control viewpoint when a direction from the control viewpoint toward a target point in a space is designated as a direction toward a median plane and control viewpoint position information indicating a position of the control viewpoint in the space;

a listener position information acquisition unit configured to acquire listener position information indicating a listening position in the space; and a position calculation unit configured to calculate listener reference object position information indicating a position of the object as viewed from the listening position on a basis of the listener position information, the control viewpoint position information associated with a plurality of the control viewpoints, and the object position information associated with a plurality of the control viewpoints.

13. The information processing device according to claim 12, wherein the acquisition unit acquires a metadata set including metadata of a plurality of the objects and containing the object position information, the control viewpoint position information, and designation information indicating the metadata set associated with the control viewpoint, and the position calculation unit calculates the listener reference object position information on a basis of the object position information contained in the metadata set indicated by the designation information in a plurality of the metadata sets different from each other.

14. The information processing device according to claim 12, wherein the position calculation unit calculates the listener reference object position information by performing an interpolation process on the basis of the listener position information, the control viewpoint position information associated with a plurality of the control viewpoints, and the object position information associated with a plurality of the control viewpoints.

15. The information processing device according to claim 14, wherein the interpolation process includes vector synthesis.

16. The information processing device according to claim 15, wherein the position calculation unit performs the vector synthesis by using weights obtained on a basis of the listener position information and the control viewpoint position information associated with a plurality of the control viewpoints.

17. The information processing device according to claim 14, wherein the position calculation unit performs the interpolation process on a basis of the control viewpoint position information associated with the control viewpoint corresponding to the object that is not a mute object and on the basis of the object position information.

18. The information processing device according to claim 17, wherein the acquisition unit further acquires mute information for identifying the object designated as the mute object as viewed from the control viewpoint, and the position calculation unit identifies the control viewpoint corresponding to the object that is not the mute object on a basis of the mute information.

19. The information processing device according to claim 17, wherein the acquisition unit further acquires a gain of the object as viewed from the control viewpoint for each of a plurality of the control viewpoints, and the position calculation unit identifies the control viewpoint corresponding to the object that is not the mute object on a basis of the gain.

20. The information processing device according to claim 14, wherein the acquisition unit further acquires selection possibility information concerning whether or not the control viewpoints used for calculation of the listener reference object position information are selectable, and the position calculation unit performs the interpolation process on a basis of the control viewpoint position information associated with the control viewpoint selected by a listener from the control viewpoints selectable with reference to the selection possibility information and on the basis of the object position information.

21. The information processing device according to claim 20, wherein the position calculation unit performs the interpolation process on a basis of the control viewpoint position information associated with the control viewpoint not selectable with reference to the selection possibility information and on the basis of the object position information, as well as on the basis of the control viewpoint position information associated with the control viewpoint selected by the listener and on the basis of the object position information.

22. The information processing device according to claim 12, wherein the listener position information acquisition unit acquires listener orientation information indicating an orientation of a listener in the space, and the position calculation unit calculates the listener reference object position information on a basis of the listener orientation information, the listener position information, the control viewpoint position information associated with a plurality of the control viewpoints, and the object position information associated with a plurality of the control viewpoints.

23. The information processing device according to claim 22, wherein the acquisition unit further acquires control viewpoint orientation information indicating a direction from the control viewpoint toward the target point in the space for each of a plurality of the control viewpoints, and the position calculation unit calculates the listener reference object position information on a basis of the control viewpoint orientation information associated with a plurality of the control viewpoints, the listener orientation information, the listener position information, the control viewpoint position information associated with a plurality of the control viewpoints, and the object position information associated with a plurality of the control viewpoints.

24. The information processing device according to claim 12, wherein the acquisition unit further acquires a gain of the object as viewed from the control viewpoint for each of a plurality of the control viewpoints, and the position calculation unit calculates a gain of the object as viewed from the listening position by performing an interpolation process on a basis of the listener position information, the control viewpoint position information associated with a plurality of the control viewpoints, and the gains as viewed from a plurality of the control viewpoints.

25. The information processing device according to claim 24, wherein the position calculation unit performs the interpolation process on a basis of a weight obtained from a reciprocal of a value of a distance that is defined from the listening position to the control viewpoint, the value being raised to power of an exponent that is a predetermined sensitivity coefficient.

26. The information processing device according to claim 25, wherein the sensitivity coefficient is set for each of the control viewpoints or for each of the objects as viewed from the control viewpoints.

27. The information processing device according to claim 24, wherein the acquisition unit further acquires selection possibility information concerning whether or not the control viewpoints used for calculation of the gain of the object as viewed from the listening position are selectable, and the position calculation unit performs the interpolation process on a basis of the control viewpoint position information associated with the control viewpoint selected by a listener from the control viewpoints selectable with reference to the selection possibility information and on the basis of the gain.

28. The information processing device according to claim 27, wherein the position calculation unit performs the interpolation process on a basis of the control viewpoint position information associated with the control viewpoint not selectable with reference to the selection possibility information and on the basis of the gain, as well as on the basis of the control viewpoint position information associated with the control viewpoint selected by the listener and on the basis of the gain.

29. The information processing device according to claim 12, further comprising:

a rendering processing unit configured to perform a rendering process on a basis of audio data of the object and the listener reference object position information.

30. The information processing device according to claim 12, wherein the listener reference object position information includes information that indicates the position of the object and that is expressed by coordinates in a polar coordinate system that has an origin located at the listening position.

31. The information processing device according to claim 12, wherein the acquisition unit further acquires control viewpoint group information that is associated with a control viewpoint group including the control viewpoints contained in a predetermined group region in the space and that contains, for one or a plurality of the control viewpoint groups, information indicating the control viewpoint belonging to the control viewpoint group and information for identifying the group region corresponding to the control viewpoint group, and the position calculation unit calculates the listener reference object position information on a basis of the control viewpoint position information associated with the control viewpoint belonging to the control viewpoint group corresponding to the group region containing the listening position and on the basis of the object position information and the listener position information.

32. The information processing device according to claim 31, wherein the position calculation unit acquires configuration information that contains control viewpoint information associated with a plurality of the control viewpoints and containing the control viewpoint position information and that contains information indicating whether or not the control viewpoint group information is contained, and the configuration information contains the control viewpoint group information according to the information indicating whether or not the control viewpoint group information is contained.

33. The information processing device according to claim 31, wherein the control viewpoint group information contains at least either information indicating a number of the control viewpoints belonging to the control viewpoint group or information indicating the number of the control viewpoint groups.

34. The information processing device according to claim 12, wherein the acquisition unit acquires configuration information that contains control viewpoint information associated with a plurality of the control viewpoints and containing the control viewpoint position information, and at least any one of number-of-object information indicating a number of the objects constituting content, number-of-control-viewpoint information indicating the number of the control viewpoints, and number-of-metadata-set information indicating a number of metadata sets including metadata of a plurality of the objects and containing the object position information.

35. An information processing method performed by an information processing device, comprising:

acquiring object position information indicating a position of an object as viewed from a control viewpoint when a direction from the control viewpoint toward a target point in a space is designated as a direction toward a median plane and control viewpoint position information indicating a position of the control viewpoint in the space;

acquiring listener position information indicating a listening position in the space; and calculating listener reference object position information indicating a position of the object as viewed from the listening position on a basis of the listener position information, the control viewpoint position information associated with a plurality of the control viewpoints, and the object position information associated with a plurality of the control viewpoints.

36. At least one non-transitory computer-readable medium storing instructions thereon that, when executed by a computer, cause the computer to execute a process of:

acquiring object position information indicating a position of an object as viewed from a control viewpoint when a direction from the control viewpoint toward a target point in a space is designated as a direction toward a median plane and control viewpoint position information indicating a position of the control viewpoint in the space;

acquiring listener position information indicating a listening position in the space; and calculating listener reference object position information indicating a position of the object as viewed from the listening position on a basis of the listener position information, the control viewpoint position information associated with a plurality of the control viewpoints, and the object position information associated with a plurality of the control viewpoints.

* * * * *